United States Patent
Suehiro

(10) Patent No.: US 9,356,746 B2
(45) Date of Patent: *May 31, 2016

(54) TRANSMISSION METHOD, TRANSMISSION DEVICE, RECEIVING METHOD, AND RECEIVING DEVICE

(71) Applicant: Naoki Suehiro, Ibaraki (JP)

(72) Inventor: Naoki Suehiro, Ibaraki (JP)

(*) Notice: Subject to any disclaimer, the term of this patent is extended or adjusted under 35 U.S.C. 154(b) by 0 days.

This patent is subject to a terminal disclaimer.

(21) Appl. No.: 14/485,104

(22) Filed: Sep. 12, 2014

(65) Prior Publication Data

US 2015/0110211 A1    Apr. 23, 2015

Related U.S. Application Data

(63) Continuation of application No. 12/595,106, filed as application No. PCT/JP2008/054919 on Mar. 17, 2008, now Pat. No. 8,867,633.

(30) Foreign Application Priority Data

Apr. 10, 2007  (JP) ................................. 2007-103078
Mar. 4, 2008  (WO) .................. PCT/JP2008/053866

(51) Int. Cl.
   *H04K 1/10*       (2006.01)
   *H04L 27/28*     (2006.01)
   *H04L 5/00*       (2006.01)
   (Continued)

(52) U.S. Cl.
CPC .......... *H04L 5/0023* (2013.01); *H04L 25/0204* (2013.01); *H04J 13/18* (2013.01)

(58) Field of Classification Search
CPC ..... H04L 25/0204; H04L 5/0023; H04J 13/18
USPC ................. 375/260, 267, 299, 347, 349, 130; 370/331, 329
See application file for complete search history.

(56) References Cited

U.S. PATENT DOCUMENTS 6,115,406 A    9/2000   Mesecher
7,058,117 B1   6/2006   Iancu et al.
(Continued)

FOREIGN PATENT DOCUMENTS

EP          1542372      6/2005
JP        2003152595     5/2003
(Continued)

OTHER PUBLICATIONS

N. Suehiro et al., "Very Efficient Wireless Frequency Usage Based on Pseudo-Coherent Addition of Multipath Signals Using Kronecker Product with Rows of DFT Matrix", Proceedings of International Symposium on Information Theory, Jun. 2003, p. 385.

(Continued)

*Primary Examiner* — Phuong Phu
(74) *Attorney, Agent, or Firm* — Hanley, Flight & Zimmerman, LLC

(57) ABSTRACT

A transmitting device and a receiving device wherein, on the transmitting side, a signal creation unit creates, as its output, a signal generated adding up the signals assuming that different data has passed through multiple virtual channels and, on the receiving side, oversampling is performed, the sampled data is distributed, and signals are detected assuming that the distributed data is the output of multiple virtual reception antennas.

7 Claims, 44 Drawing Sheets

(51) Int. Cl.
*H04L 25/02* (2006.01)
*H04J 13/18* (2011.01)

(56) References Cited

U.S. PATENT DOCUMENTS

| | | | |
|---|---|---|---|
| 7,181,175 B2 | 2/2007 | Nimmo-Smith et al. | |
| 8,867,633 B2 * | 10/2014 | Suehiro | 375/260 |
| 2002/0172293 A1 | 11/2002 | Kuchi et al. | |
| 2003/0072282 A1 * | 4/2003 | Liang | 370/335 |
| 2005/0243944 A1 | 11/2005 | Suehiro | |
| 2006/0002582 A1 | 1/2006 | Suehiro et al. | |
| 2006/0104336 A1 | 5/2006 | Iancu et al. | |
| 2007/0014377 A1 | 1/2007 | Pirak et al. | |
| 2007/0071117 A1 | 3/2007 | Suehiro | |
| 2007/0248149 A1 | 10/2007 | Shimomura et al. | |
| 2007/0274261 A1 | 11/2007 | Sahinoglu et al. | |
| 2008/0165891 A1 | 7/2008 | Budianu et al. | |
| 2008/0181341 A1 | 7/2008 | Okazaki | |
| 2010/0040162 A1 | 2/2010 | Suehiro | |
| 2010/0172309 A1 | 7/2010 | Forenza et al. | |

FOREIGN PATENT DOCUMENTS

| | | |
|---|---|---|
| JP | 2005260977 | 9/2005 |
| WO | 2004021597 | 3/2004 |
| WO | 2004021598 | 3/2004 |
| WO | 2005013626 | 2/2005 |
| WO | 2005046074 | 5/2005 |
| WO | 2008032803 | 3/2008 |
| WO | 2008032805 | 3/2008 |
| WO | 2008126644 | 10/2008 |

OTHER PUBLICATIONS

N. Suehiro et al., "An Information Transmission Method Using Kronecker Product", Proceedings of the IASTED International Conference Communication Systems and Networks, Sep. 9-12, 2002, pp. 206-209.

N. Suehiro et al., "Performance of Very Efficient Wireless Frequency Usage System Using Kronecker Product with Rows of DFT Matrix", Proceedings of 2006 IEEE Information Theory Workshop (ITW '06), Oct. 2006, pp. 526-529.

Japanese Patent Office, "International Search Report", issued in connection with International Application No. PCT/JP2008/054919, dated Jun. 17, 2008 (2 pages).

United States Patent and Trademark Office, "Non-Final Office Action", issued in connection with U.S. Appl. No. 12/595,106, dated Oct. 28, 2011 (11 pages).

United States Patent and Trademark Office, "Final Office Action", issued in connection with U.S. Appl. No. 12/595,106, dated May 16, 2012 (7 pages).

United States Patent and Trademark Office, "Non-Final Office Action", issued in connection with U.S. Appl. No. 12/595,106, dated Sep. 10, 2013 (18 pages).

United States Patent and Trademark Office, "Final Office Action", issued in connection with U.S. Appl. No. 12/595,106, dated Jan. 8, 2014 (16 pages).

United States Patent and Trademark Office, "Notice of Allowance", issued in connection with U.S. Appl. No. 12/595,106, dated Jun. 18, 2014 (7 pages).

International Searching Authority, "Written Opinion", issued in connection with International Application No. PCT/JP2008/054919, dated Jun. 17, 2008 (4 pages).

European Patent Office, "Extended European Search Report", issued in connection with European Patent Application No. 08722313.7, dated Nov. 27, 2012 (9 pages).

European Patent Office, "Extended European Search Report", issued in connection with European Patent Application No. 13173457.6, dated Aug. 26, 2014 (9 pages).

Fabregas et al., "Impact of Signal Contellation Expansion on the Achievable Diversity of Pragmatic Bit-interleaved Space-Time Codes", IEEE Transactions on Wireless Communications, vol. 5, No. 8, Aug. 2006 (6 pages).

Japanese Patent Office, "Office Action", issued in connection with Japanese Patent Application No. 2013-023215, dated Dec. 8, 2014 (4 pages).

* cited by examiner $$F_N = \frac{1}{\sqrt{N}} \begin{bmatrix} W_N^0 & W_N^0 & W_N^0 & W_N^0 & \cdots & W_N^0 \\ W_N^0 & W_N^{-1} & W_N^{-2} & W_N^{-3} & \cdots & W_N^{-(N-1)} \\ W_N^0 & W_N^{-2} & W_N^{-4} & W_N^{-6} & \cdots & W_N^{-2(N-1)} \\ W_N^0 & W_N^{-3} & W_N^{-6} & W_N^{-9} & \cdots & W_N^{-3(N-1)} \\ \vdots & \vdots & \vdots & \vdots & \ddots & \vdots \\ W_N^0 & W_N^{-(N-1)} & W_N^{-2(N-1)} & W_N^{-3(N-1)} & & W_N^{-(N-1)(N-1)} \end{bmatrix}$$

$$= \frac{1}{\sqrt{N}} \begin{bmatrix} W_N^0 & W_N^0 & W_N^0 & W_N^0 & \cdots & W_N^0 \\ W_N^0 & W_N^{N-1} & W_N^{N-2} & W_N^{N-3} & \cdots & W_N^1 \\ W_N^0 & W_N^{N-2} & W_N^{N-4} & W_N^{N-6} & \cdots & W_N^2 \\ W_N^0 & W_N^{N-3} & W_N^{N-6} & W_N^{N-9} & \cdots & W_N^3 \\ \vdots & \vdots & \vdots & \vdots & \ddots & \vdots \\ W_N^0 & W_N^1 & W_N^2 & W_N^3 & & W_N^{N-1} \end{bmatrix}$$

$$= \frac{1}{\sqrt{N}} \begin{bmatrix} \text{VECTOR } f_{N,0} \\ \text{VECTOR } f_{N,1} \\ \text{VECTOR } f_{N,2} \\ \text{VECTOR } f_{N,3} \\ \vdots \\ \text{VECTOR } f_{N,N-1} \end{bmatrix}$$

FIG. 2

$$\begin{matrix} 1 & j & 1 & -j \\ j & 1 & 1 & j \\ 1 & j & j & 1 \\ 1 & -1 & -1 & j \end{matrix}$$

FIG. 8

$KS0_0$, $KS0_1$, $KS0_2$, $KS0_3$, $KS0_4$, ............ $KS0_{NM-1}$ $jKS0_0$, $jKS0_1$, $jKS0_2$, $jKS0_3$, ............ $jKS0_{NM-1}$ $KS0_0$, $KS0_1$, $KS0_2$, $KS0_3$, ............ $KS0_{NM-1}$

+) $-jKS0_0$, $-jKS0_1$, $-jKS0_2$, $-jKS0_3$, ............ $-jKS0_{NM-1}$

OUTPUT OF CONVOLUTION UNIT 152

FIG. 11

SIGNAL P(1, -1, 1, 1)

OVERSAMPLING AT $\tau/4$ INTERVAL

SIGNAL B(1, 1, 1, 1, -1, -1, -1, -1, 1, 1, 1, 1, 1, 1, 1, 1)

"1"　　"-1"　　"1"　　"1"

| SEQUENCE OF SAMPLING #0 | $a_{0-0}$ | $a_{1-0}$ | $\cdots$ | $a_{(M-1)-0}$ |
| SEQUENCE OF SAMPLING #1 | $a_{0-1}$ | $a_{1-1}$ | $\cdots$ | $a_{(M-1)-1}$ |
| $\vdots$ | | | | |
| SEQUENCE OF SAMPLING #U-1 | $a_{0-(U-1)}$ | $a_{1-(U-1)}$ | $\cdots$ | $a_{(M-1)-(U-1)}$ |

OVERSAMPLING #0 SEQUENCE SIGNALS PASSING THROUGH MATCHED FILTERS OF $f_P \otimes I_M$

⋯

OVERSAMPLING #0 SEQUENCE SIGNALS PASSING THROUGH MATCHED FILTERS OF $f_{N-1} \otimes I_M$ FIG. 16B
OVERSAMPLING #1 SEQUENCE SIGNALS PASSING THROUGH MATCHED FILTERS OF $f_P \otimes I_M$

⋯

OVERSAMPLING #1 SEQUENCE SIGNALS PASSING THROUGH MATCHED FILTERS OF $f_{N-1} \otimes I_M$ FIG. 16C
OVERSAMPLING #2 SEQUENCE SIGNALS PASSING THROUGH MATCHED FILTERS OF $f_P \otimes I_M$

⋯

OVERSAMPLING #2 SEQUENCE SIGNALS PASSING THROUGH MATCHED FILTERS OF $f_{N-1} \otimes I_M$

FIG. 16D

SIGNALS PASSING THROUGH MATCHED FILTERS OF $f_P \otimes I_M$ COLLECTED FROM (A), (B), AND (C): $T_P$
SIGNALS PASSING THROUGH MATCHED FILTERS OF $f_{P+1} \otimes I_M$ COLLECTED FROM (A), (B), AND (C): $T_{P+1}$

⋯

SIGNALS PASSING THROUGH MATCHED FILTERS OF $f_{N-1} \otimes I_M$ COLLECTED FROM (A), (B), AND (C): $T_{N-1}$

TRANSMISSION METHOD, TRANSMISSION DEVICE, RECEIVING METHOD, AND RECEIVING DEVICE

RELATED APPLICATION(S)

This patent arises from a continuation of U.S. patent application Ser. No. 12/595,106 (now U.S. Pat. No. 8,867,633), filed on Oct. 8, 2009, which corresponds to the national stage of International Patent Application No. PCT/JP2008/054919, filed on Mar. 17, 2008, which claims priority to International Patent Application No. PCT/JP2008/053866, filed on Mar. 4, 2008, and Japanese Patent Application Serial No. 2007-103078, filed on Apr. 10, 2007. U.S. patent application Ser. No. 12/595,106, International Patent Application No. PCT/JP2008/054919, International Patent Application No. PCT/JP2008/053866 and Japanese Patent Application Serial No. 2007-103078 are hereby incorporated by reference in their entireties.

FIELD OF THE INVENTION

The present invention relates to a transmitting method, a transmitting device, a receiving method, and a receiving device, and more particularly to a transmitting method and a transmitting device that transmit data by convoluting transmission signals with virtual channel data, and to a receiving device.

The present invention is applicable to a wired communication system and a wireless communication system.

A wireless communication system to which the present invention is applied includes a wireless communication system such as a mobile communication system and a wireless LAN communication system.

BACKGROUND ART

Suehiro and his colleagues have devised the Suehiro's DFT (OSDM) system that is a new information transmitting system using the Kronecker product of the row vectors (The "column vectors" may also be used instead of the "row vectors". The row vectors are used in the description of this specification) of a DFT (Discrete Fourier Transform) matrix and the data vectors (see Non-Patent Documents 1 and 2).

It is recognized that the wireless frequency usage efficiency of this system is about two times higher than that of the OFDM (Orthogonal Frequency Division Multiplex) system that is used today in various types of communication (see Non-Patent Document 3).

Next, the following describes the OSDM (Orthogonal Signal Division Multiplex) system that is a transmitting method for transmitting/receiving signals having the length M×N generated by calculating the Kronecker product of each of the N row vectors (N is a natural number equal to or larger than 3) of an Nth order DFT matrix and data having the length M (M is a natural number equal to or larger than 2).

(DFT Matrix and Transmission Signal)

First, the following describes an Nth order DFT (Discrete Fourier Transform) matrix.

Let the Nth order DFT matrix $F_N$ be defined as follows.

$$F_N = [f_N(i,j)] \quad (1)$$

where the Nth order inverse DFT matrix $F_N^{-1}$ is the complex conjugate of the DFT matrix $F_N$.

In the above expression, i is a row number ($0 \leq i \leq N-1$) and j is a column number ($0 \leq j \leq N-1$).

$$f_N(i,j) = \exp(2\pi\sqrt{-1}\,ij/N)/\sqrt{N} \quad (2)$$

The variable $W_N$ corresponding to the point, generated by dividing a unit circle into N, is defined as follows as shown in FIG. 1.

$$W_N = \exp(2\pi\sqrt{-1})/N \quad (3)$$

When this $W_N$ is used, the DFT matrix $F_N$ is as shown in FIG. 2.

$W_N$ is a rotor and the following relation is satisfied.

$$W_N^N = e^{j2\pi} = 1 \quad (4)$$

$$W_N^{N-k} = W_N^{2N-k} = \ldots = W_N^{-k} \quad (5)$$

As shown in FIG. 2, the Nth order DFT matrix $F_N$ has N row vectors, that is, vector $f_{N,0}$, vector $f_{N,1}$ ... vector $f_{N,N-1}$. The cyclic crosscorrelations among those row vectors are zero in all shifts.

Next, the following describes data transmission using those row vectors. As shown in FIG. 3, the signals $S_0, S_1 \ldots S_{N-1}$ are generated from N pieces of transmission data each having the length M (data $X_0$ ($x_{00}, x_{01}, \ldots x_{0(M-1)}$), data $X_1$ ($x_{10}, x_{11}, \ldots x_{1(M-1)}$), ..., data $X_{(N-1)}$ ($x_{(N-1)0}, x_{(N-1)1}, \ldots, x_{(N-1)(M-1)}$)), received from transmitting unit #0, transmitting unit #1 ... transmitting unit #(N−1) using row vector $f_{N,0}$, row vector $f_{N,1}, \ldots$, row vector $f_{N,N-1}$, and the generated signals are transmitted.

$$S_0 = f_{N,0} \otimes DataX_0$$
$$S_1 = f_{N,1} \otimes DataX_1$$
$$\vdots$$
$$S_{N-1} = f_{N,N-1} \otimes DataX_{(N-1)}$$

[Mathematical expression 1]

where $\otimes$ is the Kronecker product.

Transmitting the generated signals $S_0, S_1 \ldots S_{N-1}$ allows data to be transmitted from multiple transmitting units without correlation. Note that the length of transmitted signals is N×M.

That is, because the cyclic crosscorrelation between any two signals of the signals $S_0, S_1 \ldots S_{N-1}$ is zero in all shifts, the well-designed matched filters allows data sequences to be separated at reception time even when the signals are added up.

(Matched Filter)

The vector $I_M$ (1, 0, ..., 0) having the length M is defined.

Here, the matched filters for matching to the signals of the Kronecker product of the vectors $f_k$ ($0 \leq k \leq N-1$) and $I_M$ are provided.

[Mathematical expression 2]

$$f_k \otimes I_M = (W_N^0, 0, \ldots, 0, W_N^k, 0, \ldots, 0, W_N^{(N-1)k}, 0, \ldots 0,)/\sqrt{N} \quad (7)$$

When the signals $S_k$ ($0 \leq k \leq N-1$) are input to the matched filters, M units of data in the center of the output becomes data $X_K$.

In addition, when the signals $S_g$ (where $g \neq k$, $0 \leq k \leq N-1$, $0 \leq g \leq N-1$) are input to the matched filters

[Mathematical expression 3]

$$f_k \otimes I_M = (W_N^0, 0, \ldots, 0, W_N^k, 0, \ldots, 0, W_N^{(N-1)k}, 0, \ldots 0,)/\sqrt{N} \quad (8)$$

The M units of data in the center of the output signal are always 0. This means that, even when the signals, from signal $S_0$ to signal $S_{N-1}$, are added up, only $X_K$ is produced when they are input to the matched filters of $f_K \otimes I_M$.

(Pseudo-periodic Signal)

Let $S_{sum}$ be the signal produced by adding up signal $S_0$ to signal $S_{N-1}$. Because the signal $S_{sum}$ is a limited-length sequence having the length MN, the periodicity obtained by the DFT matrix is lost when the signal is input to the multipath channels. In such a case, the data $X_k(0 \le k \le N-1)$ cannot be obtained from the matched filter output.

Multipath channels do not affect the periodicity of the signal if the signal is a periodic signal having an unlimited length. However, transmitting a sequence having an unlimited length is not practical. To solve this problem, a pseudo-periodic signal, generated by selecting a signal having a necessary length from the periodic sequence of an unlimited length, is used.

First, let $L_2$ be a value larger than the assumed multipath delay time.

When there is no direct-path signal or when the power level of the direct-path signal is extremely low, the delay time for the maximum amplitude signal becomes sometimes negative. Let $L_1$ be a value considering that time.

Using those values $L_1$ and $L_2$, the pseudo-periodic signal, such as the one shown in FIG. 4, is generated and transmitted.

The part corresponding to $L_2$ is called a cyclic prefix, and the part corresponding to $L_1$ is called a cyclic postfix. At reception time, both prefixes must be removed before the signal enters the matched filter.

(Pilot Signal)

The data sequence $X_0$ is defined as follows where the length is M.

$$X_0 = (1,0,0,0,\ldots,0) \quad (9)$$

[Mathematical expression 4]

When "$f_k \otimes I_M$" is calculated using this data sequence and the data sequence is input directly into $f_k \otimes I_M$, the central part of the output becomes as follows.

$$X_0 = (1,0,0,0,\ldots,0) \quad (10)$$

Next, $S_0$ is converted to a pseudo-periodic signal, which is sent via multipath channels. When the cyclic (pre/post) prefixes are removed and the signal is input to the matched filters of $f_k \otimes I_M$, the M units of data in the central part of the output are as follows.

$$X_0 = (p0, p1, p2, p3, \ldots, p(L2-1), 0, 0, \ldots, 0) \quad (11)$$

where $(p_0, p_1, p_2, p_3, \ldots, p_k, \ldots, p_{(L2-1)})$ are complex coefficients that are multiplied by the paths which arrived with a delay of time k. They correspond to the transmission characteristics including the transmission characteristics of the transmitting device, the transmission characteristics of the propagation space, and the transmission characteristics of the receiving device and represent the channel characteristics on the time axis.

This $p_k$ is usually represented as shown below using the amplitude coefficient $r_k$ and the phase rotation $\theta_k$.

$$p_k = r_k e^{j\theta_k} \quad (12)$$

As the pilot signal, the signal of the ZACZ (Zero Auto Correlation Zone Sequence) sequence, the signal of the ZCCZ (Zero Crosscorrelation Zone Sequence) sequence, and the signal of the PN sequence may be used.

[Mathematical expression 5]

In this case, the output of the matched filters of $f_k \otimes I_M$ described above must be input to the matched filters that match to those pilot signals.

Also when ZACZ and so on are used as the pilot signal, the channel characteristics on the time axis, including the multipath characteristics, may be detected.

(Simultaneous Equation)

As described above, the channel characteristics on the time axis, including the multipath characteristics, can be obtained by inserting the pilot signal.

The M units of data (dk0–dk(M−1)) in the center of each matched filter output of the data signal parts Xk (1<k<N−1), other than the pilot, have the relation between the data and the multipath characteristics which is shown by the following expression.

$$(p_0, p_1, \ldots, p_{L2-2}, p_{L2-1}, 0, \ldots, 0, 0, 0) \cdot x_{k0} + \quad (13)$$

$$(0, p_0, p_1, \ldots, p_{L2-2}, p_{L2-1}, 0, \ldots, 0, 0) \cdot x_{k1} +$$

$$(0, 0, p_0, p_1, \ldots, p_{L2-2}, p_{L2-1}, 0, \ldots, 0) \cdot x_{k2}$$

$$\vdots$$

$$+ (0, 0, 0, \ldots, 0, 0, 0, 0, p_0, p_1) \cdot x_{k(M-2)} +$$

$$(0, 0, 0, 0, \ldots, 0, 0, 0, 0, p_0) \cdot x_{k(M-1)} =$$

$$(d_{k0}, d_{k1}, d_{k2}, \ldots, d_{k(M-2)}, d_{k(M-1)})$$

This is expressed by the matrix shown in Expression (14) given below.

[Mathematical expression 6]

$$\begin{bmatrix} d_{k0} \\ d_{k1} \\ d_{k2} \\ \vdots \\ d_{k(L_2-1)} \\ d_{kL_2} \\ \vdots \\ d_{k(M-1)} \end{bmatrix} = \begin{bmatrix} P_0 & 0 & 0 & \ldots & 0 & 0 & \ldots & P_1 \\ P_1 & P_0 & 0 & \ldots & 0 & 0 & \ldots & P_2 \\ P_2 & P_1 & P_0 & \ldots & 0 & 0 & \ldots & P_3 \\ \vdots & & & & \vdots & & & \\ P_{L_2-1} & P_{L_2-2} & P_{L_2-3} & \ldots & P_0 & 0 & \ldots & 0 \\ 0 & P_{L_2-1} & P_{L_2-2} & \ldots & P_1 & P_0 & \ldots & 0 \\ \vdots & & & & \vdots & & & \\ 0 & 0 & 0 & \ldots & 0 & 0 & \ldots & P_0 \end{bmatrix} \begin{bmatrix} I_{k0} \\ I_{k1} \\ I_{k2} \\ \vdots \\ I_{k(L_2-1)} \\ I_{kL_2} \\ \vdots \\ I_{k(M-1)} \end{bmatrix} \quad (14)$$

where

[Mathematical expression 7]

If $$P = \begin{bmatrix} P_0 & 0 & 0 & \ldots & 0 & 0 & \ldots & P_1 \\ P_1 & P_0 & 0 & \ldots & 0 & 0 & \ldots & P_2 \\ P_2 & P_1 & P_0 & \ldots & 0 & 0 & \ldots & P_3 \\ \vdots & & & & \vdots & & & \vdots \\ P_{L_2-1} & P_{L_2-2} & P_{L_2-3} & \ldots & P_0 & 0 & \ldots & 0 \\ 0 & P_{L_2-1} & P_{L_2-2} & \ldots & P_1 & P_0 & \ldots & 0 \\ \vdots & & & & \vdots & & & \vdots \\ 0 & 0 & 0 & \ldots & 0 & 0 & \ldots & P_0 \end{bmatrix} \quad (15)$$

-continued $$D_k = \begin{bmatrix} d_{k0} \\ d_{k1} \\ d_{k2} \\ \vdots \\ d_{k(L_2-1)} \\ d_{kL_2} \\ \vdots \\ d_{k(M-1)} \end{bmatrix} \quad (16)$$

then, $$D_k = P^t X_k \quad (17)$$

Solving Expression (17) for $X_k$ allows the receiving side to obtain the transmission data for which the channel characteristics on the time axis are compensated, wherein the channel characteristics include the transmission characteristics of the transmitting device side, the transmission characteristics of the propagation space, and the transmission characteristics of the receiving device side.

To solve this simultaneous equation simply, the both sides of Expression (17) are multiplied by the inverse matrix of P from the left.

$$P^{-1}D_k = P^{-1}P^t X_k = {}^t X_k \quad (18)$$

Non-Patent Document 1: N. Suehiro, C. Han, T. Imoto, and N. Kuroyanagi, "An information transmission method using Kronecker product", Proceedings of the IASTED International Conference Communication Systems and Networks, pp. 206-209, September 2002.

Non-Patent Document 2: N. Suehiro, C. Han, and T. Imoto, "Very Efficient wireless usage based on pseudo-coherent addition of multipath signals using Kronecker product with rows of DFT matrix", Proceedings of International Symposium on Information Theory, pp. 385, June 2003.

Non-Patent Document 3: Naoki Suehiro, Rongzhen Jin, Chenggao Han, Takeshi Hashimoto, "Performance of Very Efficient Wireless Frequency Usage System Using Kronecker Product with Rows of DFT Matrix", Proceedings of 2006 IEEE Information Theory Workshop (ITW'06), pp. 526-529, October 2006.

DISCLOSURE OF THE INVENTION

Problems to be Solved by the Invention

However, though the wireless frequency usage efficiency of the conventional OSDM system is about two times higher than that of the OFDM system, the problem to be solved is to further increase the wireless frequency usage efficiency.

In view of the foregoing, it is an object of the present invention to provide a transmitting method, a transmitting device, a receiving method, and a receiving device that have higher wireless frequency usage efficiency.

Means to Solve the Problems

To achieve the above objects, a transmitting method of the present invention is a transmitting method that transmits a plurality of signals generated by calculating a Kronecker product of each of sequences that are N (N is a natural number equal to or larger than 3) row vectors or column vectors of an Nth order DFT matrix, or of each of N sequences of a ZCCZ sequence set, and a pilot signal and transmission data having a length M (M is a natural number equal to or larger than 2), the N sequences being $f_0, f_1, f_2, \ldots, f_{N-1}$, the transmitting method comprising the steps of allocating P (P is a natural number equal to or larger than 2) sequences out of the N sequences to pilot sequences for transmitting pilot signals, and N−P sequences to data sequences for transmitting transmission data; preparing Q (Q is a natural number equal to or larger than 2 and equal to or smaller than P) pieces of virtual channel generation data configured by two-phase signals, four-phase signals, or complex signals; generating R (R is a natural number equal to or larger than 1 and equal to or smaller than Q) transmission signals each of which comprises a Kronecker product of one of the pilot sequences and a pilot signal and a Kronecker product of the data sequences and transmission data; and convoluting each of the generated R transmission signals with one separate piece of the virtual channel generation data and transmitting the convoluted signals.

In the present invention, the linear combination of the row vectors of a DFT matrix and the linear combination of the column vector of a DFT matrix also have the equivalent function of the row vectors of a DFT matrix and the column vectors of a DFT matrix. Therefore, in the present invention, the row vectors of a DFT matrix and the column vectors of a DFT matrix each include the linear combination of the row vectors of a DFT matrix and the linear combination of the column vectors of a DFT matrix.

To achieve the above objects, a transmitting device of the present invention is a transmitting device comprising transmission signal generation units each of which generates a transmission signal by calculating a Kronecker product of each of sequences that are N (N is a natural number equal to or larger than 3) row vectors or column vectors of an Nth order DFT matrix, or of each of N sequences of a ZCCZ sequence set, and a pilot signal having a length M (M is a natural number equal to 2 or larger) and transmission data having a length M; a data convolution unit that convolutes R transmission signals, generated by the transmission signal generation units, with virtual channel generation data; and a transmitting unit that transmits the transmission signal generated by the convolution by the data convolution unit.

To achieve the above objects, a receiving method of the present invention is a receiving method that receives signals transmitted by the transmitting method according to one of claims 1-3, the receiving method comprising a reception step that receives the transmitted signals; an oversampling step that performs U-fold (where U≥R) oversampling for the signals received by the reception step; a channel characteristics detection step that detects channel characteristics on a time axis for P×U channels; a signal detection step that detects M×U reception signals; a simultaneous equation generation step that generates M×R simultaneous equations based on the channel characteristics on a time axis for P×U channels and the M×U reception signals; and a decoding step that solves the simultaneous equations generated by the simultaneous equation generation step.

To achieve the above objects, a receiving device of the present invention is a receiving device that receives signals transmitted by the transmitting method according to one of claims 1-3, the receiving device comprising a reception unit that receives the transmitted signals; an oversampling unit that performs U-fold (where U≥R) oversampling for the signals received by the reception unit; a channel characteristics detection unit that detects channel characteristics on a time axis for P×U channels; a signal detection unit that detects M×U reception signals; a simultaneous equation generation unit that generates M×R simultaneous equations based on the channel characteristics on a time axis for P×U channels and the M×U reception signals; and a decoding unit that solves the simultaneous equations generated by the simultaneous equation generation step.

Effects of the Invention

The present invention provides a transmitting method, a transmitting device, a receiving method, and a receiving device that have higher wireless frequency usage efficiency.

BRIEF DESCRIPTION OF THE DRAWINGS

FIG. 2 is a diagram showing an Nth order DFT matrix.
FIG. 8 is a diagram showing an example of virtual channel generation data.
FIG. 11 is a diagram showing convolution using virtual channel generation data.
FIG. 15 is a diagram (2) showing virtual channels based on oversampling.
FIGS. 16A-D (collectively FIG. 16) are a diagram showing a simultaneous equation generation unit.

EXPLANATIONS OF SYMBOLS

Figure 1:
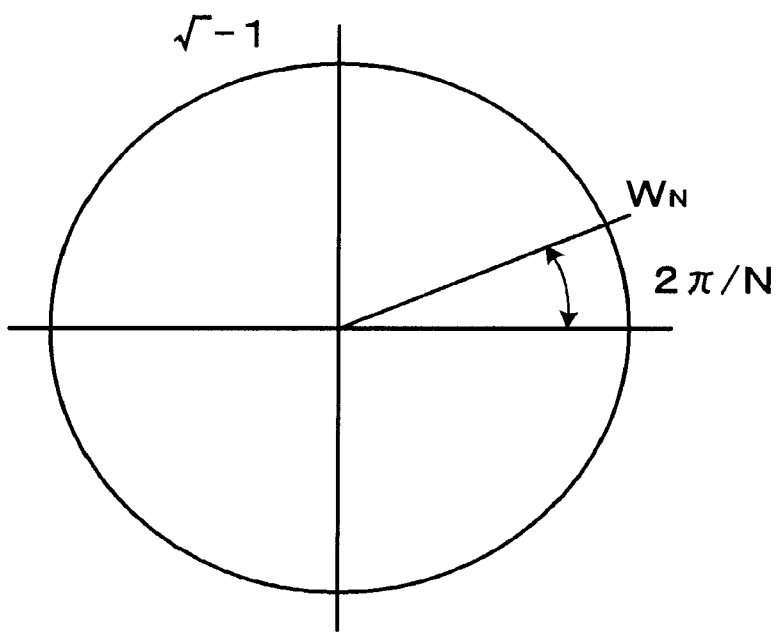
FIG. 1 is a diagram showing $W_N$.
Figure 3:
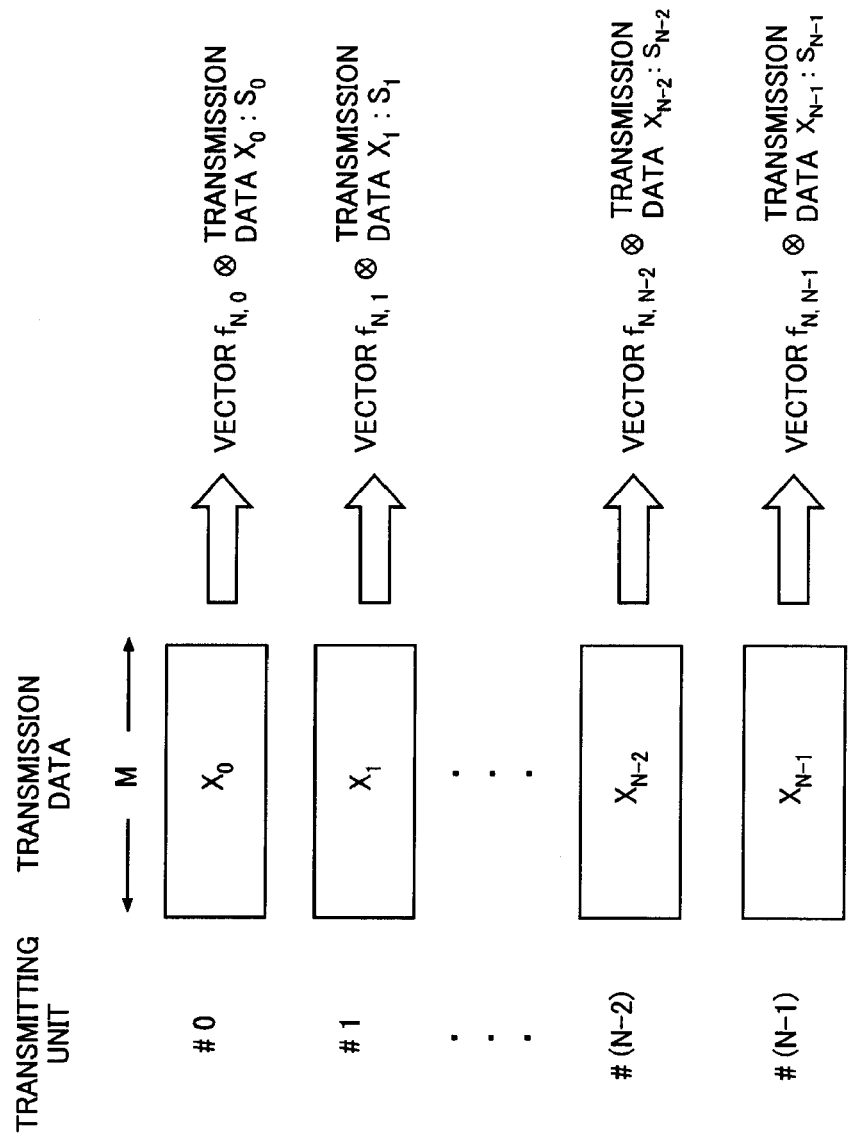
FIG. 3 is a diagram showing the transmission of a signal using the row vectors of the DFT matrix $F_N$.

11 Virtual channel 0 (virtual transmission channel 0) transmission signal creation unit
12 Virtual channel 1 (virtual transmission channel 1) transmission signal creation unit
13 Virtual channel 2 (virtual transmission channel 2) transmission signal creation unit
15 Virtual channel generation data convolution and addition unit
17, 172 Transmitting unit
18, 181, 182, 183, 184, 185 Transmission antenna
21, 211, 212, 213, 214, 215 Reception antenna
22 Receiving unit
151, 381 Virtual channel generation data storage unit
152, 153, 154 Convolution unit
155, 1551 Addition unit
221, 222, 223, 224, 225 Receiving unit
25 Channel characteristics detection unit
26 Simultaneous equation generation unit
27 Decoding unit
28 Oversampling unit
29 Signal separation unit
38 Receiving side virtual channel convolution unit

MOST PREFERRED MODE FOR CARRYING OUT THE INVENTION (Signal Configuration)

Figure 5:
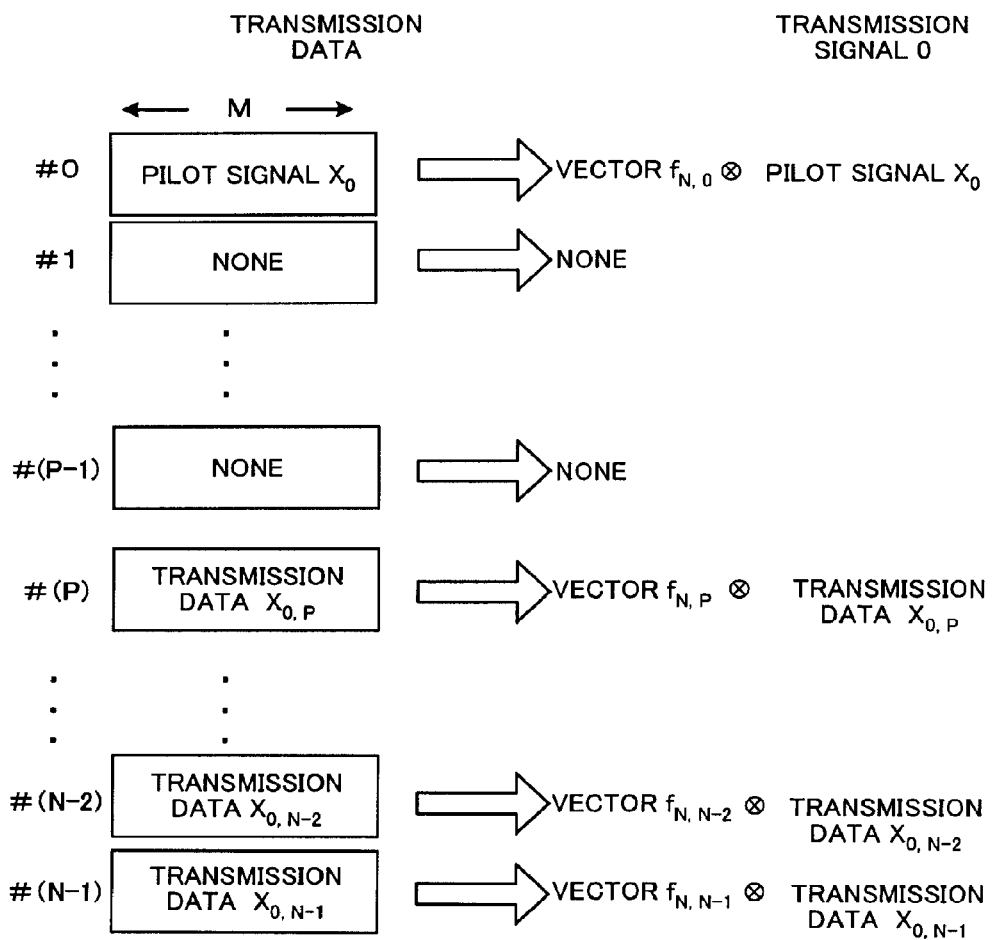
FIG. 5 is a diagram showing the configuration of the signal of transmission signal 0.
Figure 6:
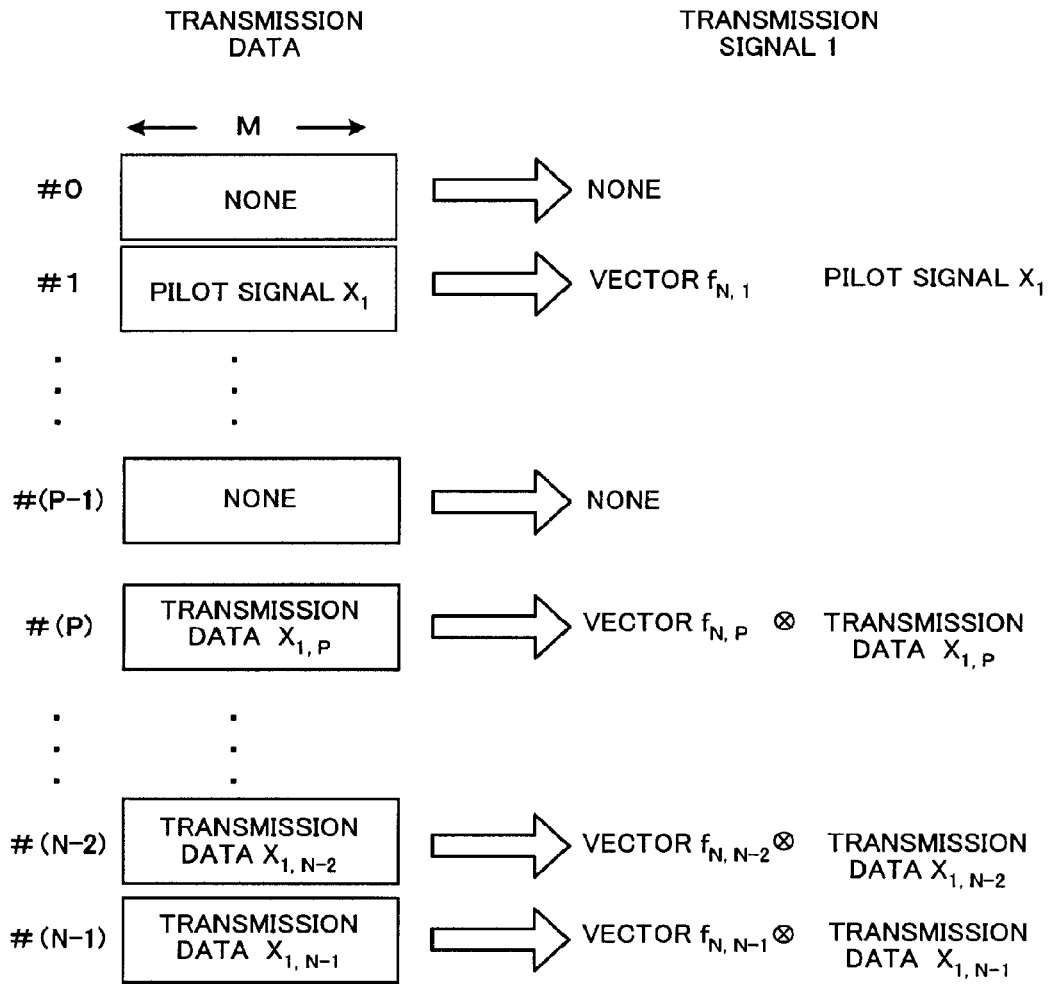
FIG. 6 is a diagram showing the configuration of the signal of transmission signal 1.
Figure 7:
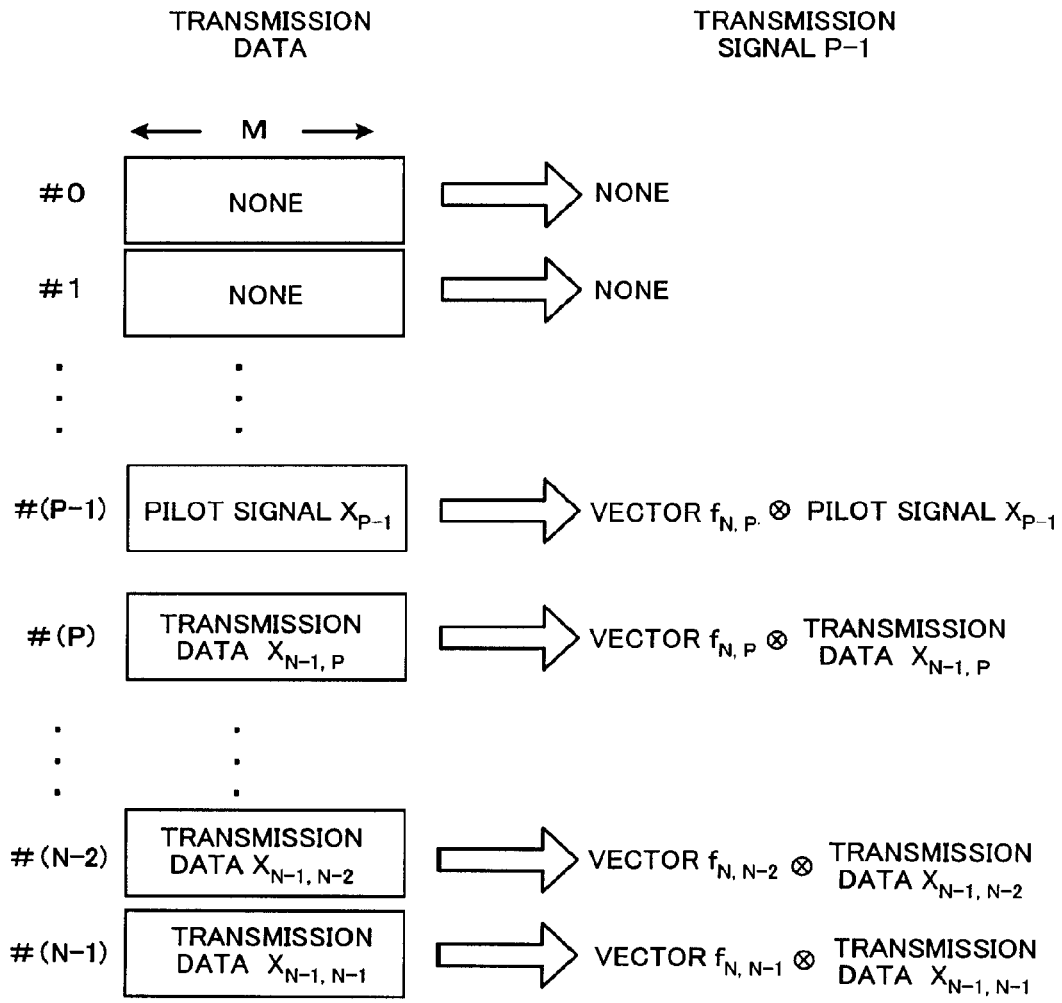
FIG. 7 is a diagram showing the configuration of the signal of transmission signal P−1.

Transmission data has the signal configuration shown in FIG. 5 to FIG. 7.

In the signal configuration in FIG. 5 to FIG. 7, the N row vectors (N sequences) of an Nth order DFT matrix are $f_{N,0}$, $f_{N,1}, f_{N,2}, \ldots f_{N,N-1}$. Out of the N row vectors, P row vectors $f_{N,0}$–$f_{N,P-1}$ are used as pilot row vectors for transmitting pilot signals, and N−P row vectors $f_{N,P}$–$f_{N,N-1}$ are used as data transmission row vectors for transmission data.

The signal configuration in FIG. 5 shows the case in which one row vector $f_{N,0}$ is used as the pilot row vector and N−P row vectors $f_{N,P}$–$f_{N,N-1}$ are used as data row vectors.

The row vectors $f_{N,0}, f_{N,1}, f_{N,2}, \ldots f_{N,N-1}$ may also be N column vectors of an Nth order DFT matrix.

The vectors $f_{N,0}, f_{N,1}, f_{N,2}, \ldots, f_{N,N-1}$ may be N sequences configuring a ZCCZ sequence set instead of the N row vectors of an Nth order DFT matrix.

For example, the row vectors of the ZCCZ matrix defined below may be used as the ZCCZ sequence set.

The ZCCZ matrix mentioned here is a matrix of N rows and K columns, and a zero crosscorrelation zone exists in the k-period cyclic crosscorrelation function between any two row vectors.

Note that, depending upon the combination of two row vectors, a zero crosscorrelation zone may exist in the k'-period cyclic crosscorrelation function (k' is not k(k'≠k)).

The pilot signal $X_0$ ($x_{00}, x_{01}, \ldots, x_{0(M-1)}$) may be $X_0=(1, 0, 0, 0, \ldots 0)$, or the ZCZ sequence signal having the length M or the ZCCZ sequence signal having the length M may be used.

The Kronecker product of each of N−P pieces of transmission data $X_{0,P}$ ($x_{0,P,0}, x_{0,P,1}, \ldots, x_{0,P,(M-1)}$) $X_{0,N-1}$ ($x_{0,(N-1),0}, x_{0,(N-1),1}, \ldots, x_{0,(N-1),(M-1)}$) and N−P row vectors $f_{N,P}$ to $f_{N,N-1}$ is calculated.

Therefore, "transmission signal 0" shown in FIG. 5 is the following signal.
[Mathematical expression 8]

$$\text{Vector } f_{N,0} \otimes \text{Pilot signal } X_0 + \text{Vector}$$
$$f_{N,P} \otimes \text{Transmission data } X_{0,P} \ldots + \text{Vector}$$
$$f_{N,N-2} \otimes \text{Transmission data } X_{0,N-2} + \text{Vector}$$
$$f_{N,N-1} \otimes \text{Transmission data } X_{0,N-1} \quad (19)$$

In the signal configuration in FIG. 6, one row vector $f_{N,1}$ is used as the pilot row vector and N−P row vectors $f_{N,P}$−$f_{N,N-1}$ are used as data row vectors.

"Transmission signal 1" shown in FIG. 6 is the following signal.
[Mathematical expression 9]

$$\text{Vector } f_{N,1} \otimes \text{Pilot signal } X_1 + \text{Vector}$$
$$f_{N,P} \otimes \text{Transmission data } X_{1,P} \ldots + \text{Vector}$$
$$f_{N,N-2} \otimes \text{Transmission data } X_{1,N-2} + \text{Vector}$$
$$f_{N,N-1} \otimes \text{Transmission data } X_{1,N-1} \quad (20)$$

Similarly, in the signal configuration in FIG. 7, one row vector $f_{N,P-1}$ is used as the pilot row vector and N−P row vectors $f_{N,P}$−$f_{N,N-1}$ are used as data row vectors.

"Transmission signal P−1" shown in FIG. 7 is the following signal.
[Mathematical expression 10]

$$\text{Vector } f_{N,P-1} \otimes \text{Pilot signal } X_{P-1} + \text{Vector}$$
$$f_{N,P} \otimes \text{Transmission data } X_{N-1,P} \ldots + \text{Vector}$$
$$f_{N,N-2} \otimes \text{Transmission data } X_{N-1,N-2} + \text{Vector}$$
$$f_{N,N-1} \otimes \text{Transmission data } X_{N-1,N-1} \quad (21)$$

(Virtual Channel Data)

The data in FIG. 8 may be used as an example of virtual channel generation data.

A low correlation sequence or random numbers may also be used as the virtual channel generation data.

A virtual channel is generated by convoluting data with one of different virtual channel generation data described above and transmitting the convoluted data. This virtual channel is also called a virtual transmission channel or a virtual transmission antenna because the virtual channel is generated on the transmitting side.

(Transmitting Device)

Figure 9:
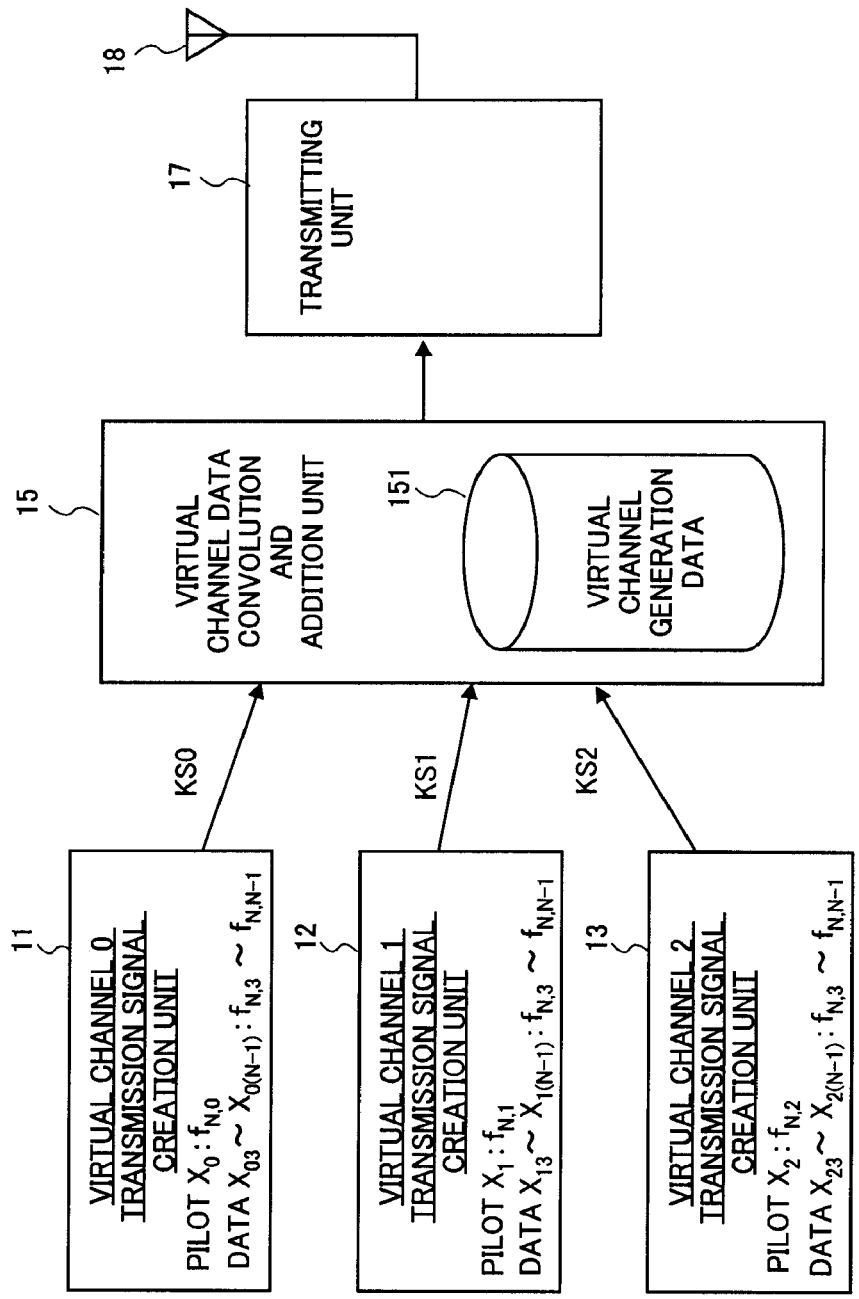
FIG. 9 is a diagram showing a transmitting device (1).

Referring to FIG. 9, the following describes a transmitting device where there is one actual antenna and P is "3" (there are three pilot signals and three virtual channels (virtual transmission channel, virtual transmission antenna)) in FIG. 5-FIG. 7.

In the transmitting device in FIG. 9, the N row vectors (N sequences) of an Nth order DFT matrix are $f_{N,0}$, $f_{N,1}$, $f_{N,2}$, … $f_{N,N-1}$ and, out of those N row vectors, three row vectors $f_{N,0}$−$f_{N,2}$ are used as pilot row vectors and N−P (N−3) row vectors $f_{N,3}$−$f_{N,N-1}$ are used as data row vectors for transmitting transmission data.

The transmitting device in FIG. 9 comprises a virtual channel 0 (virtual transmission channel 0, virtual transmission antenna 0) transmission signal creation unit 11, a virtual channel 1 (virtual transmission channel 1, virtual transmission antenna 1) transmission signal creation unit 12, a virtual channel 2 (virtual transmission channel 2, virtual transmission antenna 2) transmission signal creation unit 13, a virtual channel generation data convolution and addition unit 15, a transmitting unit 17, and an antenna 18. The virtual channel generation data convolution and addition unit 15 comprises a virtual channel generation data storage unit 151 in which virtual channel generation data is stored.

The virtual channel 0 transmission signal creation unit 11 calculates the Kronecker product of the pilot row vector $f_{N,0}$ and the pilot signal $X_0$ ($x_{00}$, $x_{01}$, … $x_{0(M-1)}$) and the Kronecker product of each of N−3 data vectors $f_{N,3}$−$f_{N,N-1}$ and the N−3 pieces of transmission data $X_{0,3}$ ($x_{0,3,0}$, $x_{0,3,1}$, … , $x_{0,3,(M-1)}$) … $X_{0,N-1}$ ($x_{0,(N-1),0}$, $x_{0,(N-1),1}$, … , $x_{0,(N-1),(M-1)}$) to create virtual channel 0 transmission signal KS0.

Finally, the virtual channel 0 transmission signal creation unit 11 creates the following signal.
[Mathematical expression 11]

$$\text{Transmission signal KS0: Vector } f_{N,0} \otimes \text{Pilot signal}$$
$$X_0 + \text{Vector } f_{N,3} \otimes \text{Transmission data } X_{0,3} \ldots$$
$$+ \text{Vector } f_{N,N-2} \otimes \text{Transmission data } X_{0,N-2} +$$
$$\text{Vector } f_{N,N-1} \otimes \text{Transmission data } X_{0,N-1} \quad (22)$$

Note that the transmission signal KS0 is the sum of (N−2) signals having the length NM.

Similarly, the virtual channel 1 transmission signal creation unit 12 calculates the Kronecker product of the pilot row vector $f_{N,1}$ and the pilot signal $X_1$ ($x_{10}$, $x_{11}$, … , $x_{1(M-1)}$) and the Kronecker product of each of N−3 data vectors $f_{N,3}$−$f_{N,N-1}$ and the N−3 pieces of transmission data $X_{1,3}$ ($x_{1,3,0}$, $x_{1,3,1}$, … , $x_{1,3,(M-1)}$) … $X_{1,N-1}$ ($x_{1,(N-1),0}$, $x_{1,(N-1),1}$, … , $x_{1,(N-1),(M-1)}$) to create the transmission signal KS1 for virtual channel 1.

Finally, the virtual channel 1 transmission signal creation unit 12 creates the following signal.
[Mathematical expression 12]

$$\text{Transmission signal KS1: Vector } f_{N,1} \otimes \text{Pilot signal}$$
$$X_1 + \text{Vector } f_{N,3} \otimes \text{Transmission data } X_{1,3} \ldots$$
$$+ \text{Vector } f_{N,N-2} \otimes \text{Transmission data } X_{1,N-2} +$$
$$\text{Vector } f_{N,N-1} \otimes \text{Transmission data } X_{1,N-1} \quad (23)$$

Similarly, the virtual channel 2 transmission signal creation unit 13 calculates the Kronecker product of the pilot row vector $f_{N,2}$ and the pilot signal $X_2$ ($x_{20}$, $x_{21}$, … , $x_{2(M-1)}$) and the Kronecker product of each of N−3 data vectors $f_{N,3}$−$f_{N,N-1}$ and the N−3 pieces of transmission data $X_{2,3}$ ($x_{2,3,0}$, $x_{2,3,1}$, … , $x_{2,3,(M-1)}$) … $X_{2,N-1}$ ($x_{2,(N-1),0}$, $x_{2,(N-1),1}$, … , $x_{2,(N-1),(M-1)}$) to create the transmission signal KS2 for virtual channel 2.

Finally, the virtual channel 2 transmission signal creation unit 13 creates the following signal.
[Mathematical expression 13]

$$\text{Transmission signal KS2: Vector } f_{N,2} \otimes \text{Pilot signal}$$
$$X_2 + \text{Vector } f_{N,3} \otimes \text{Transmission data } X_{2,3} \ldots +$$
$$\text{Vector } f_{N,N-2} \otimes \text{Transmission data } X_{2,N-2} + \text{Vec-}$$
$$\text{tor } f_{N,N-1} \otimes \text{Transmission data } X_{2,N-1} \quad (24)$$

The virtual channel generation data convolution and addition unit 15 performs the convolution between the virtual channel 0 transmission signal KS0, virtual channel 1 transmission signal KS1, or virtual channel 2 transmission signal KS2, respectively, and different virtual channel data, adds them up, and supplies the result to the transmitting unit.

The transmitting unit 17 and the antenna 18 transmit the signal, generated by the virtual channel generation data convolution and addition unit 15, at high frequencies via the antenna 18.

Figure 10:
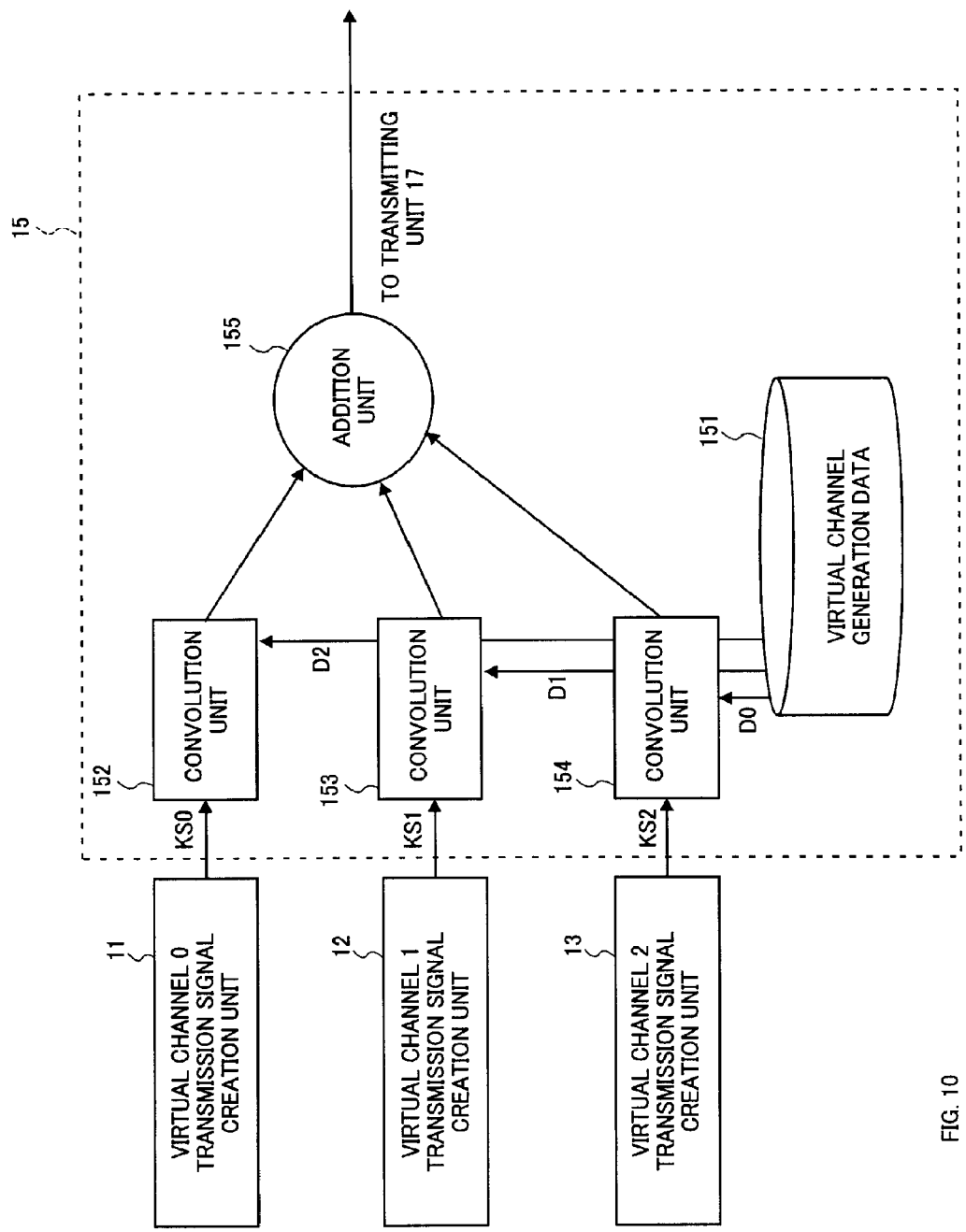
FIG. 10 is a diagram showing a virtual channel generation data convolution and addition unit.

FIG. 10 shows an example of the virtual channel generation data convolution and addition unit 15. The virtual channel generation data convolution and addition unit 15 in FIG. 10 comprises the virtual channel generation data storage unit 151, convolution units 152-154, and an addition unit 155.

The convolution unit 152 performs the convolution between the virtual channel 0 transmission signal KS0 and virtual channel generation data D2, the convolution unit 153 performs the convolution between the virtual channel 1 transmission signal KS1 and virtual channel generation data D1, and the convolution unit 154 performs the convolution between the virtual channel 2 transmission signal KS2 and virtual channel generation data D0.

The addition unit 155 adds up the signals from the convolution units 152-154 and outputs the result to the transmitting unit 17.

Meaning of convolution units: The transmission signal KS0, transmission signal KS1, and transmission signal KS2, added up by the addition unit 155, are transmitted via the transmission unit and the antenna. Because the transmission signal KS0, transmission signal KS1, and transmission signal KS2 are transmitted through the same space and are received by a receiver, the channel characteristics in the space are the same. However, because the transmission signal KS0, transmission signal KS1, and transmission signal KS2 are convoluted with different virtual channel data, the transmission signal KS0, transmission signal KS1, and transmission signal KS2 are equivalent to the signals received via different lines when viewed from the receiver.

This means that the receiving side detects the channel characteristics of each line, generates a simultaneous equation, and solves this simultaneous equation to correctly receive the transmission signal KS0, transmission signal KS1, and transmission signal KS2.

The following describes the convolution unit 152 with reference to FIG. 11.

In the description below, let the virtual channel data D2 for the virtual channel 0 transmission signal KS0 be (1j1−j) and let the virtual channel 0 transmission signal KS0 be (KS0$_0$, KS0$_1$, KS0$_2$, KS0$_3$, ... KS0$_{NM-1}$).

As shown in FIG. 11, the signal generated by adding up (KS0$_0$, KS0$_1$, KS0$_2$, KS0$_3$, ... KS0$_{NM-1}$), j (KS0$_0$, KS0$_1$, KS0$_2$, KS0$_3$, ... KS0$_{NM-1}$) after one time slot, (KS0$_0$, KS0$_1$, KS0$_2$, KS0$_3$, ... KS0$_{NM-1}$) after another one time slot, and −j (KS0$_0$, KS0$_1$, KS0$_2$, KS0$_3$, ... KS0$_{NM-1}$) after still another one time slot is output from the convolution unit 152.

Similarly, when the virtual channel data D2 for the virtual channel 1 transmission signal KS1 is (j11j), the signal generated by adding up j (KS1$_0$, KS1$_1$, KS1$_2$, KS1$_3$, ... KS1$_{NM-1}$), (KS1$_0$, KS1$_1$, KS1$_2$, KS1$_3$, ... KS1$_{NM-1}$) after one time slot, (KS1$_0$, KS1$_1$, KS1$_2$, KS1$_3$, ... KS1$_{NM-1}$) after another one time slot, and j (KS1$_0$, KS1$_1$, KS1$_2$, KS1$_3$, ... KS1$_{NM-1}$) after still another one time slot is output from the convolution unit 153.

Similarly, when the virtual channel generation data D0 for the virtual channel 2 transmission signal KS2 is (1jj1), the signal generated by adding up (KS2$_0$, KS2$_1$, KS2$_2$, KS2$_3$, ... KS2$_{NM-1}$), j (KS2$_0$, KS2$_1$, KS2$_2$, KS2$_3$, ... KS2$_{NM-1}$) after one time slot, j (KS2$_0$, KS2$_1$, KS2$_2$, KS2$_3$, ... KS2$_{NM-1}$) after another one time slot, and (KS2$_0$, KS2$_1$, KS2$_2$, KS2$_3$, ... KS2$_{NM-1}$) after still another one time slot is output from the convolution unit 154.

(Receiving Device)

The following describes a receiving device that receives the signals transmitted from the transmitting device in FIG. 9 whose transmission data amount is increased (N−P) times by the virtual channels on the transmitting side.

Figure 43:
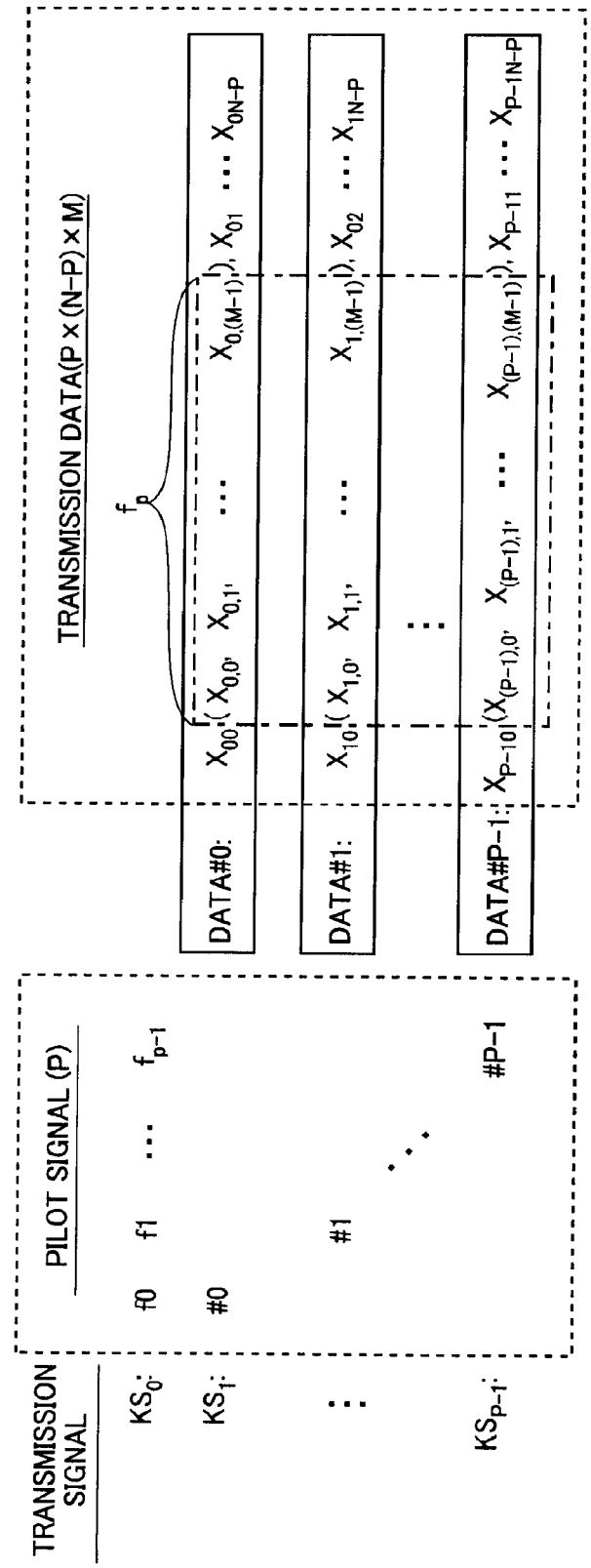
FIG. 43 is a diagram showing the configuration of a transmission signal.

FIG. 43 shows a generalized signal transmitted from a transmitter having the virtual channels shown in FIG. 9.

The signal configuration shown in FIG. 43 is that there are P pilot signals, there are P virtual channels, and the row vectors of a DFT matrix are the row vector $f_{N,0}$, row vector $f_{N,1}$ ... row vector $f_{N,N-1}$ such as the those defined in FIG. 4 (hereinafter called "row vector $f_0$, row vector $f_1$ ... row vector $f_{N-1}$" or "$f_0, f_1, \ldots f_{N-1}$").

For each virtual channel, the pilot signal and (N−P)×M pieces of data are transmitted as the transmission data.

From virtual channel #0, the Kronecker product of the row vector $f_0$ and the pilot signal is calculated and the pilot signal #0 is transmitted. At the same time, from virtual channel #0, the Kronecker product of the N−P pieces of transmission data ($X_{00}, X_{01}, \ldots, X_{0(N-P)}$) and each of the row vector $f_0$, row vector $f_1$ ... row vector $f_{N-1}$ is calculated and the result is transmitted as transmission data #0.

Because the length of each of the N−P pieces of transmission data is M, M×(N−P) data is transmitted from virtual channel #0.

Similarly, from virtual channel #1, the Kronecker product of the row vector $f_1$ and the pilot signal is calculated and the pilot signal #1 is transmitted. At the same time, from virtual channel #1, the Kronecker product of the N−P pieces of transmission data ($X_{10}, X_{11}, \ldots, X_{1(N-P)}$) and each of the row vector $f_0$, row vector $f_1$ ... row vector $f_{N-1}$ is calculated and the result is transmitted as transmission data signal #1.

•

•

Similarly, from virtual channel #P−1, the Kronecker product of the row vector $f_{P-1}$ and the pilot signal is calculated and the pilot signal #P−1 is transmitted. At the same time, from virtual channel #P−1, the Kronecker product of the N−P pieces of transmission data ($X_{P-10}, X_{P-11}, \ldots, X_{P-1(N-P)}$) and each of the row vector $f_0$, row vector $f_1$ ... row vector $f_{N-1}$ is calculated and the result is transmitted as transmission data signal #N−1.

Because different row vectors are used for the calculation of the Kronecker products, the pilot signal of each virtual channel can be received with no interference from other pilots and data.

However, the transmission data of the virtual channels share the N−P row vectors $f_0$–$f_{N-1}$ in calculating the Kronecker product.

As a result, if the receiving side takes no action, interference occurs in the MP pieces of data transmitted using the same row vector.

To solve this problem, the present invention provides a method that generates U (U≥P) virtual channels on the receiving side, branches the signals received via the antenna into the U virtual channels, processes the branched U signals to generate simultaneous linear equations, and solves the simultaneous linear equations for receiving transmission signals with no interference.

That is, (1) The transmitting side makes the signals pass through P different virtual channels created on the transmitting side, adds them up, and transmits the signals via the actual transmission channels, and the receiving side makes the reception signals pass through U (U≥P) different virtual channels.

(2) Because there are P virtual channels on the transmitting side and U virtual channels on the receiving side, the signals pass through the virtual channels in PU different ways. The receiving side detects all those PU virtual channel characteristics.

Out of the characteristics of all PU virtual channels, the receiving side detects at least P$^2$ virtual channels.

(3) Using the PU channel characteristics obtained by the receiving side and the outputs that are the data transmitted from the transmitting side and passing through the separate receiving-side virtual channels, the receiving side generates simultaneous linear equations and solves the simultaneous linear equations for receiving the transmission signals with no interference.

As the method for inputting signals to U (U≥P) separate virtual channels on the receiving side, there are two methods; one is an oversampling method and the other is a convolution method for performing the convolution between the signals and U pieces of virtual channel generation data in the same way the convolution is performed on the transmitting side.

Figure 12:
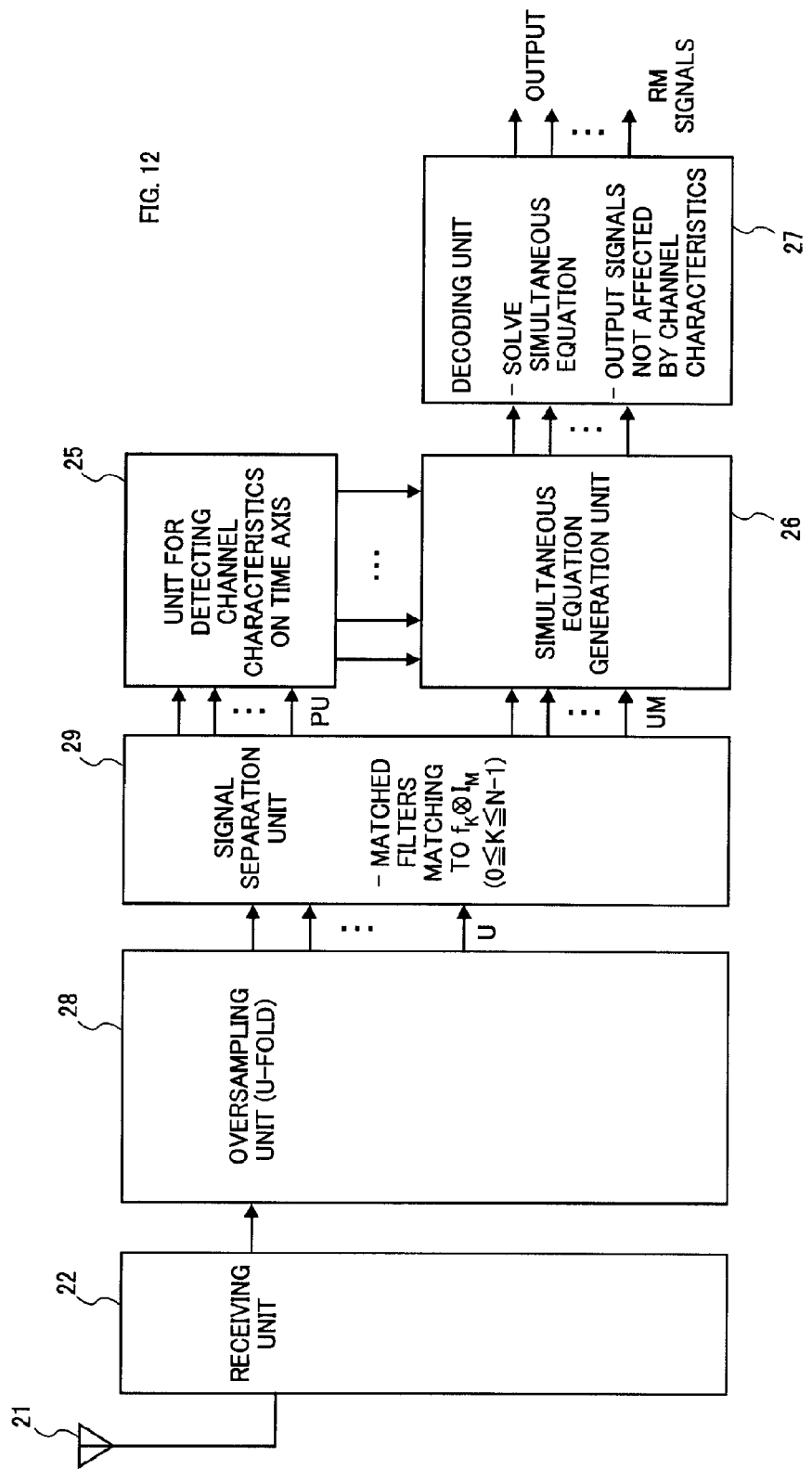
FIG. 12 is a diagram showing a receiving device (1).
Figure 44:
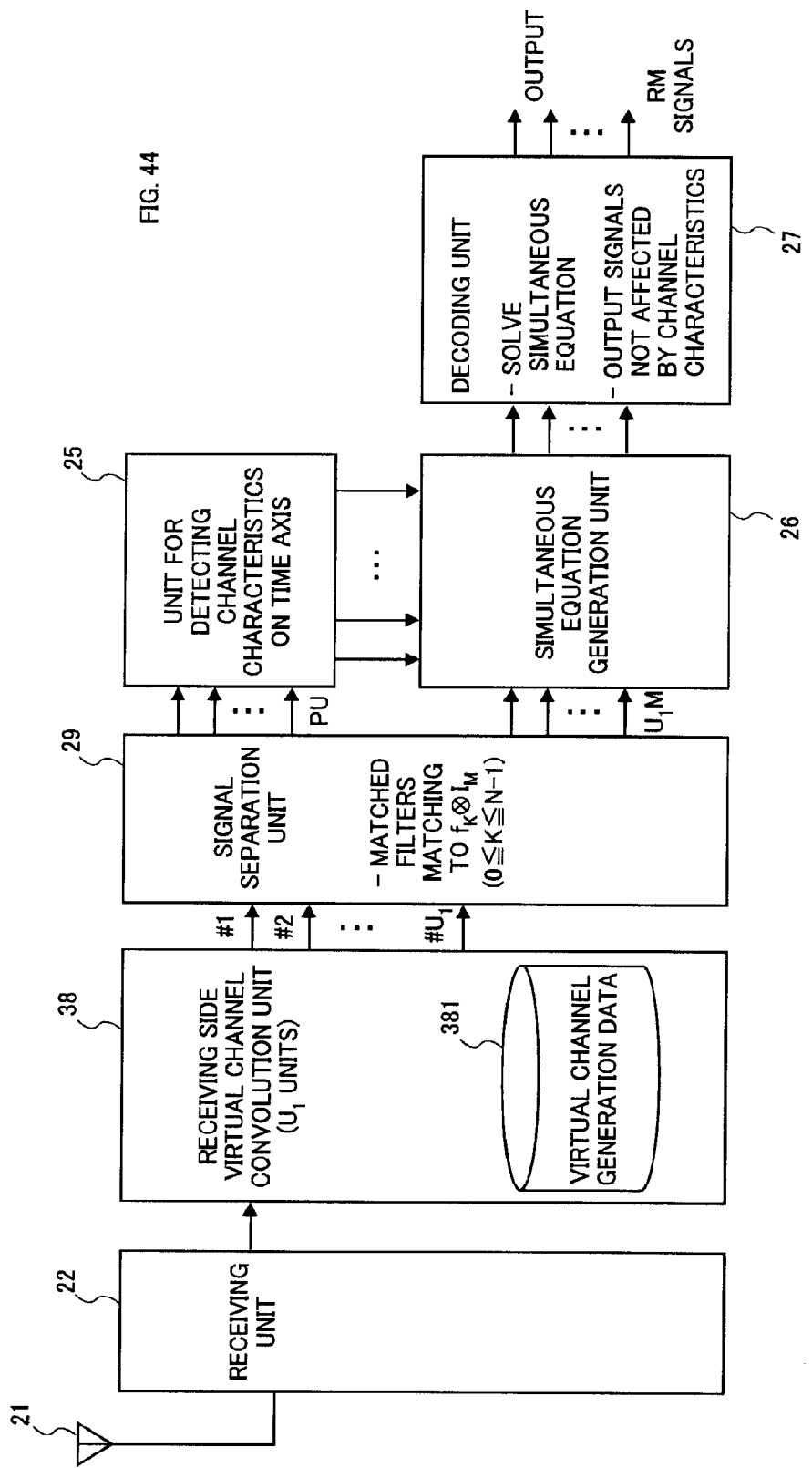
FIG. 44 is a diagram showing a receiving device (4)

FIG. 12 is a diagram showing the oversampling method, and FIG. 44 is a diagram showing the method for performing the convolution between the signal and virtual channel generation data.

(Receiving Device (1))

With reference to FIG. 12, the following describes a receiving device that performs oversampling for the signal transmitted from the transmitting device shown in FIG. 9. Note that FIG. 12 shows a general case, not a case when R(P)=3.

The receiving device shown in FIG. 12 comprises an antenna 21, a receiving unit 22 that converts the reception signal, detected by the antenna 21, to a baseband signal, an oversampling unit 28 that performs the U-fold oversampling of the reception signal that has been converted to the baseband signal by the receiving unit 22, a signal separation unit 29 that is configured by matched filters each of which matches to the Kronecker product of each of N row vectors, that is, vector $f_{N,0}$, vector $f_{N,1}$ ... vector $f_{N,N-1}$, and the vector $I_M$, for each sampling sequence that is output from the oversampling unit 28 and will be described later, a channel characteristics detection unit 25 that detects the channel characteristics on the time axis of all transmission lines from the transmitting side to the receiving side including the transmission characteristics of the transmitting device side, the transmission characteristics of the propagation space, and the transmission characteristics of the receiving device side (detects the channel characteristics on the time axis of all combinations of the virtual transmission channels and virtual reception antennas which will be described later), a simultaneous equation generation unit 26, and a decoding unit 27.

(Oversampling)

The oversampling unit 28 performs the U-fold oversampling of the reception signal converted to the baseband signal by the receiving unit 22.

The following schematically describes the oversampling of the signal P (1,−1,1,1) with reference to FIG. 13. Note that a signal to be oversampled by the oversampling unit 28 is not a signal composed of clear "0" and "1", such as the one shown in FIG. 13, but an unclear signal including line noises and thermal noises or a signal including leak signals from other channels.

Figure 13A:
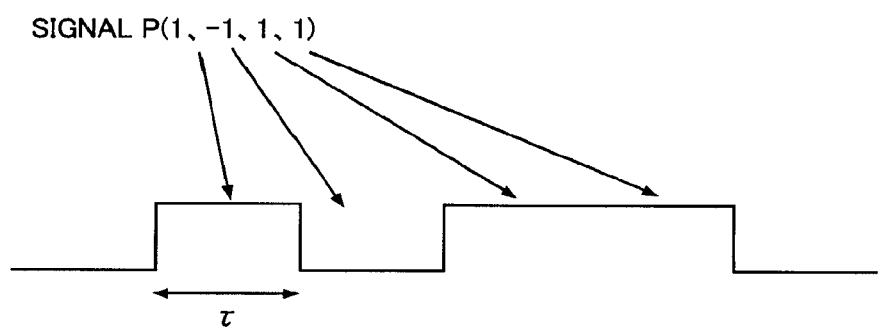
FIGS. 13A-B (collectively FIG. 13) are a diagram schematically showing oversampling.
Figure 13B:
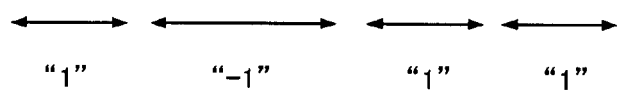

When the pitch interval of the signal P is τ(pitch frequency 1/τ) as shown in FIG. 13(A), oversampling at the frequency four time higher than the pitch frequency (interval of τ/4) changes the signal A (1, −1, 1, 1) to the signal B (1, 1, 1, 1, −1, −1, −1, −1, 1, 1, 1, 1, 1, 1, 1) as shown in FIG. 13(B).

If the oversampling timing is fixed, the oversampling interval need not be the same.

That is, this is described as follows using # that will be used later. For any #, the sampling interval in the same # is fixed (τ/4 in the figure), but the interval between #'s need not be fixed.

Oversampling may be performed, not only after the signal is converted to a baseband signal, but when the signal is a high-frequency or intermediate-frequency signal.

Figure 14:
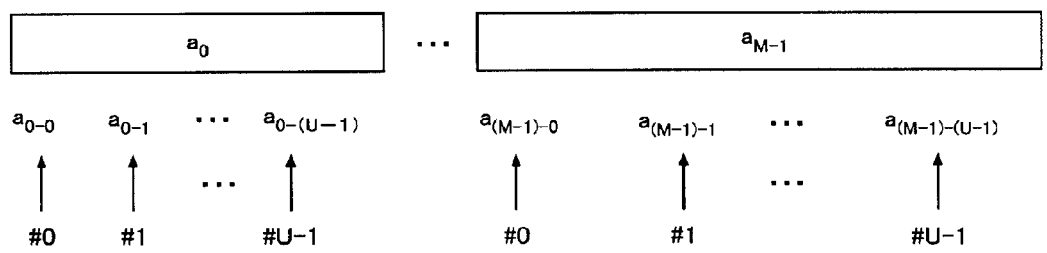
FIG. 14 is a diagram (1) showing virtual channels based on oversampling.

As shown in FIG. 14, the signal $(a_0, a_1, \ldots, a_{(M-1)})$ is received and oversampled. In this figure, the oversampling #0 signal for the signal $a_0$ is $a_{0\text{-}0}$, the oversampling #1 signal for the signal $a_0$ is $a_{0\text{-}1}, \ldots$, the oversampling #(U−1) signal for the signal $a_0$ is $a_{0\text{-}(U-1)}$, the oversampling #0 signal for the signal $a_1$ is $a_{1\text{-}0}$, the oversampling #1 signal for the signal $a_1$ is $a_{1\text{-}1}, \ldots$, the oversampling #(U−1) signal for the signal $a_1$ is $a_{1\text{-}(U-1)}, \ldots$, the oversampling #0 signal for the signal $a_{(M-1)}$ is $a_{(M-1)\text{-}0}$, the oversampling #1 signal for the signal $a_{(M-1)}$ is $a_{(M-1)\text{-}1}, \ldots$, and the oversampling #(U−1) signal for the signal $a_{(M-1)}$ is $a_{(M-1)\text{-}(U-1)}$.

FIG. 15 shows the signal sequences at the sampling point.

Sampling #0 sequence $a_{0\text{-}0} a_{1\text{-}0} \ldots a_{(M-1)\text{-}0}$

Sampling #1 sequence $a_{0\text{-}1} a_{1\text{-}1} \ldots a_{(M-1)\text{-}1}$

...

Sampling #U-1 sequence $a_{0\text{-}(U-1)} a_{1\text{-}(U-1)} \ldots a_{(M-1)\text{-}(U-1)}$ This indicates that, for each sampling sequence, there is a signal sequence corresponding to the transmission signal; in other words, it can be said that there is a virtual channel for each sampling sequence. This virtual channel, which is generated on the receiving side, is thought of as a virtual reception antenna.

Note that, because the pilot signals use different row vectors for each virtual channel, all pilot signals can be received by the receiving side with no interference. On the other hand, because transmission data does not use different row vectors for each virtual channel, interference occurs among multiple pieces of transmission data that use the same row vector.

In the present invention, the receiving side performs oversampling, generates the simultaneous linear equations for decoding the transmission data, and solves the simultaneous linear equations to eliminate the effect of channel characteristics of the lines for estimating the transmission data.

In this case, the oversampling U satisfies the following relation.

U≥R (Signal Separation)

The signal separation unit 29 inputs each sampling sequence, which is output by the oversampling unit 28, into the matched filters each of which matches to the Kronecker product of each of the N row vectors, that is, vector $f_{N,0}$, vector $f_{N,1}$ ... vector $f_{N,N-1}$, and the vector $I_M$. The signal separation unit 29 separates the signal for each matched filter that matches to the Kronecker product of each of the N row vectors, that is, vector $f_{N,0}$, vector $f_{N,1}$ ... vector $f_{N,N-1}$, and the vector $I_M$.

The resulting separated signals are the P pilot signal and N−P pieces of transmission data for each sampling sequence.

Next, the following describes the separation of the pilot signal in a sampling sequence #i(0≤i≤U−1).

In the virtual channel 0 (virtual transmission channel 0, virtual transmission antenna 0) transmission signal KS0, the pilot signal $X_0$

[Mathematical expression 14]

is inserted as Vector $f_{N,0} \otimes$ Pilot signal $X_0$.

Therefore, the pilot signal $X_0$ may be produced by inputting the sampling sequence into the matched filter of the Kronecker product of vector $f_{N,0}$ and vector $I_M$.

Similarly, the signal separation unit 29 inputs the signals, received via virtual channel 1 (virtual transmission channel 1, virtual transmission antenna 1) and via virtual channel 2 (virtual transmission channel 2, virtual transmission antenna 2), into the matched filter of the Kronecker product of vector $f_{N,1}$ and vector $I_M$ and into the matched filter of the Kronecker product of vector $f_{N,2}$ and vector $I_M$ to produce the pilot signal $X_1$ and the pilot signal $X_2W$ of virtual channel 1 and virtual channel 2.

The N−P pieces of transmission data can be produced in the same way as the pilot signal is extracted.

That is, the signal separation unit 29 inputs the signal, transmitted via virtual channel 0, into the matched filter of the Kronecker product of each of the N−P (in this case, P=3) row vectors $f_{N,P} - f_{N,N-1}$ and the vector $I_M$, to produce N−P pieces of transmission data $X_{0,P}$ ($x_{0,P,0}$, $x_{0,P,1}$, ..., $x_{0,P,(M-1)}$) ... $X_{0,N-1}$ ($x_{0,(N-1),0}$, $x_{0,(N-1),1}$, ..., $x_{0,(N-1),(M-1)}$.

Similarly, the signal separation unit 29 produces (N−P) pieces of transmission data, transmitted via virtual channel 1 and virtual channel 2, by inputting the signal, transmitted via virtual channel 1 and virtual channel 2, into the matched filters of the Kronecker product of each of N−P row vectors $f_{N,P} - f_{N,N-1}$ and the vector $I_M$.

Note that, because the pilot signals use different row vectors for each virtual channel (each virtual transmission channel, each virtual transmission antenna), all pilot signals can be received by the receiving side with no interference. On the other hand, because transmission data does not use different row vectors for each virtual channel, interference will occur among multiple pieces of transmission data that use the same row vector if no action is taken.

In the present invention, the transmitting side transmits different pilot signals onto virtual channels (virtual transmission channels, virtual transmission antennas), one for each. The receiving side, which receives those pilot signals, can detect the channel characteristics including the channel characteristics of all virtual channels. Those channel characteristics allow the receiving side to detect transmission data with no interference.

(Detection of Channel Characteristics)

In the present invention, one pilot signal is inserted for each virtual channel (virtual transmission antenna) as described below.

[Mathematical expression 15]

The pilot signal $X_0$ is inserted into the virtual channel 0 transmission signal KS0 as Vector $f_{N,0} \otimes$ Pilot signal $X_0$, and no signal is related to $f_{N,1}$ and the vector $f_{N,2}$.

Similarly, the pilot signal $X_1$ is inserted into the virtual channel 1 transmission signal KS1 as Vector $f_{N,1} \otimes$ Pilot signal $X_1$, and no signal is related to the vector $f_{N,0}$ and the vector $f_{N,2}$.

Similarly, the pilot signal $X_2$ is inserted into the virtual channel 2 transmission signal KS2 as Vector $f_{N,2} \otimes$ Pilot signal $X_2$, and no signal is related to the vector $f_{N,0}$ and the vector $f_{N,1}$.

Therefore, the channel characteristics of #j virtual channel (virtual transmission antenna) can be obtained by detecting #j (0≤j≤N−1) pilot signal.

The present invention provides each sampling sequence with a matched filter for the Kronecker product of vector $f_0$ and vector $I_M$ a matched filter for the Kronecker product of vector $f_1$ and vector $I_M$

•

• and a matched filter for the Kronecker product of vector $f_{p-1}$ and vector $I_M$.

In other words, each of the virtual reception antennas #0-#(U−1) has a matched filter for the Kronecker product of vector $f_0$ and vector $I_M$ a matched filter for the Kronecker product of vector $f_1$ and vector $I_M$

•

• and a matched filter for the Kronecker product of vector $f_{p-1}$ and vector $I_M$.

Note that the output, generated by inputting the signal, received from the virtual reception antenna #i (0≤i≤U−1), into the matched filter for the Kronecker product of vector $f_j$(0≤j≤P−1) and vector $I_M$ is the characteristics of the virtual channel from the virtual transmission antenna j to the virtual reception antenna i.

Therefore, at the virtual reception antenna #i (0≤i≤U−1) (that is, oversampling #i sequence), the virtual channel characteristics between all virtual transmission antennas and virtual reception antenna #i can be obtained.

The channel characteristics detection unit 25 performs this processing at all virtual reception antennas to obtain the virtual channel characteristics between all virtual transmission antennas and all virtual reception antennas.

Because the channel characteristics are detected on the time axis in the present invention, the channel characteristics detection unit 25 can detect the channel characteristics on the time axis on all transmission lines from the transmitting side to the receiving side including the transmission characteristics of the transmitting device side, the transmission characteristics of the propagation space, and the transmission characteristics of the receiving device side.

In the present invention, the channel characteristics on the time axis are detected and the time response at digital signal transmission time is detected.

The channel characteristics on the time axis are the channel characteristics of all transmission lines from the transmitting side to the receiving side, which include the transmission characteristics of the transmitting device side, the transmission characteristics of the propagation space, and the transmission characteristics of the receiving device side, including those of multipath responses.

The channel characteristics on the time axis are represented in the form similar to that of the multipath characteristics.

(Generation of Simultaneous Equations)

The simultaneous equation generation unit 26 generates simultaneous equations, such as those shown in Expression (17), based on the reception signal generated via oversampling and on the channel characteristics on the time axis detected by the channel characteristics detection unit 25.

In practice, the simultaneous equation generation unit 26 generates $T_0$, $T_1$, and $T_2$ by adding up the transmission data related to the corresponding row vectors as shown in FIG. 16 and generates the simultaneous equations for each of $T_0$, $T_1$, and $T_2$.

(Decoding)

The simultaneous equation generation unit 26 generates the simultaneous equations, such as those in Expression (17), based on the reception signals of the three virtual channels separated by the channel separation unit 29 and on the channel characteristics on the time axis detected by the channel characteristics detection unit 25.

The decoding unit 27 solves the simultaneous equations generated by the simultaneous equation generation unit 26. Because the channel characteristics on the time axis of all transmission lines from the transmitting side to the receiving side, including the transmission characteristics of the transmitting device side, the transmission characteristics of the propagation space, and the transmission characteristics of the receiving device side, are reflected on the simultaneous equations generated by the simultaneous equation generation unit 26, the solution can decode the transmission data not affected by the transmission characteristics of the transmitting device side, the transmission characteristics of the propagation space, and the transmission characteristics of the receiving device side.

In other words, solving the simultaneous equations in Expression (17) gives the signals from which the effect of the channel characteristics on the time axis of the transmission lines is removed.

As described above, the virtual channels, generated from the virtual channel generation data, and the virtual channels, generated for each oversampling sequence, are obtained. The former are virtual channels generated on the transmitting side, the latter are virtual channels generated on the receiving side, and those virtual channels are generated independently. Thus, it can be said that the virtual transmission antennas are generated by the former and that the virtual reception antennas are generated by the latter.

When three virtual channels are generated from the virtual channel generation data (P=3) and U virtual channels are generated for each oversampling sequence, the number of channels is 3U.

Therefore, for the 3U channels, the channel characteristics detection unit 25 detects the channel characteristics on the time axis of all transmission lines from the transmitting side to the receiving side, including the transmission characteristics of the transmitting device side, the transmission characteristics of the propagation space, and the transmission characteristics of the receiving device side.

(Receiving Device (2))
(Method for Generating Virtual Channels by Convolution Performed on the Receiving Side)

Next, with reference to FIG. 44, the following describes a method for generating virtual channels on the receiving side in which reception signals are convoluted with virtual channel generation data.

A receiving device in FIG. 44 comprises an antenna 21, a receiving unit 22 that converts the reception signal, detected by the antenna 21, to a baseband signal, a receiving side virtual channel convolution unit 38 that performs the convolution between the reception signals, converted to a baseband signal by the receiving unit 22, and the $U_1$ pieces of virtual channel generation data, a signal separation unit 29 that is configured by matched filters each of which matches to the Kronecker product of each of N row vectors, that is, vector $f_{N,0}$, vector $f_{N,1}$ ... vector $f_{N,N-1}$, and the vector $I_M$, for each of the $U_1$ virtual channels output from the receiving side virtual channel convolution unit 38, a channel characteristics detection unit 25, a simultaneous equation generation unit 26, and a decoding unit 27.

In FIG. 44, the components other than the receiving side virtual channel convolution unit 38, that is, the antenna 21, receiving unit 22, signal separation unit 29, channel characteristics detection unit 25, simultaneous equation generation unit 26, and decoding unit 27 are the same as those in FIG. 12.

The receiving side virtual channel convolution unit 38 comprises a virtual channel generation data storage unit 381 (need not always comprise the virtual channel generation data storage unit 381) and performs the convolution between the reception signal, converted to a baseband signal by the receiving unit 22, and one of virtual channel generation data stored in the virtual channel generation data storage unit 381.

When the reception signal is RS and the virtual channel generation data is $E_1-E_{U1}$, the receiving side virtual channel convolution unit 38 performs the convolution between the reception signal RS and the virtual channel generation data $E_1-E_{U1}$ and separately outputs signal #1 generated by the convolution between the reception signal RS and virtual channel generation data $E_1$, signal #2 generated by the convolution between the reception signal RS and virtual channel generation data $E_{12}$,

•

• and signal #$U_1$ generated by the convolution between the reception signal RS and virtual channel generation data $E_{U1}$.

When the $U_1$ outputs are received from the receiving side virtual channel convolution unit 38, the signal separation circuit separates the signals via the matched filters each of which matches to the Kronecker product of each of the N row vectors, that is, vector $f_{N,0}$, vector $f_{N,1}$, ..., and vector $f_{N,N-1}$, and vector $I_M$.

The channel characteristics detection unit 25, simultaneous equation generation unit 26, and decoding unit 27 are the same as those in FIG. 12 and so the description is omitted here.

(Number of Antennas)

In the above description, there is one transmission antenna and one reception antenna, and there are R virtual channel transmission antennas and U virtual channel reception antennas.

Assume that the number of virtual channels is R, the number of virtual channel transmission antennas is T, the number of virtual channel reception antennas is V, the number of actual transmission antennas is TA, and the number of actual reception antennas is RA.

In a typical system,

Number of virtual channels R=Number of virtual channel reception antennas U and

Number of actual transmission antennas TA=Number of actual reception antennas RA=1.

The present invention is not limited to the case described above.

For example, there are the following four cases, case 1-case 4.

(1) Case 1

Transmitting side: The number of actual transmission antennas is R.

Receiving side: The number of actual reception antennas is 1, and the number of virtual channel reception antennas is R.

(2) Case 2

Transmitting side: The number of actual transmission antennas is 1, and the number of virtual channel transmission antennas is R.

Receiving side: The number of actual reception antennas is R.

(3) Case 3

Transmitting side: The number of actual transmission antennas is R.

Receiving side: The number of actual reception antennas is R.

(4) Case 4

Transmitting side: The number of actual transmission antennas is TA.

The number of virtual channel transmission antennas is (R-TA).

Receiving side: The number of actual reception antennas is RA.

The number of virtual channel reception antennas is (R-RA).

In the embodiment described above, the number of virtual transmission antennas is "3".

Figure 17:
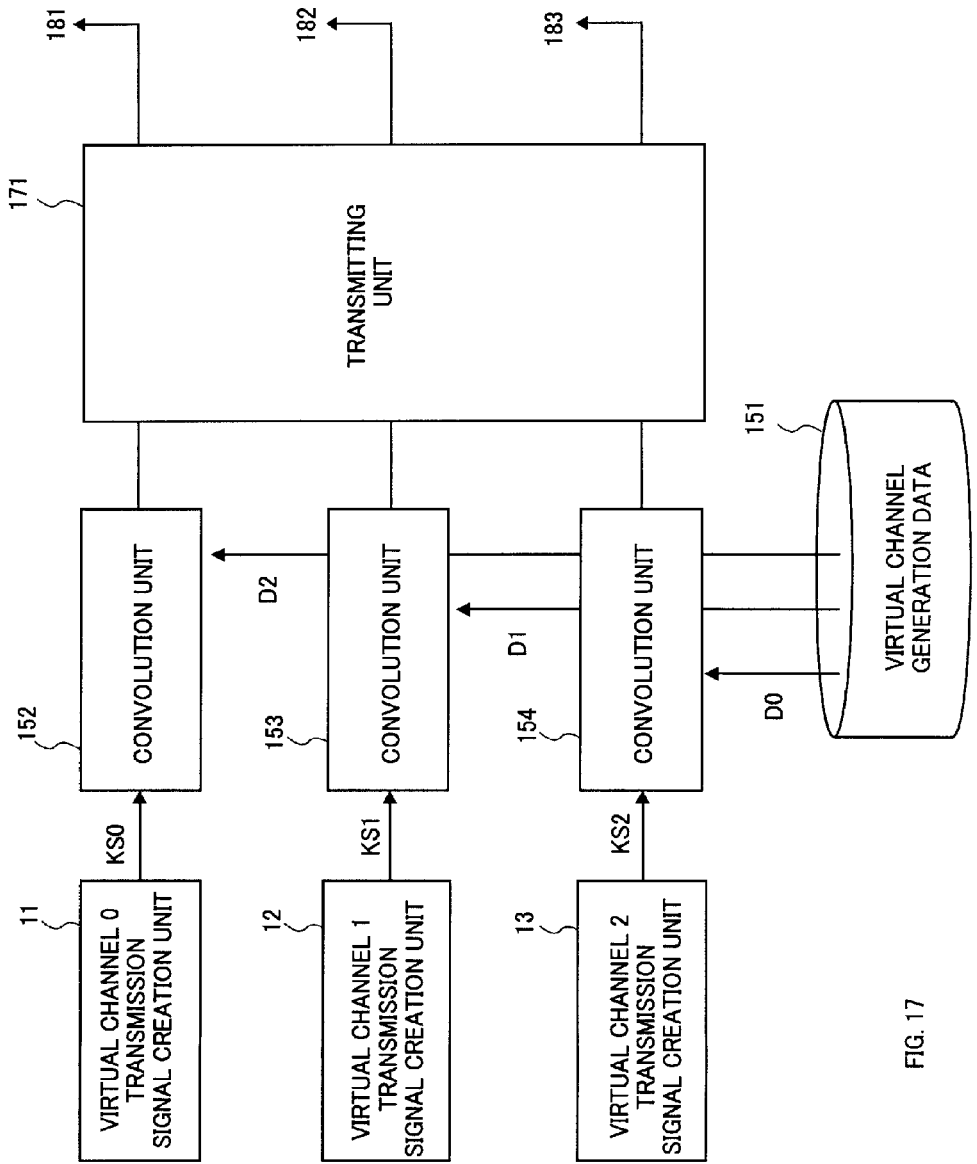
FIG. 17 is a diagram showing a transmitting device (2).

FIG. 17 is a diagram showing the case in which the number of actual transmission antennas R on the transmitting side is equal to the number of virtual channels R.

A transmitting device in FIG. 17 comprises a virtual channel 0 transmission signal creation unit 11, a virtual channel 1 transmission signal creation unit 12, a virtual channel 2 transmission signal creation unit 13, virtual channel generation data 151, convolution units 152-154, a transmitting unit 171, and an antenna 181.

The convolution unit 152 performs the convolution between the virtual channel 0 transmission signal KS0 and virtual channel generation data D2, the convolution unit 153 performs the convolution between the virtual channel 1 transmission signal KS1 and virtual channel generation data D1, and the convolution unit 154 performs the convolution between the virtual channel 2 transmission signal KS2 and virtual channel generation data D0.

The transmitting unit 171 converts the signals (virtual channel 0 transmission signal, virtual channel 1 transmission signal, virtual channel 2 transmission signal), which are received from the convolution units 152-154, to the high frequency signals and transmits them via separate antennas 181, 182, and 183.

Figure 18:
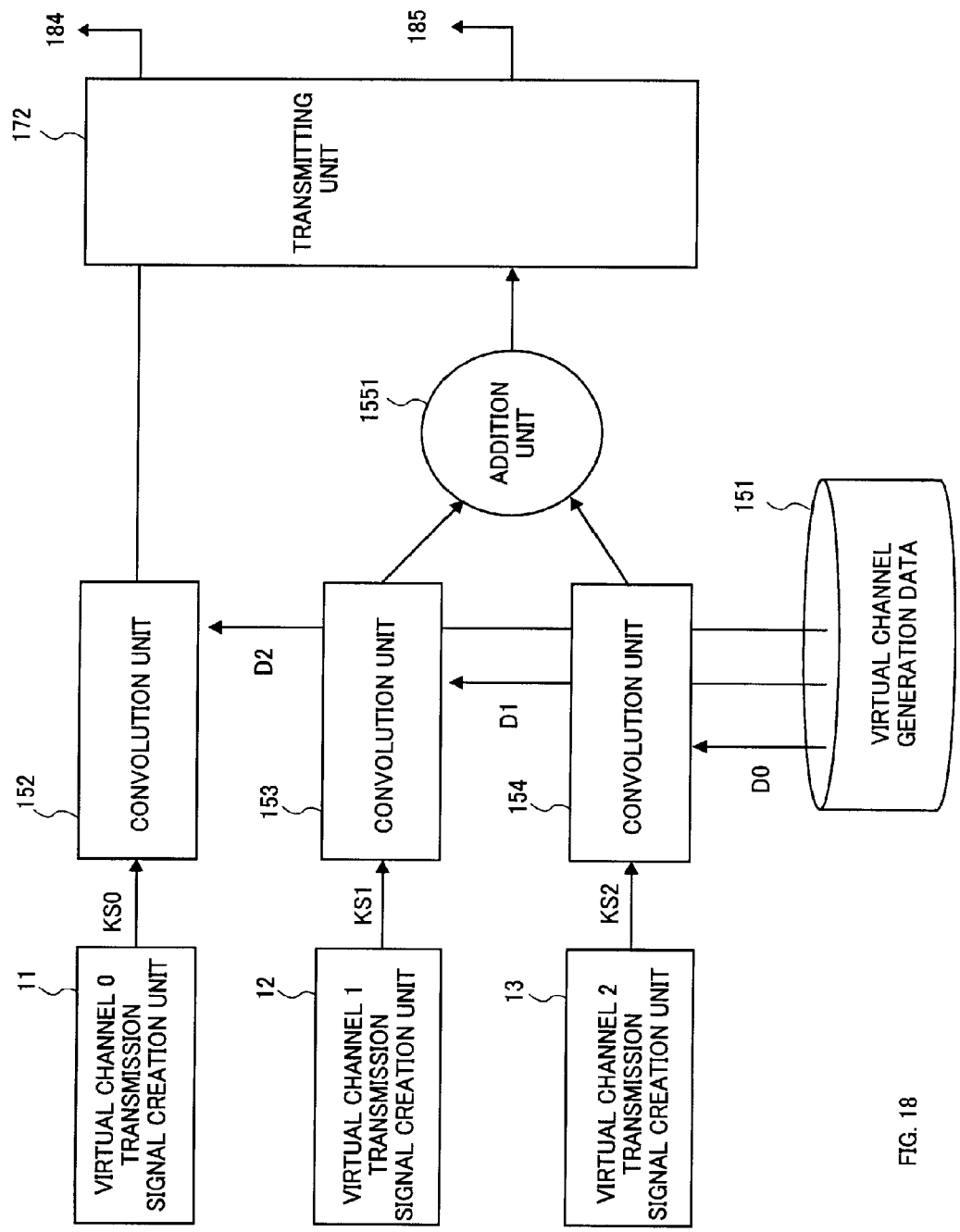
FIG. 18 is a diagram showing a transmitting device (3).

FIG. 18 is a diagram showing the case in which the number of actual transmission antennas R on the transmitting side is smaller than the number of virtual channels R and, when the number of actual transmission antennas is TA, the number of virtual channel transmission antennas is R-TA.

The transmitting unit may be provided, one for each of the antennas 181-183. In this case, three users may use separate antennas.

The transmitting device in FIG. 18 comprises a virtual channel 0 transmission signal creation unit 11, a virtual channel 1 transmission signal creation unit 12, a virtual channel 2 transmission signal creation unit 13, virtual channel generation data 151, convolution units 152-154, an addition unit 1551, a transmitting unit 172, and antennas 184 and 185.

The convolution unit 152 performs the convolution between the virtual channel 0 transmission signal KS0 and the virtual channel generation data D2, the convolution unit 153 performs the convolution between the virtual channel 1 transmission signal KS1 and the virtual channel generation data D1, and the convolution unit 154 performs the convolution between the virtual channel 2 transmission signal KS2 and the virtual channel generation data D0.

The addition unit 1551 adds up the signals from the convolution units 153 and 154 and outputs the result to the transmitting unit 17.

The output of the convolution unit 152 is output directly to the transmitting unit 17.

The transmitting unit 171 converts the signal (virtual channel 0 transmission signal) from the convolution unit 152 and the signal (virtual channel 1 transmission signal, virtual channel 2 transmission signal) from the addition unit 151 to the high frequency signal and transmits the converted high frequency signal via the antennas.

The virtual channel 0 transmission signal is transmitted from the antenna 184, and the virtual channel 1 transmission signal and the virtual channel 2 transmission signal are transmitted from the antenna 185.

Figure 19:
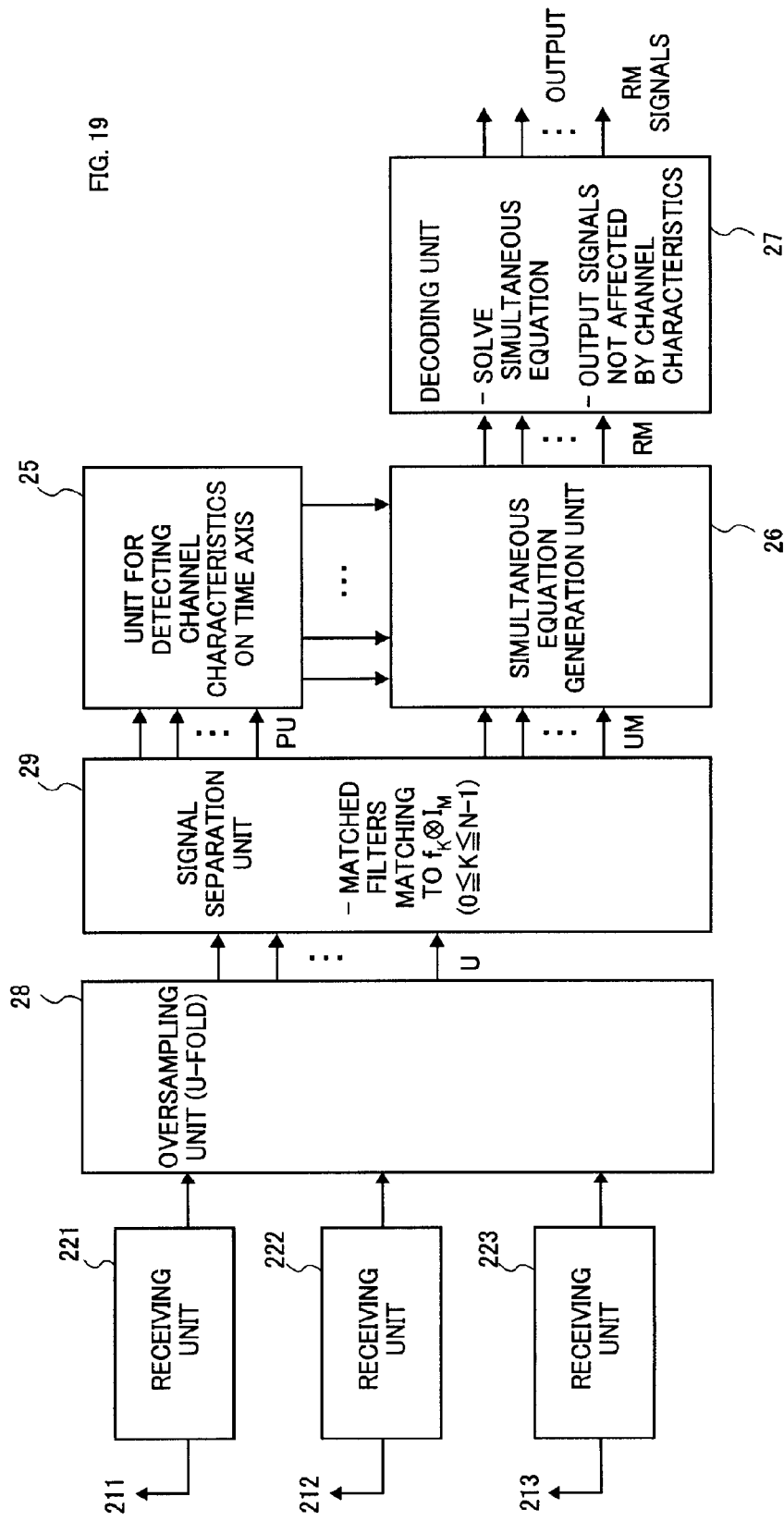
FIG. 19 is a diagram showing a receiving device (2).

FIG. 19 is a diagram showing the case in which the number of actual transmission antennas R on the receiving side is equal to the number of virtual channels R.

The transmitting units may be provided for the antennas 181-183, one for each. In this case, two users may use separate antennas.

FIG. 19 is a diagram showing that the signal transmitted from the transmitting device in FIG. 9, FIG. 17, or FIG. 18 is received via the antennas 211-213 and receiving unit 221-223.

The receiving device in FIG. 19 comprises the antennas 211-213, an oversampling unit 28 that oversamples the reception signals detected by the antennas 211-213, a signal separation unit 29 that is configured by matched filters matching to the N row vectors, that is, vector $f_{N,0}$, vector $f_{N,1}$ ... vector $f_{N,N-1}$, for separating the output of the oversampling unit 28 into the signal for each oversampling sequence, a channel characteristics detection unit 25 that detects the channel characteristics on the time axis on all transmission lines from the transmitting side to the receiving side including the transmission characteristics of the transmitting device side, the transmission characteristics of the propagation space, and the transmission characteristics of the receiving device side, a simultaneous equation generation unit 26, and a decoding unit 27.

The oversampling unit 28 may also provided for the receiving units 221-223, one for each.

When the receiving units 221-223 are used by different users, the receiving device is configured to provide the oversampling unit for each user.

Figure 20:
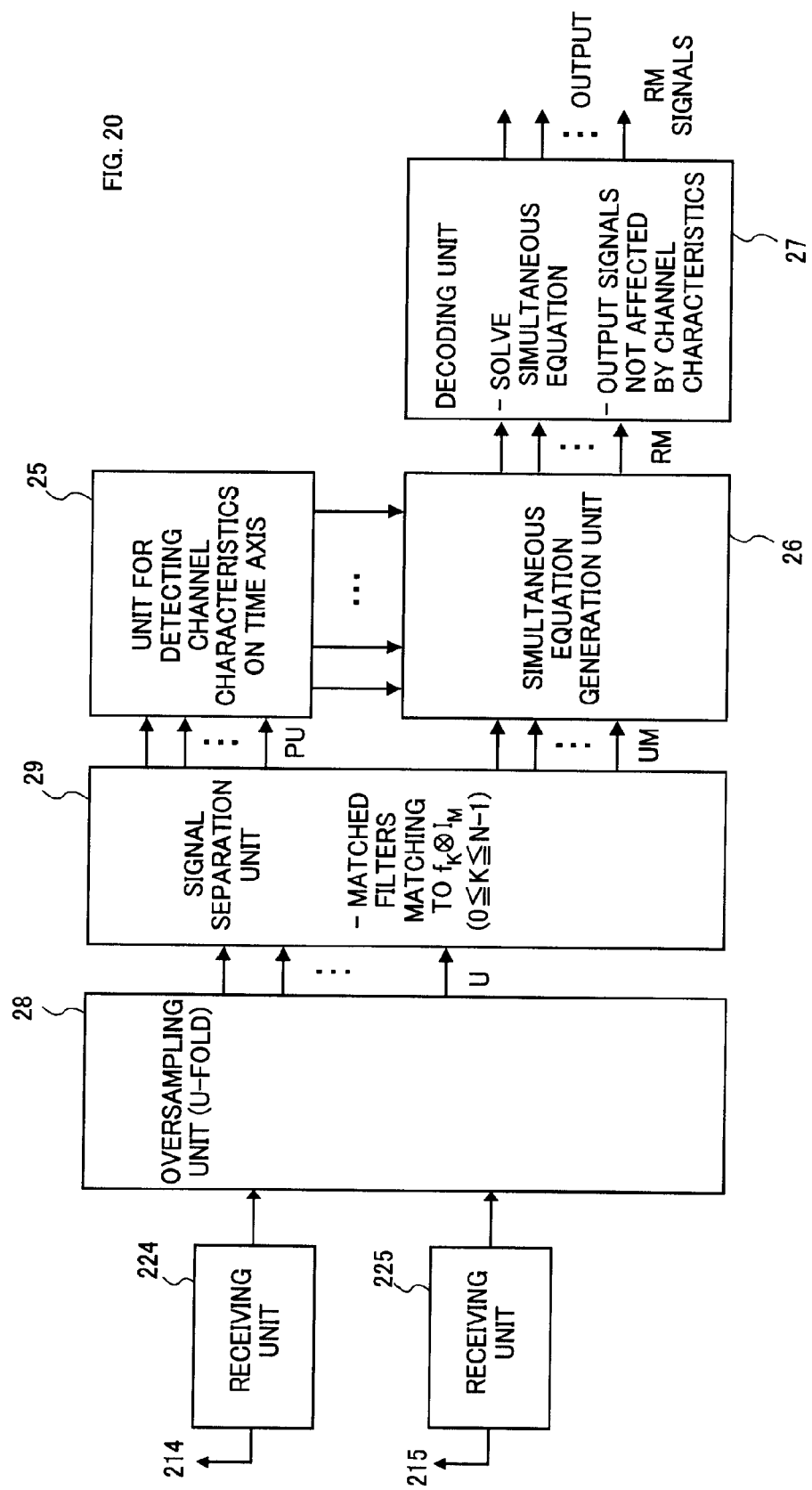
FIG. 20 is a diagram showing a receiving device (3).

FIG. 20 is a diagram showing the case in which the number of actual transmission antennas R on the receiving side is smaller than the number of virtual channels R.

FIG. 20 is a diagram showing that the signal transmitted from the transmitting device in FIG. 9, FIG. 17, or FIG. 18 is received via antennas 214 and 215 and receiving units 224 and 225.

The receiving device in FIG. 20 comprises the antennas 214 and 215, receiving units 224 and 225 that convert the reception signal detected by the antennas 214 and 215 to the baseband signal, an oversampling unit 28, a signal separation unit 29 that is configured by matched filters matching to the N row vectors, that is, vector $f_{N,0}$, vector $f_{N,1}$ ... vector $f_{N,N-1}$, for separating the signal into the signal for each oversampling sequence, a channel characteristics detection unit 25 that detects the channel characteristics on the time axis on all transmission lines from the transmitting side to the receiving side including the transmission characteristics of the transmitting device side, the transmission characteristics of the propagation space, and the transmission characteristics of the receiving device side, a simultaneous equation generation unit 26, and a decoding unit 27.

Figure 21:
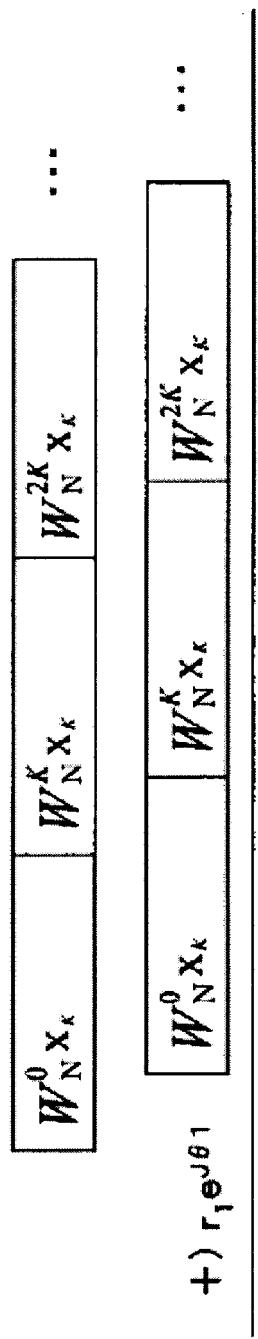
FIG. 21 is a diagram showing the effect of multipath characteristics.

According to the above description, case 1 described above is the case in which the transmitting side is the device shown in FIG. 17 and the receiving side is the device shown in FIG. 12, case 2 described above is the case in which the transmitting side is the device shown in FIG. 9 and the receiving side is the device shown in FIG. 19, case 3 described above is the case in which the transmitting side is the device shown in FIG. 17 and the receiving side is the device shown in FIG. 21, and case 4 described above is the case in which the transmitting side is the device shown in FIG. 18 and the receiving side is the device shown in FIG. 20.

If the number of virtual channel transmission antennas T=the number of virtual channel reception antennas U, the receiving side generates one simultaneous equation similar to Expression (17).

However, if the number of virtual channel transmission antennas T<the number of virtual channel reception antennas V, the receiving side can select T antennas from all virtual antennas V and generate the simultaneous equations.

The number of selections is given by the following expression.

[Mathematical expression 16]

$$_vC_T$$

As a result, the receiving side can generate multiple simultaneous equations similar to Expression (17).

In this case, because multiple estimation results are obtained for the same transmission data, the decision by majority or some other method may be used to estimate probable transmission data to reduce the bit error rate.

Even in a case other than when the number of virtual channel transmission antennas T<the number of virtual channel reception antennas V, multiple simultaneous equations may be generated by not transmitting information onto one or more virtual antennas on the transmitting side as in the case when the number of virtual channel transmission antennas T<the number of virtual channel reception antennas V.

(Pilot Signal)

[Mathematical expression 17]

When the pilot signal is $X_K(x_{k0}, x_{K1}, x_{K2}, \ldots, x_{K(M-1)})$ and the pilot signal is the Kth row vector of the Nth order DFT matrix $(W_N^0, W_N^k, W_N^{2k}, \ldots, W_N^{(N-1)k})$, the pilot signal is as shown below and there is a need to consider the effect of the multiplication of $re^{j\Theta 1}$ such as the one shown in FIG. 21.

$$S_k = f_k \otimes X_k$$
$$= (W_N^0 x_{k0}, W_N^0 x_{k1}, W_N^0 x_{k2}, \ldots, W_N^0 x_{k(M-1)},$$
$$W_N^k x_{k0}, W_N^k x_{k1}, W_N^k x_{k2}, \ldots, W_N^k x_{k(M-1)},$$
$$\vdots$$
$$W_N^{(N-1)k} x_{k0}, W_N^{(N-1)k} x_{k1}, W_N^{(N-1)k} x_{k2}, \ldots, W_N^{(N-1)k} x_{k(M-1)},)$$

[Mathematical expression 18]

To avoid this problem, the pilot signal $X_K'(x_{k0}, W_{MN}^1 x_{k1}, W_{MN}^2 x_{k2}, \ldots W_{MN}^{(M-1)} x_{k(M-1)})$ is used instead of the pilot signal $X_K(x_{K0}, x_{K1}, x_{K2}, \ldots x_{K(M-1)})$. The result is as shown below and, in this case, there is no need to consider the effect of the multiplication of $re^{j\Theta 1}$ such as the one shown in FIG. 21.

$$S_k' = (f_k \otimes X_k')$$
$$= (W_{MN}^0 x_{k0}, W_{MN}^1 x_{k1}, W_{MN}^2 x_{k2}, \ldots, W_{MN}^{(M-1)} x_{k(M-1)},$$
$$W_{MN}^M x_{k0}, W_{MN}^{M+1} x_{k1}, W_{MN}^{M+2} x_{k2}, \ldots, W_{MN}^{(2M-1)} x_{k(M-1)},$$
$$\vdots$$
$$W_{MN}^{M(N-1)} x_{k0}, W_{MN}^{M(N-1)+1} x_{k1}, W_{MN}^{M(N-1)+2} x_{k2}, \ldots,$$
$$W_N^{MN-1} x_{k(M-1)},)$$

[Mathematical expression 19]

In addition, the pilot signal $X_K''(x_{k0}, W_{MN}^u x_{k1}, W_{MN}^{2u} x_{k2}, \ldots W_{MN}^{u(M-1)} x_{k(M-1)})$ may be used instead of the pilot signal $X_K'(x_{k0}, W_{MN}^1 x_{k1}, W_{MN}^2 x_{k2}, \ldots W_{MN}^{(M-1)} x_{k(M-1)})$.

Note that such a problem is not generated because all the elements of the row vector $f_0 (W_N^0, W_N^0, \ldots, W_N^0)$ are equal to $1/\sqrt{N}$.

Therefore, if there is no need to make the channel estimation for the virtual channels with the use of the pilot signal for each transmission, the channel estimation can be made without using the pilot signal $X_K'$ and the pilot signal $X_K''$ by allocating the row vector $f_0$ alternately for the virtual channels.

In this case, for each virtual channel (virtual transmission antenna), the channel characteristics of the virtual channels, detected by receiving the pilot signal, are used as the channel characteristics of the virtual channels when the pilot signal is not received.

Figure 22:
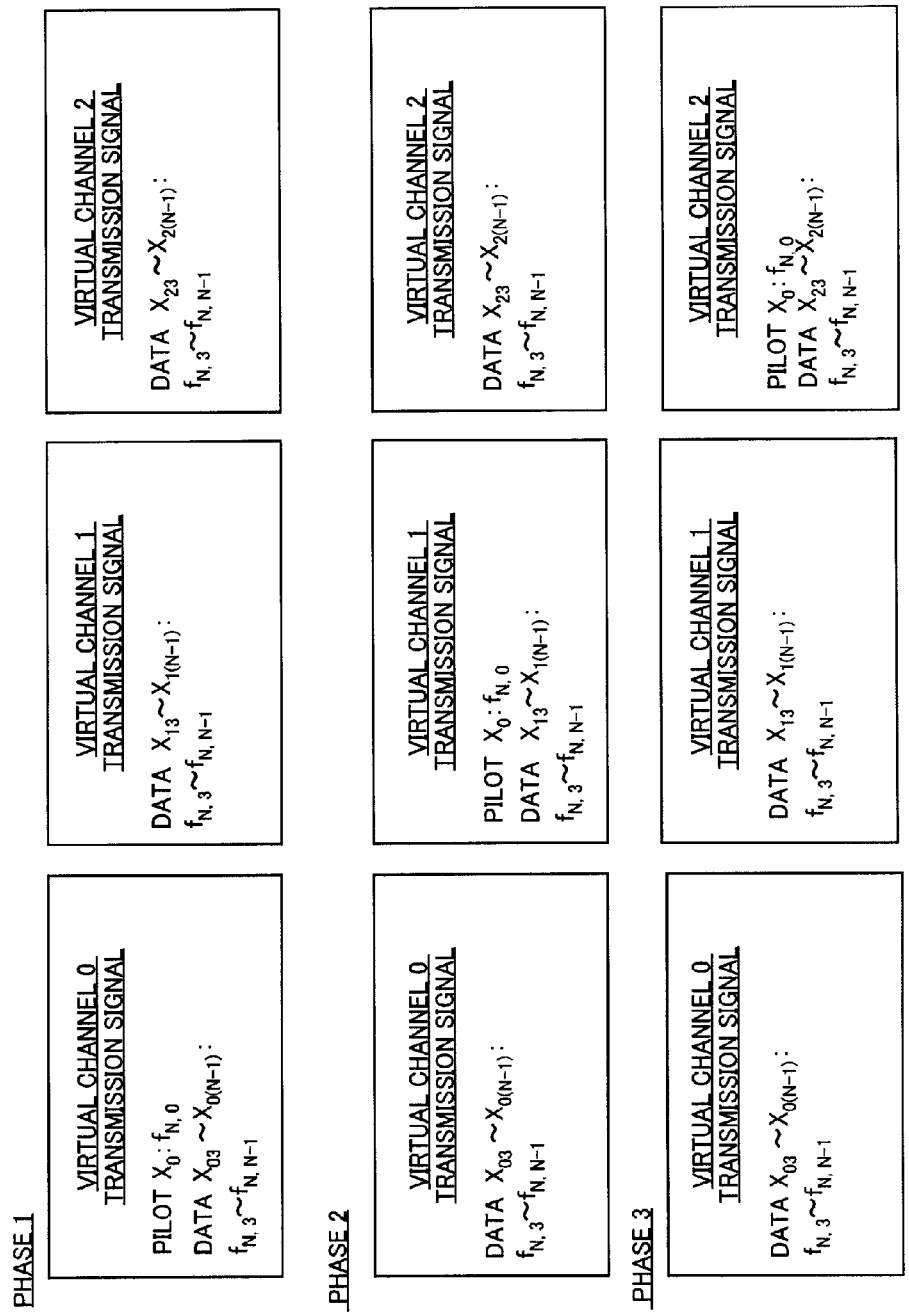
FIG. 22 is a diagram showing the transmission of pilot signals.

FIG. 22 is a diagram showing the case where the virtual channel (virtual transmission antenna) R=3.

In phase 1, the pilot signal $f_0$ is transmitted over virtual channel 0, and the pilot signal is not transmitted over virtual channels 1 and 2.

In phase 2, the pilot signal $f_0$ is transmitted over virtual channel 1, and the pilot signal is not transmitted over virtual channels 0 and 2.

At this time, the channel characteristics detected in phase 1 are used as the channel characteristics of virtual channel 0.

In phase 3, the pilot signal $f_0$ is transmitted over virtual channel 2, and the pilot signal is not transmitted over virtual channels 0 and 1.

At this time, the channel characteristics detected in phase 1 are used as the channel characteristics of virtual channel 0, and the channel characteristics detected in phase 2 are used as the channel characteristics of virtual channel 1.

Phase 3 is followed by phase 1, and phase 1, phase 2, and phase 3 are repeated in a circular fashion.

In phase 1 that follows, the channel characteristics detected in this phase 1 are used as the channel characteristics of virtual channel 0, the channel characteristics detected in the previous phase 2 are used as the channel characteristics of virtual channel 1, and the channel characteristics detected in the previous phase 3 are used as the channel characteristics of virtual channel 2.

On the transmitting side, it is only required that P pilot sequences, each having a spectrum in the shape of the teeth of a comb, do not interfere with each other and with the data signal.

It is only required for the data signal to have a spectrum in the shape of the teeth of a comb so that one piece of data transmitted over a virtual channel does not interfere with another piece of data transmitted over the same virtual channel. That is, a non-DFT row vector may be used to generate signals from data.

On the receiving side, it is only required that a sequence of matched filters, which have a synchronous spectrum in the shape of the teeth of a comb, are used to receive each of the P pilot signals.

A sequence of any matched filters, which have a periodic spectrum in the shape of the teeth of a comb, may be used to receive the data signal, and a non-DFT row vector may also be used.

(Transmission Data)

In the signal configuration in FIG. 5 to FIG. 7, N–P pieces of transmission data $X_{0,P} (x_{0,P,0}, x_{0,P,1}, \ldots, x_{0,P,(M-1)}) \ldots X_{0,N-1} (x_{0,(N-1),0}, x_{0,(N-1),1}, \ldots, x_{0,(N-1),(M-1)})$ are transmitted over virtual channel 0, N–P pieces of transmission data $X_{1,P} (x_{1,P,0}, x_{1,P,1}, \ldots, x_{1,P,(M-1)}) \ldots X_{1,N-1} (x_{1,(N-1),0}, x_{1,(N-1),1}, \ldots, x_{1,(N-1),(M-1)})$ are transmitted over virtual channel 1, and N–P pieces of transmission data $X_{2,P} (x_{2,P,0}, x_{2,P,1}, \ldots x_{2,P,(M-1)}) \ldots X_{2,N-1} (x_{2,(N-1),0}, x_{2,(N-1),1}, \ldots, x_{2,(N-1),(M-1)})$ are transmitted over virtual channel 2.

Data $X_{0,P} \ldots X_{0,N-1}$ is transmitted over virtual channel 0, data $X_{1,P} \ldots X_{1,N-1}$ is transmitted over virtual channel 1, and data $X_{2,P} \ldots X_{2,N-1}$ is transmitted over virtual channel 2.

Data transmitted over the virtual channels may be the same data or different data.

This applies also to case 1, case 2, case 3, and case 4 given above.

In this case, actual antennas may be used by different users, one for each user.

In such an environment, there may be multiple transmitting users and one receiving user or there may be one transmitting user and multiple receiving users.

When N=1024 and the vectors for the pilot signals (pilot sequences) corresponding to all virtual channels of multiple users are reserved, the remaining data vectors (data sequences) may be shared by multiple virtual channels (even if multiple users are allocated).

That is, because only the pilot signals require extra bandwidths even if there are many users, the frequency usage efficiency is further increased.

Note that not only the pilot signals but also some other signals, such those for adjusting bandwidth distributions, vary according to the users. However, those adjusting signals may be shared on a user basis.

This ability is provided because different data is transmitted over virtual channels. MIMO-OFDM, in which the same signal (or information) is transmitted from all antennas, does not provide such a usage method.

If transmitting or receiving users use one or more actual antennas to transmit or receive data over one or more virtual channels and if
(A) there are many transmitting users, that is, there are multiple actual antennas and
(B) the receiving side is a base station (single user) and there is one or more actual antennas,
the present invention, in which virtual channel generation data is used to generate virtual channels (virtual transmission channels, virtual transmission antennas), allows the transmitting side to control power to avoid the near-far problem, thus reducing the generation of reception noises.

The power control data is generated on the receiving side based on the received noises and is notified to the transmitting side.

Next, the following describes "technical basis of the invention—theory of OSDM" and "multiple virtual antenna OSDM system" corresponding to the embodiments of the present invention.

(Technical Background of the Invention—Theory of OSDM)

The following describes the theory of OSDM that is the technical basis of the present invention.

1. (Chapter 1) Foreword

Recently, social needs for telecommunication become more widespread and diversified as the information society evolves. In particular, mobile information communication, which uses the wireless technology to allow the user to communicate while moving around, is an important element indispensable for the social infrastructure.

The OFDM system, which is recognized as a next generation communication technology, is one of the technologies that attract attention in various fields because of its high frequency usage efficiency and high anti-multipath feature. On the other hand, a problem is pointed out that, because independently-modulated carriers are superposed, the Peak to Average Power Ratio (PAPR) becomes high. Like the OFDM system, the OSDM system is a communication system designed to improve the frequency usage efficiency for providing a drastically higher communication path capacity than that of the other communication systems and, at the same time, provides the user with the real-time acquisition of the communication path environment that has been impossible in the conventional systems. It is reported that the PAPR is almost flat as compared with the OFDM system. Applying this feature to a multi-antenna communication system allows the communication path capacity to be almost proportionally increased to the number of transmission/reception antennas. The following evaluates the performance of the OSDM system, from the basics to a multi-antenna OSDM system that is an extended version, based on the simulation results while comparing the OSDM system with the OFDM system as necessary.

The description is composed of six chapters. Chapter 2 introduces the basic theory of the OSDM system, and Chapter 3 that follows evaluates the performance trough simulation. Chapter 4 proposes the theory of a multi-antenna OSDM system that is an extended version of the OSDM system, and Chapter 5 evaluates the performance of the multi-antenna OSDM system through simulation. Chapter 6 summarizes the information collected from those results.

2. Basic Theory

This chapter introduces the theory of the OSDM system in four sections. First, Section 1 introduces the process of forming a transmission signal from data with focus on the transmission system. Next, Section 2 introduces the process of acquiring the communication path environment from the reception signal and estimating data from the acquired communication path environment with focus on the receiving system. Finally, Section 3 describes the features of the OSDM system by comparing them with those of the OFDM system.

2.1 Transmission System (Section 1 of Chapter 2)

Figure 23:
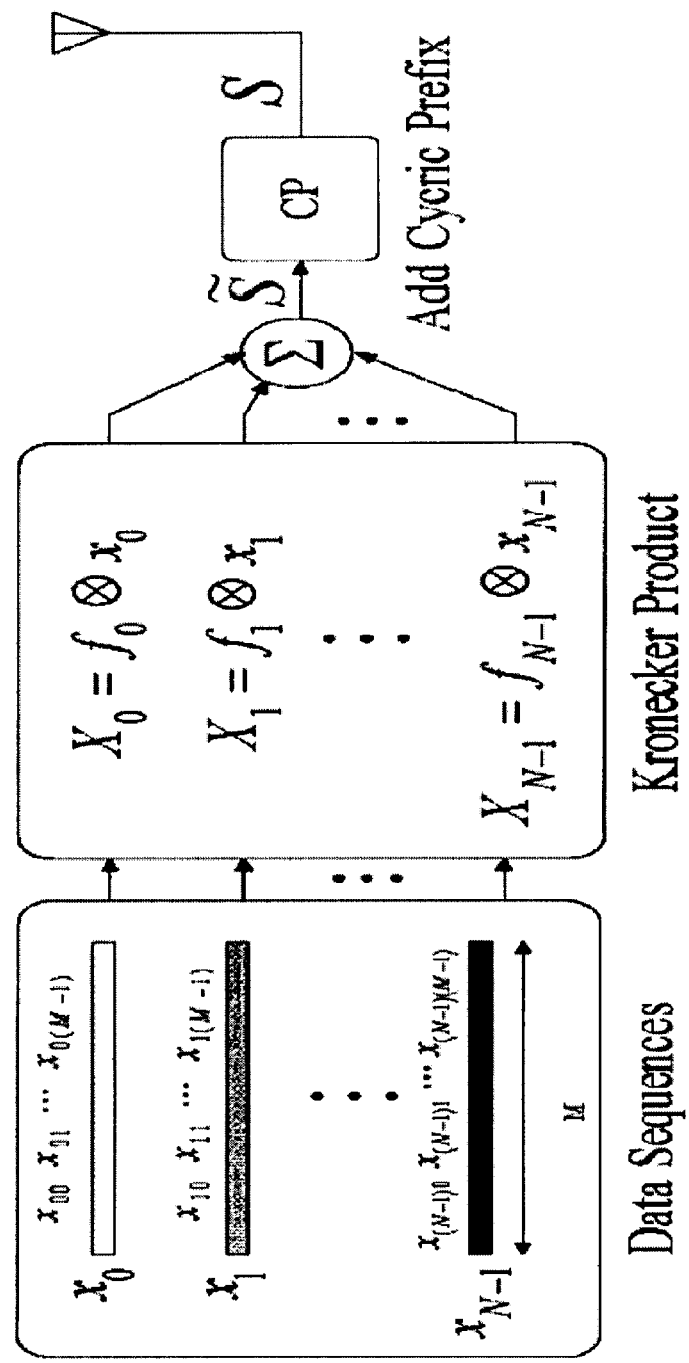
FIG. 23 is a diagram showing a transmitting system (1).

The transmission system is configured by the processes shown in FIG. 23. The following describes the details.

The data vectors $x_0, x_1, \ldots, x_{N-1}$, each having the length M, are defined as follows.

$$x_0 = (x_{00}, x_{01}, \ldots, x_{0(M-1)})$$

$$x_1 = (x_{10}, x_{11}, \ldots, x_{01(M-1)})$$

$$\vdots$$

$$x_{N-1} = (x_{(N-1)0}, x_{(N-1)1}, \ldots, x_{0,(N-1)(M-1)}) \quad (25)$$

Figure 4:
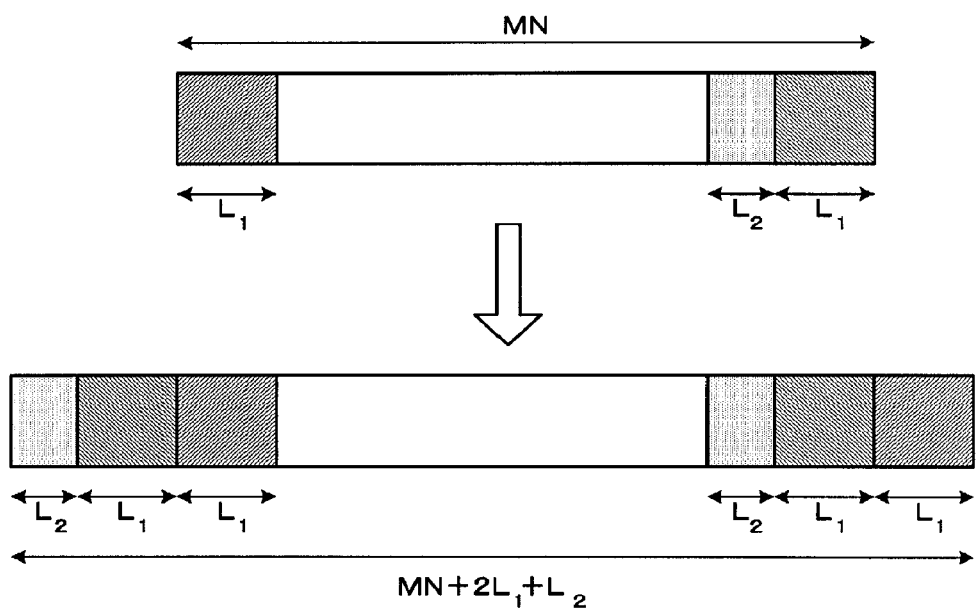
FIG. 4 is a diagram showing a pseudo-periodic signal.

When $W_N \equiv \exp(2\pi\sqrt{-1}/N)$, the Nth order inverse-DFT matrix $F^{-1}$ and its row vectors, that is, row vector $f_{N,0}$, row vector $f_{N,1} \ldots$ row vector $f_{N,N-1}$ (hereinafter called "row vector $f_0$, row vector $f_1 \ldots$ row vector $f_{N-1}$" or "$f_0, f_1 \ldots f_{N-1}$"), are defined as shown in FIG. 4.

The Kronecker product of the vector $f_i$ and $x_i$ is $X_i$. That is,

[Mathematical expression 20]

$$X_i = f_i \otimes \text{data } X_i (i = 0, 1, \ldots N - 1) \quad (26)$$

$$\text{Sum of } X_i S_{sum} = (S_0, S_1, \ldots, S_{MN-1}) = \sum_{i=0}^{N-1} X_i \quad (27)$$

The signal generated by adding the cyclic prefix having the length L−1 to the signal shown above $$S = (S_{MN-L+1}, \ldots, S_{MN-1}, S_0, S_1, \ldots, S_{MN-1}) \quad (28)$$

is the signal actually transmitted to the communication paths.

2.2 Reception System

Figure 24:
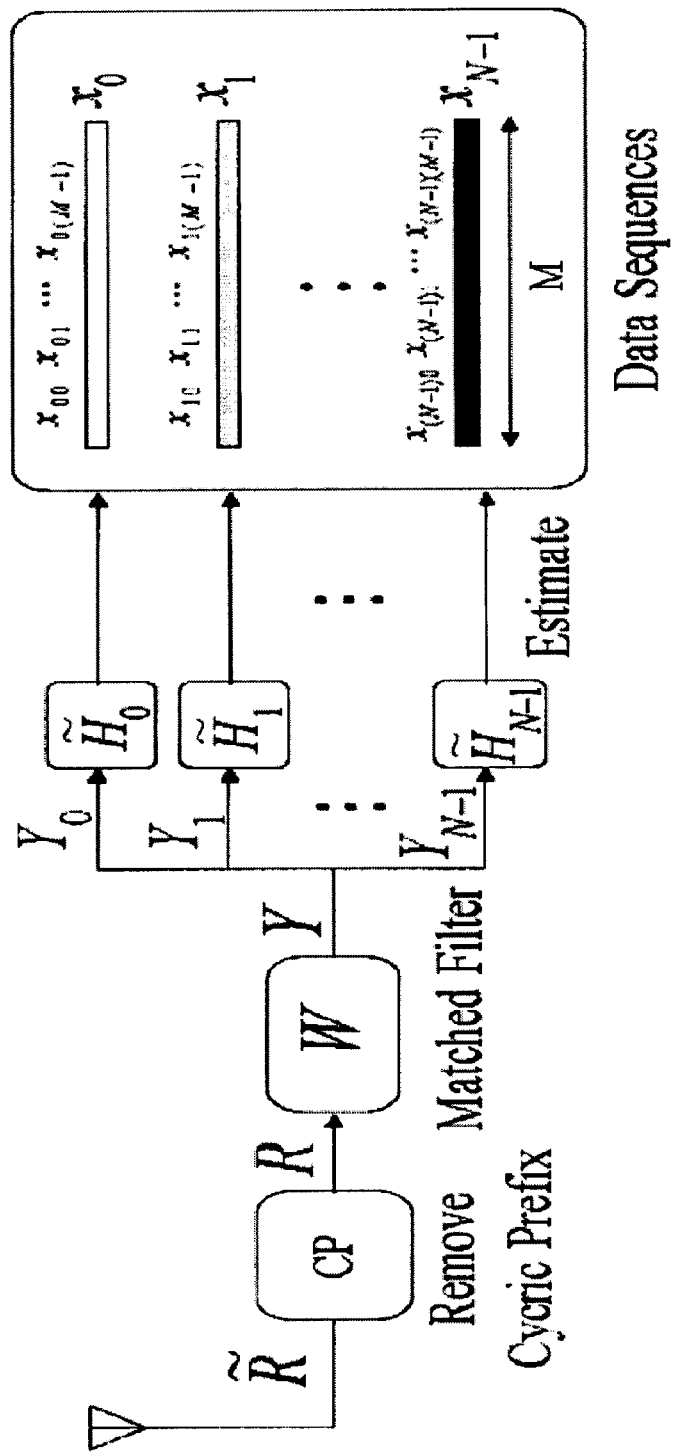
FIG. 24 is a diagram showing a receiving system (1).

The reception system is composed of the processes shown in FIG. 24. The following describes the details.

Let $h_0, h_1, \ldots, h_{L-1}$, be the impulse responses on the communication paths. The reception signal ~R is represented by the following expression using MN×MN right cyclic shift matrix T.

[Mathematical expression 21]

$$\tilde{R} = \sum_{i=0}^{L-1} h_i S T^i \quad (29)$$

Let R be the signal generated by removing the cyclic prefix from $\tilde{R}$. Then, there is the following relation between R and the data vectors $x_0, x_1, \ldots, x_{N-1}$.

$$Y^{def} = RW = (x_0, x_1, \ldots, x_{N-1})H \quad (30)$$

where W is the Kronecker product of $\overline{F_N^{-1}}$, which is the complex conjugate of $F_N^{-1}$, and the M×M unit matrix $I_M$ and is represented by the following expression.

$$W = \overline{F_N^{-1}} \otimes I_M \quad (31)$$

H is a matrix whose diagonal elements are N M×M matrices $\tilde{H}_i$ each having the elements of impulse responses h and IDFT matrices. It is represented by the following expression.

[Mathematical expression 22]

$$\tilde{H}_i = \begin{pmatrix} h_0 & h_{M-1} & h_{M-2} & \ldots & h_1 \\ \overline{W_N^i} h_1 & h_0 & h_{M-1} & \ldots & h_2 \\ \overline{W_N^i} h_2 & \overline{W_N^i} h_1 & h_0 & \ldots & h_3 \\ \vdots & \vdots & \vdots & \ddots & \vdots \\ \overline{W_N^i} h_{M-1} & \overline{W_N^i} h_{M-2} & \overline{W_N^i} h_{M-3} & \ldots & h_0 \end{pmatrix} \quad (32)$$

[Mathematical expression 23]

$$H = \begin{pmatrix} \tilde{H}_0 & 0 & \ldots & 0 \\ 0 & \tilde{H}_1 & \ldots & 0 \\ \vdots & \vdots & \ddots & \vdots \\ 0 & 0 & \ldots & \tilde{H}_{N-1} \end{pmatrix} \quad (33)$$

where, $h_k = 0 (L \leq k \leq M - 1)$.

Therefore, if $$Y \stackrel{def}{=} (Y_0 Y_1 \ldots Y_{N-1})$$

$$Y_0 \stackrel{def}{=} (Y_{00} Y_{01} \ldots Y_{0(M-1)})$$

$$Y_1 \stackrel{def}{=} (Y_{10} Y_{11} \ldots Y_{1(M-1)})$$

$$\vdots$$

$$Y_{N-1} \stackrel{def}{=} (Y_{(N-1)0} Y_{(N-1)1} \ldots Y_{(N-1)(M-1)})$$

then, there is the following relation between the transmission data vectors and the reception signals.

$$Y_i = x_i \tilde{H}_i (0 \leq i \leq N-1) \quad (34)$$

Let W be a matched filter. Then, when the output Y of the matched filter and the impulse response h are obtained, solving the simultaneous equations based on $\tilde{H}_i$ gives the transmission data vectors $x_i$.

2.3 Features

The OSDM system has the following features as compared with the OFDM system.

(A) The OSDM system, capable of transmitting N transmission data vectors at the same time, uses one of them for the pilot signal for measuring impulse responses, providing the communication path environment with no predictability in real time.

(B) When estimating the transmission data vectors from the reception signals, the OSDM system gives the impulse responses of all communication paths independently. That is, the system allows the energy of various reflected waves, which arrive at the receiving side, to be used independently.

(C) The OFDM system cannot improve the SN ratio in the frequency area equalization even if the equalization method for suppressing noises (Minimum Mean Squared Error; MMSE) is used instead of the equalization method for multiplying the inverse matrix of an impulse response by the reception signal (Zero-Forcing; ZF). In contrast, for the reason described above, the OSDM system can use MMSE to improve the SN ratio.

3. Simulation Result

This chapter introduces the result of the OSDM system performance simulation based on the contents of the previous chapter. Section 1 describes the simulation definitions and Section 2 introduces the simulation result. Finally, Section 3 verifies the simulation.

3.1 Definitions

Based on the contents of the previous chapter, the performance simulation of the OSDM system and the OFDM system was performed for the baseband signals. The parameters used for the simulation are as follows.

M=13

N=64

L=8

The impulse responses on communication paths follow the independent zero-mean complex Gaussian process, and the signal is modulated using QPSK and 16QAM. At this time, the error correction codes are not used.

The receiving side adds the Additive White Gaussian Noises (AWGN) as the thermal noises. In addition, the MMSE equalization is used as the method for estimating transmission data vectors from reception signals.

The experiment method for each system is that the per-bit power density to noise power density ratio (Eb/No) is changed from 0[dB] to 25[dB], 1[dB] at a time, and Monte Carlo simulation is carried out 104 times for the Eb/No values.

3.2 Simulation Result

This section introduces the result of the simulation carried out based on the definitions in the previous section.

Figure 25:
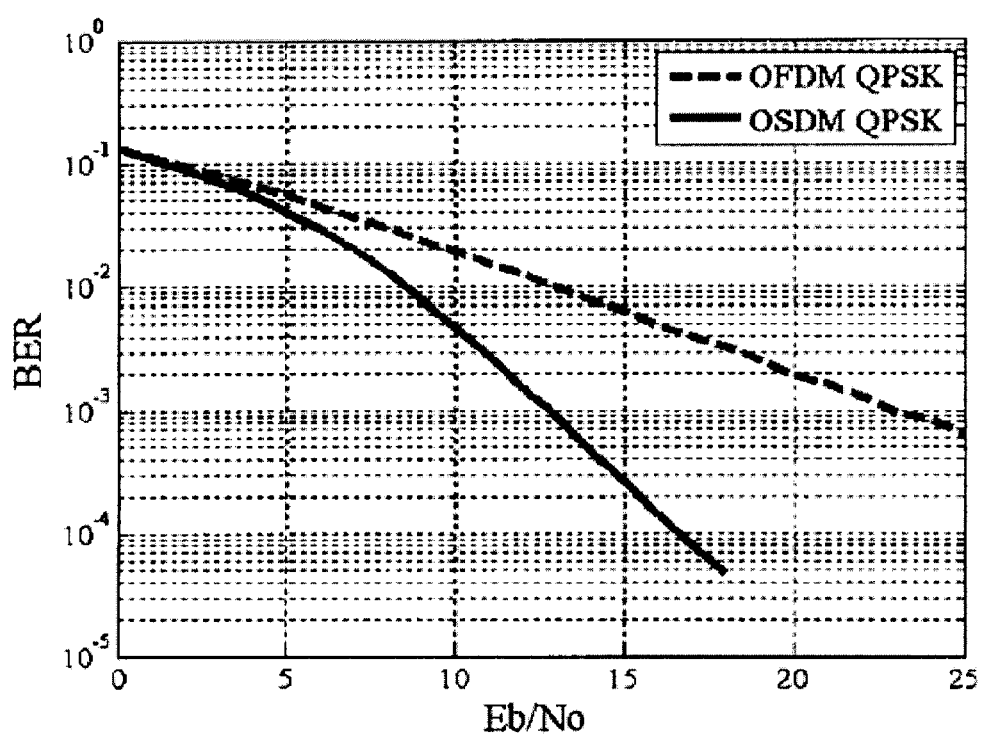
FIG. 25 is a diagram showing the simulation result (1).
Figure 26:
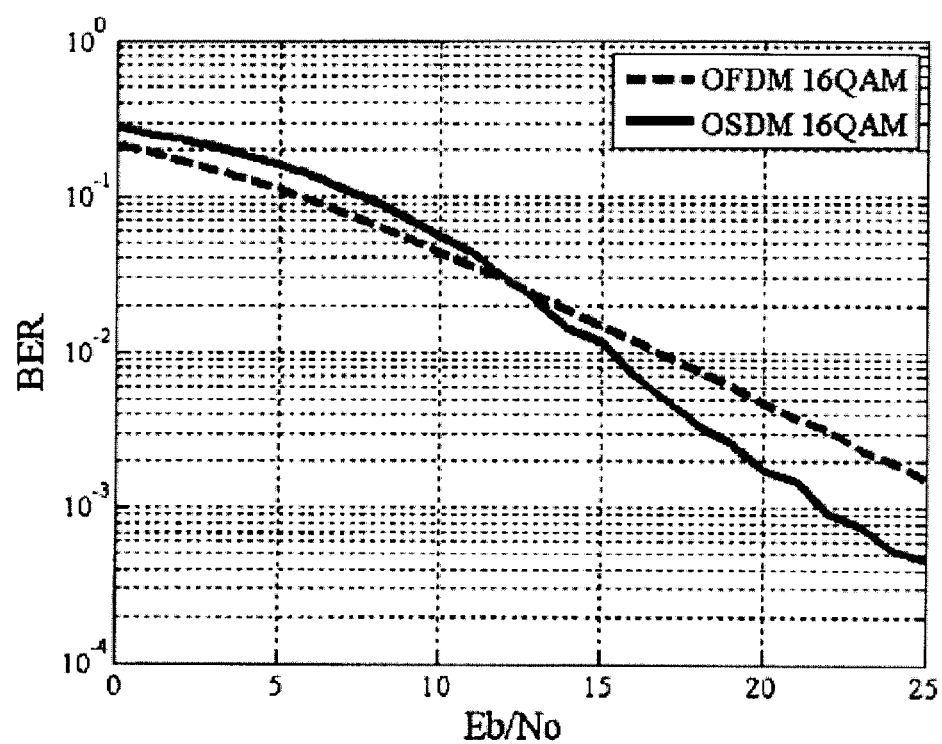
FIG. 26 is a diagram showing the simulation result (2).

FIG. 25 and FIG. 26 are graphs showing the per-bit power density to noise power density ratio (Eb/No) versus the bit error rate (BER) for the modulation of QPSK and 16QAM in the OSDM and OFDM systems. Note that the per-bit power density (Eb) on the horizontal axis of the graphs includes the energy of not only direct waves but also all reflected waves. Also, assume that the receiving side considers the environment of the communication path as a noise-free, ideal environment.

Figure 27:
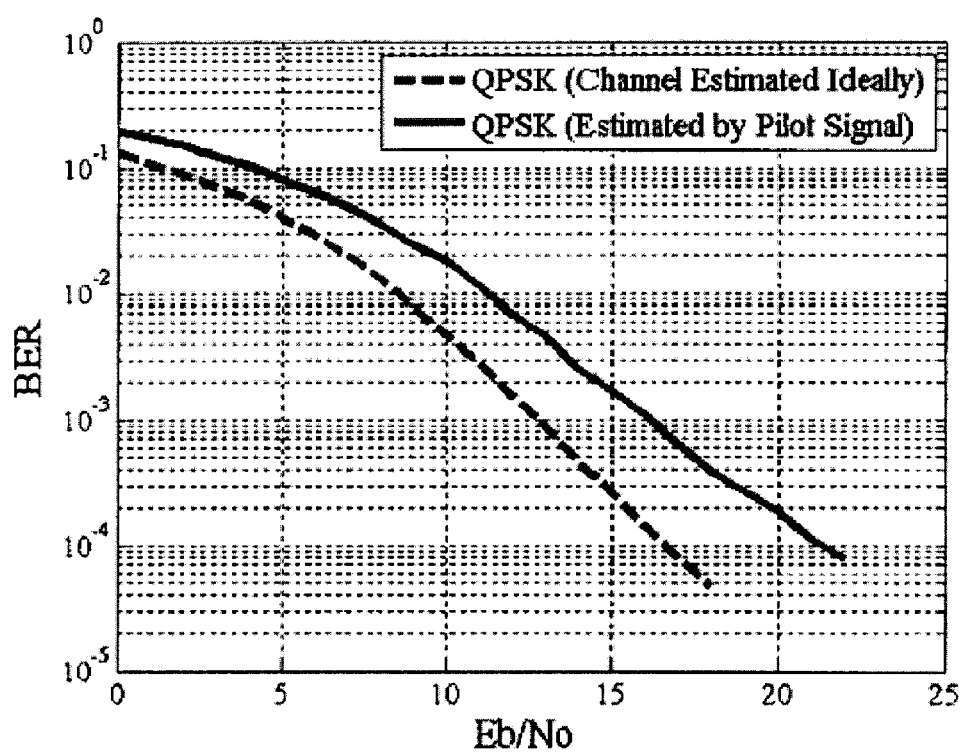
FIG. 27 is a diagram showing the simulation result (3).
Figure 28:
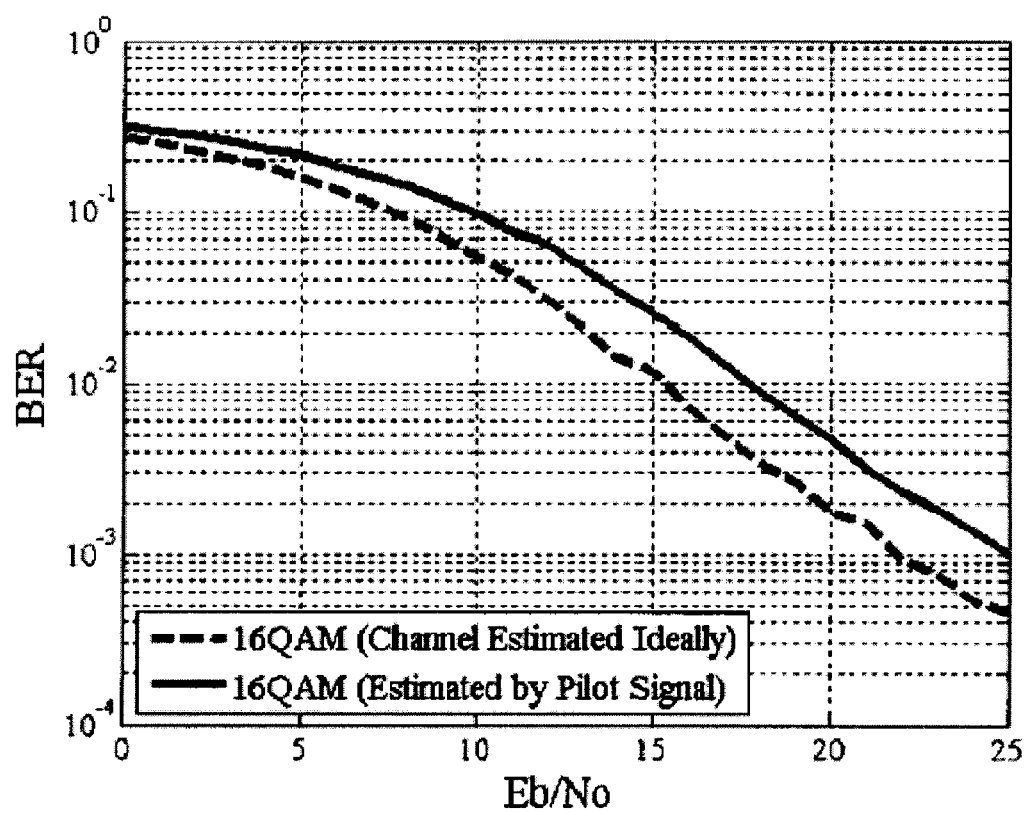
FIG. 28 is a diagram showing the simulation result (4).

Next, FIG. 27 and FIG. 28 show the comparison between the OSDM system performance when the communication path is estimated as an ideal communication path and the OSDM system performance when the communication path is estimated actually from the pilot signal in the QPSK modulation and in the 16QAM modulation. In this experiment, the Zero Correlation Zone (ZCZ) signal having the length M is used as the pilot signal to estimate the communication path.

3.3 Investigation

This section investigates the simulation result introduced in the previous section.

First, FIG. 25 and FIG. 26 indicate that the BER characteristics of the OSDM system are generally better than those of the OFDM system and that the difference becomes more noticeable as the per-bit power density to noise power density ratio (Eb/No) becomes higher. For example, the figures indicate that the OSDM system achieves the BER of $10^{-3}$ at an Eb/No value that is about 3[dB] lower than in the OFDM system. This means that the OSDM system can provide quality, comparable to that achieved in the OFDM system, at about one half of the transmission power.

On the other hand, the BER convergence level in the OFDM system is not changed much by the modulation, while the convergence level in the OSDM system tends to get worse only when the Eb/No value is small as the number of bits per symbol is increased. This is probably due to the fact that, in an environment where the signal to noise power ratio (SNR) is low, the effect of the noise energy at the transmission signal estimation time becomes more noticeable in the OSDM system than in the OFDM system because the energy of all reflected waves is independently used in the OSDM system. However, in a status where the communication path is not ideally provided, the advantage of the OSDM system is not affected in an actual communication environment because the Eb/No deterioration amount of the OSDM system is expected to be smaller than that of the OFDM system because of the reason that will be described later.

FIG. 27 and FIG. 28 indicate that, in the OSDM system, the Eb/No deterioration amount from the status in which the communication paths are provided ideally to the status in which the communication paths are actually estimated is as low as about 3 [dB]. From this result, it is recognized that the pilot signal correctly provides the receiving side with the communication path status with no predictability even in a very bad multipath environment where impulse responses on the communication paths each follow the independent zero-mean complex Gaussian process. Unlike the OFDM system in which the preambles, provided for measuring the communication path environment, are discretely arranged in the transmission signal, the OSDM system can continuously provide the communication path environment. Therefore, in a status where the communication path environment is changed frequently, it is expected that the communication quality deterioration in the OSDM system is slighter than that in the OFDM system. In addition, because the PAPR is almost flat as described in Chapter 1 and because the ratio of the guard interval to the transmission signal length is LN+L in the OFDM system but is LMN+L in the OSDM system, the OSDM system ensures a transmission speed higher than that in the OFDM system.

4. Theory of Multi-antenna OSDM System

This chapter introduces, in four sections, the theory of a multi-antenna OSDM system, one of applications of the OSDM system, where data is transmitted and received independently in the same frequency band using multiple antennas. First, Section 1 introduces the process of forming transmission signals from data with focus on the transmission system. Next, Section 2 introduces the process of creating a communication path environment from reception signals and estimating data from the created communication path environment with focus on the receiving system. Finally, Section 3 introduces the feature of the multi-antenna OSDM system as compared with the OSDM system.

4.1 Transmission System

Figure 29:
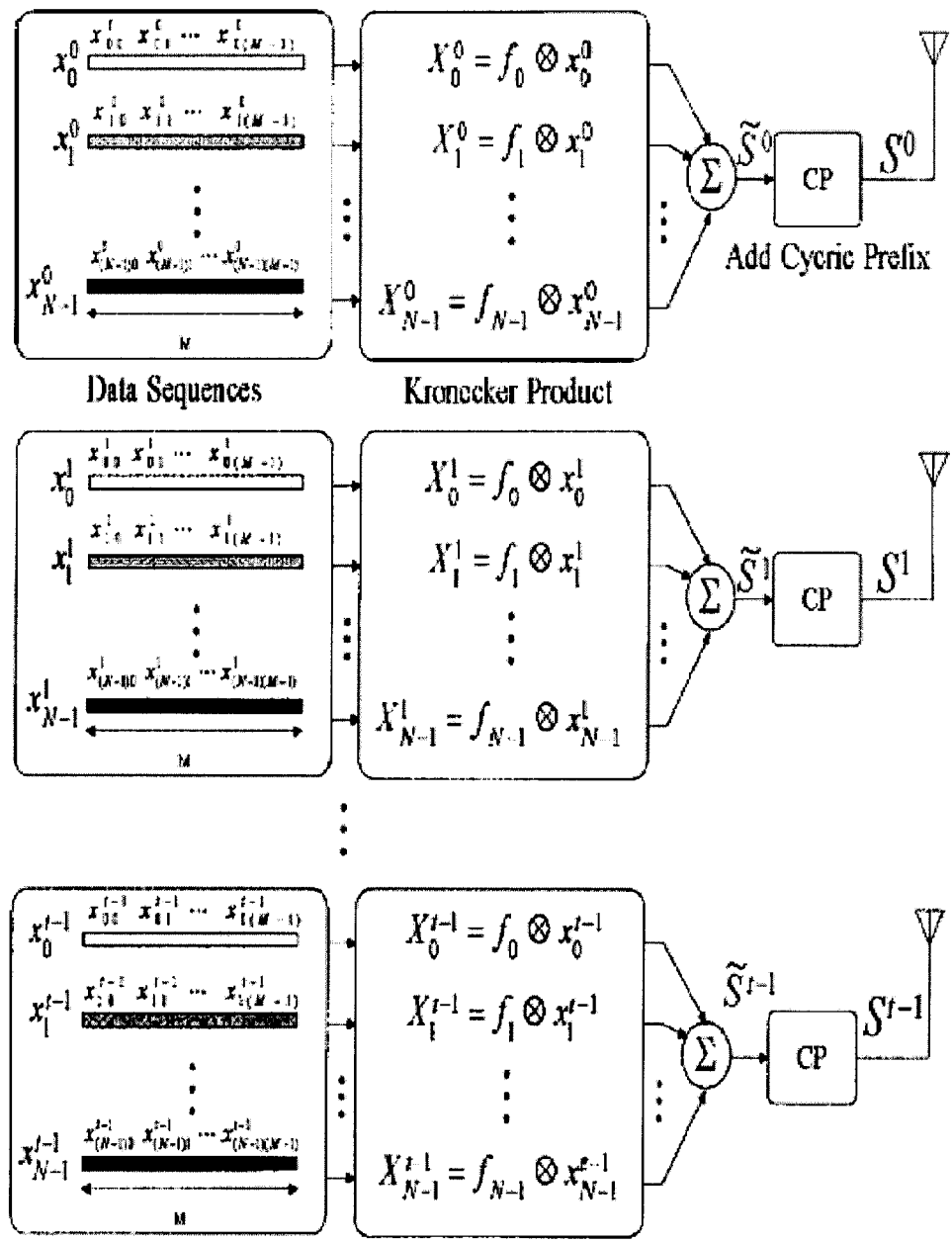
FIG. 29 is a diagram showing a transmitting system (2).

The transmission system is composed of the processes such as those shown in FIG. 29. The following describes them in details.

For the reason defined in Chapter 2, the OSDM system is characterized in that impulse responses on communication paths can be obtained with no predictability in real time. That is, the transmitting side adds special information to the signals so that impulse responses on multiple communication paths can be correctly obtained. This configuration allows the OSDM system to be applied to a multi-antenna communication system where the estimation accuracy of the communication path environment affects the communication quality more directly.

The following describes the transmission and reception over t antennas using the parameters used in Chapter 2.

Figure 30:
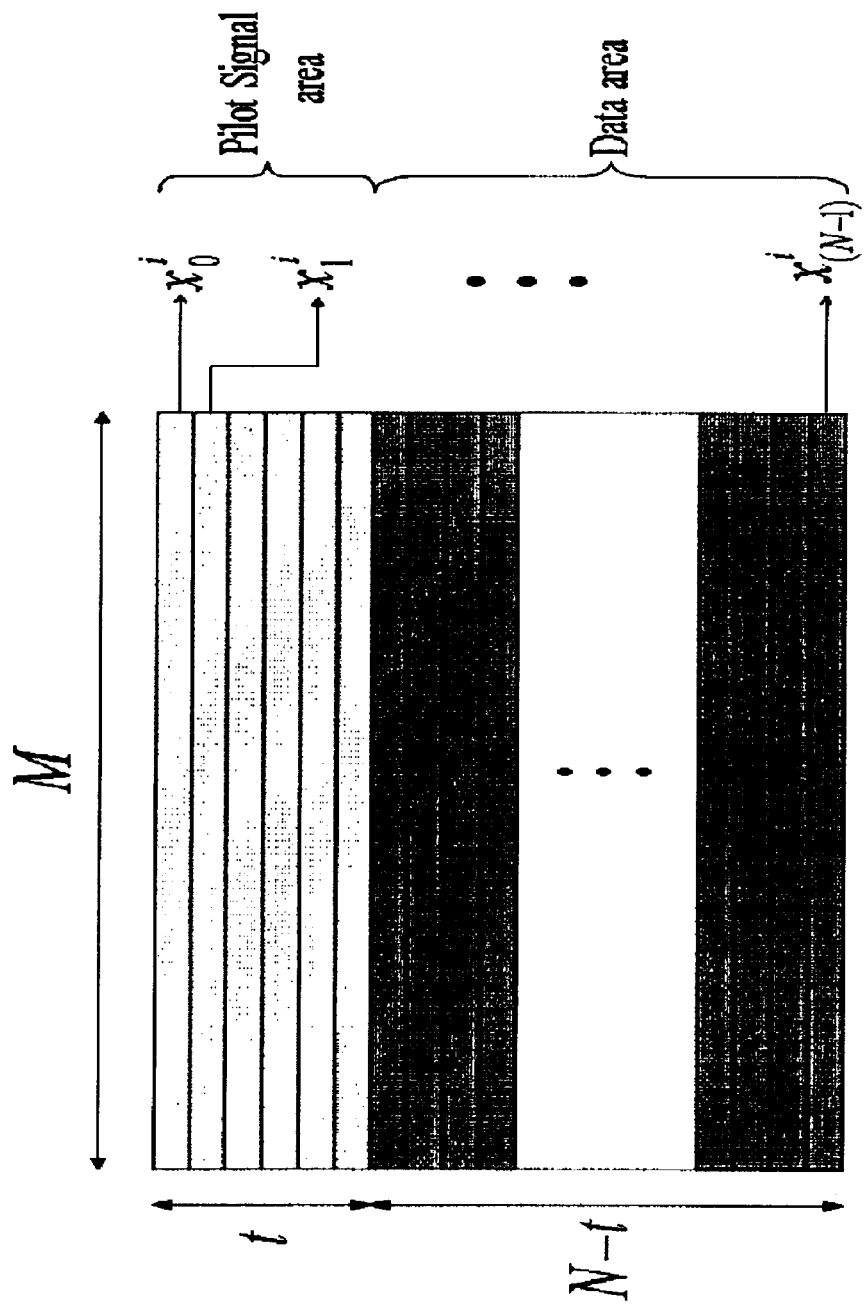
FIG. 30 is a diagram showing the signal configuration (1).
Figure 31:
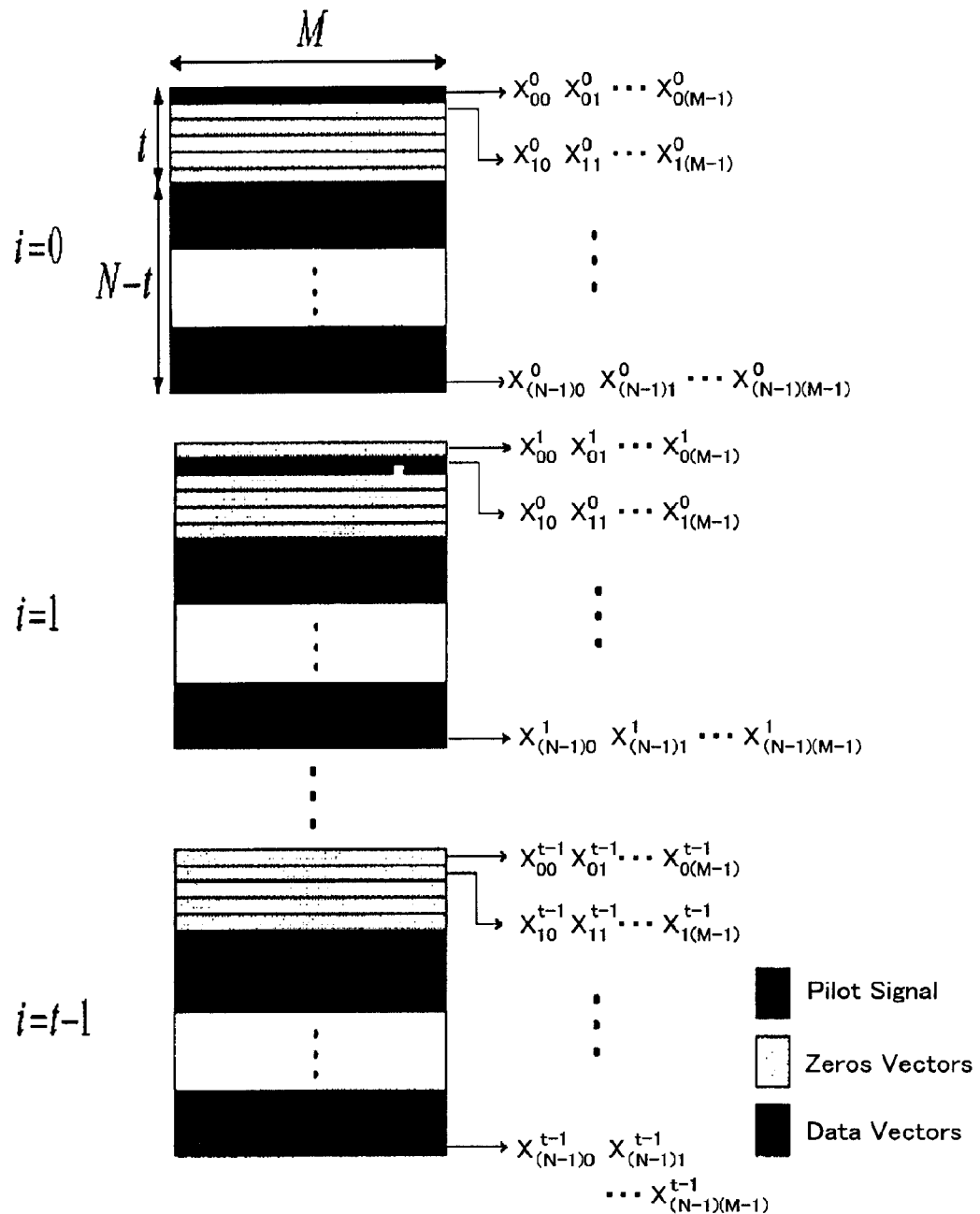
FIG. 31 is a diagram showing the signal configuration (2).

For an antenna i (0≤i≤t−1), the N−t data vectors, $x_t^i$, $x_{t+1}^i$, ..., $x_{N-1}^i$, each of which has the length M, are defined in the same way the data vectors are defined in (25) as shown in FIG. 30. In addition, the pilot signal is applied to $x_i^i$ and a zero matrix is applied to other rows as shown in FIG. 31.

Next, the Kronecker product of the IDFT matrix and the data vectors is applied as in Expression (26). Because the Kronecker product of the pilot signal of transmission data transmitted from each antenna and one of different rows of the IDFT column is calculated, the orthogonality of each pilot signal is guaranteed. That is, it should be noted that, when the transmission signal Si, generated via Expressions (27) and (28), arrives at the receiving side via multiple communication paths while being interfered with other signals, the receiving side can recognize the impulse responses of the multiple communication paths independently with no predictability.

4.2 Reception System

Figure 32:
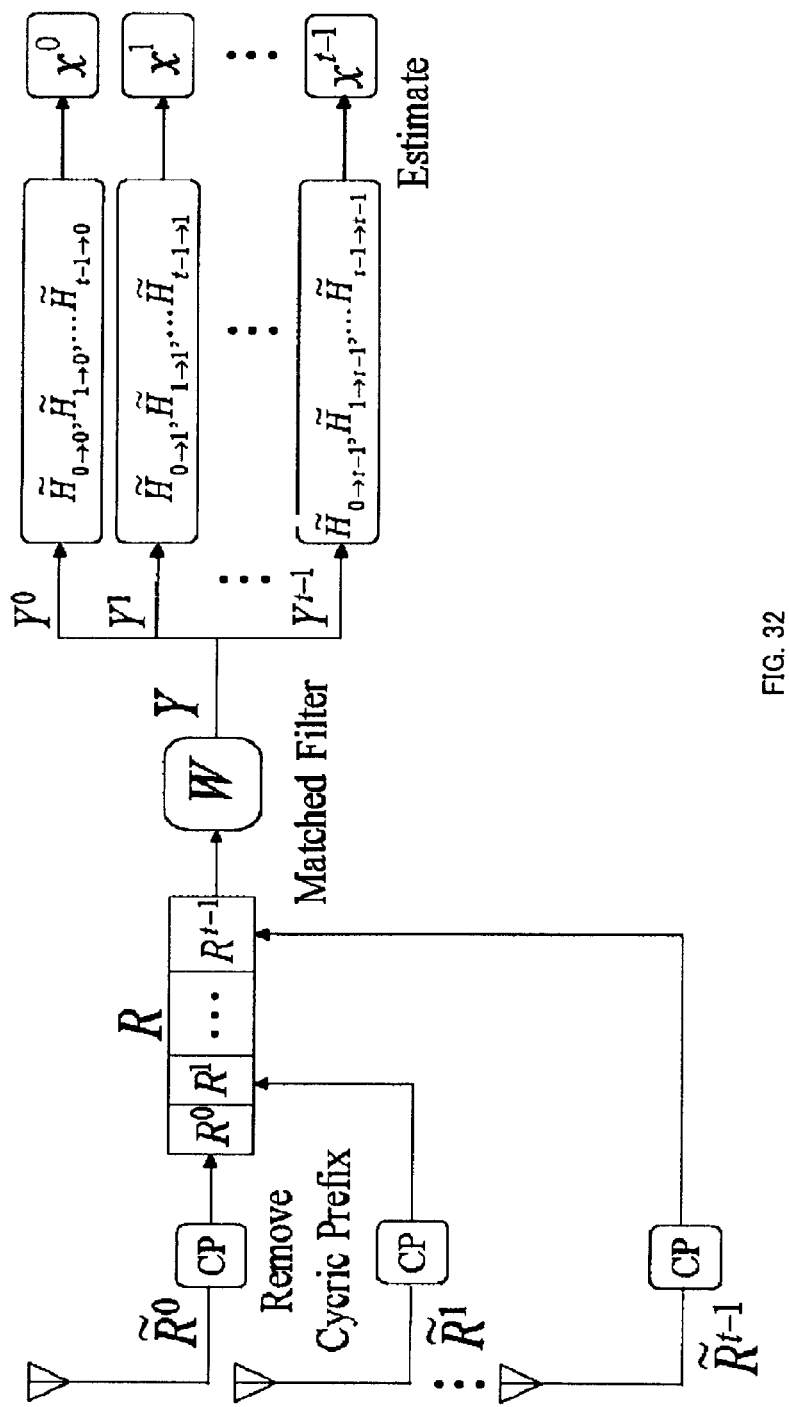
FIG. 32 is a diagram showing a receiving system (2).

The reception system is configured by the processes such as those shown in FIG. 32. The following describes the details.

[Mathematical Expression 24]

$$\tilde{R}j = \sum_{i=0}^{t-1}\sum_{j=0}^{t-1}\sum_{k=0}^{L-1} h_k^{i \to j}\tilde{S}^i T^k \qquad (35)$$

The notation shown above is used.

In the above expression, $h_0^{i \to j}, h_1^{i \to j}, \ldots, h_{L-1}^{i \to j}$ are impulse responses on the communication path from the transmission antenna i to the reception antenna j, and T is the shift matrix shown in Section 2 of Chapter 2.

[Mathematical expression 25]

At this time, the receiving side performs the following processing.

First, let $R^j$ be the signal generated by removing the cyclic prefix from the reception signal $\tilde{R}^j$. Then, $$R = (R^0 R^1 \ldots R^{t-1}) \qquad (36)$$

Next, the matched filter W is defined. W is the Kronecker product of the Nth order DFT matrix FN, N×M unit matrix IM, and t×t unit matrix It, and is expressed by the following expression.

[Mathematical expression 26]

$$W = F_N \otimes I_M \otimes I_t \qquad (37)$$

In this case, there is the following relation between the output RW of the matched filter and transmission data vectors.

$$Y \stackrel{def}{=} RW = XH \tag{38}$$

Where $$X \stackrel{def}{=} (X^0 X^1 \ldots X^{t-1})$$

$$X^0 \stackrel{def}{=} (X^0_{t0} X^0_{t1} \ldots X^0_{t(M-1)} \ldots X^0_{(N-1)(M-1)})$$

$$X^1 \stackrel{def}{=} (X^1_{t0} X^1_{t1} \ldots X^1_{t(M-1)} \ldots X^1_{(N-1)(M-1)})$$

$$\vdots$$

$$X^{t-1} \stackrel{def}{=} (X^{t-1}_{t0} X^{t-1}_{t1} \ldots X^{t-1}_{t(M-1)} \ldots X^{t-1}_{(N-1)(M-1)})$$

H is a matrix composed of $t^2$ M×M matrices $\hat{H}^{i \to j}$ each of which has impulse responses $h^{i \to j}$ and IDFT matrices as the elements. It is represented by the following expression.

[Mathematical Expression 27]

$$\tilde{H}^{i \to j}_k = \begin{pmatrix} h^{i \to j}_0 & h^{i \to j}_{M-1} & h^{i \to j}_{M-2} & \ldots & h^{i \to j}_1 \\ \overline{W^k_N} h^{i \to j}_1 & h^{i \to j}_0 & h^{i \to j}_{M-1} & \ldots & h^{i \to j}_2 \\ \overline{W^k_N} h^{i \to j}_2 & \overline{W^k_N} h^{i \to j}_1 & h^{i \to j}_0 & \ldots & h^{i \to j}_3 \\ \vdots & \vdots & \vdots & \ddots & \vdots \\ \overline{W^k_N} h^{i \to j}_{M-1} & \overline{W^k_N} h^{i \to j}_{M-2} & \overline{W^k_N} h^{i \to j}_{M-3} & \ldots & h^{i \to j}_0 \end{pmatrix}$$

[Mathematical Expression 28]

$$\hat{H}^{i \to j} = \begin{pmatrix} \tilde{H}^{i \to j}_0 & 0 & \ldots & 0 \\ 0 & \tilde{H}^{i \to j}_1 & \ldots & 0 \\ \vdots & \vdots & \ddots & \vdots \\ 0 & 0 & \ldots & \tilde{H}^{i \to j}_{N-1} \end{pmatrix} \tag{39}$$

$$H = \begin{pmatrix} \hat{H}^{0 \to 0} & \hat{H}^{0 \to 1} & \ldots & \hat{H}^{0 \to t-1} \\ \hat{H}^{1 \to 0} & \hat{H}^{1 \to 1} & \ldots & \hat{H}^{1 \to t-1} \\ \vdots & \vdots & \ddots & \vdots \\ \hat{H}^{t-1 \to 0} & \hat{H}^{t-1 \to 1} & \ldots & \hat{H}^{t-1 \to t-1} \end{pmatrix} \tag{40}$$

Let W be a matched filter. Then, when the output Y of the matched filters and the impulse responses h are obtained, solving the simultaneous equations based on H gives transmission data vectors.

4.3 Features

The multi-antenna OSDM system has the following features as compared with the multi-antenna OFDM system such as the MIMO-OFDM system.

Unlike the OFDM system, the OSDM system gives the communication path environment with no predictability in real time as mentioned in Section 3 of Chapter 2. Because the multi-antenna OSDM system, where t antennas are used for transmission and reception, reserves a t-row data area as the pilot signal allocation area, the data area allocated to one antenna is composed of (N−t) rows. Therefore, as compared with the single-antenna OSDM system where the pilot signal is allocated to one data area, the multi-antenna OSDM system is expected to have the information transmission capacity that is theoretically t (N−t)N−1 times larger.

On the other hand, in the MIMO-OFDM system, the transmitting side and the receiving side share the communication path environment information and use a method, for example, the eigenvalue-based beam-forming method, for reserving the communication path capacity. That is, the comparison of the transmitting methods themselves indicates that the multi-antenna OSDM system can reserve a communication path capacity almost proportional to the number of antennas in a method simpler than that of the MIMO-OFDM system.

5. Simulation Result

This chapter introduces the result obtained by simulating the performance of the multi-antenna OSDM system based on the contents of the previous chapter. Section 1 describes the definitions of the simulation and Section 2 introduces the result of the simulation. Finally, Section 3 describes the verification.

5.1 Definitions

Based on the contents of the previous chapter, the performance simulation of the multi-antenna OSDM system was performed for the baseband signals.

The same parameter values as those used in Section 1 of Chapter 3 are used. The number of transmission/reception antennas is t, and the impulse responses on the t2 communication paths each follow the independent zero-mean complex Gaussian process.

The experiment method is that the per-bit power density to noise power density ratio (Eb/No) is changed for each system from 0[dB] to 25[dB], 1[dB] at a time, while changing the number of transmission/reception antennas t (t=1,2,4,8) and, for each Eb/No value, Monte Carlo simulation is carried out 104 times.

5.2 Simulation Result

Figure 33:
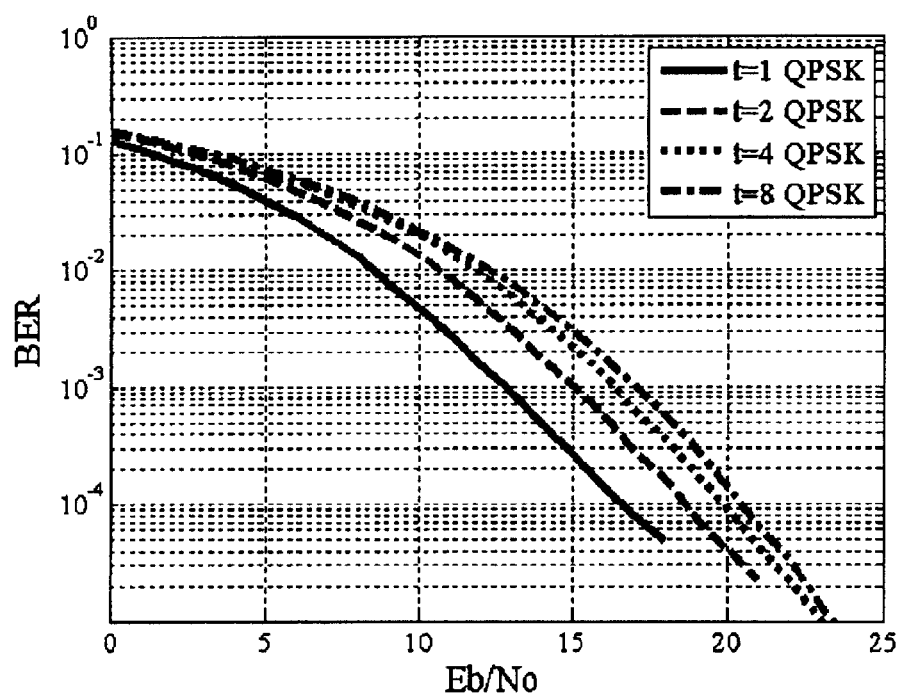
FIG. 33 is a diagram showing the simulation result (5).
Figure 34:
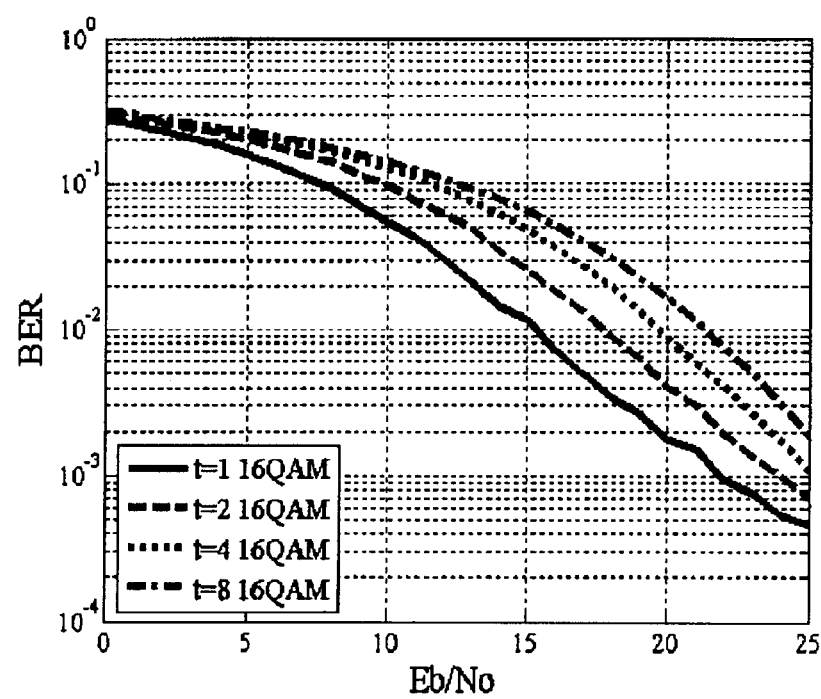
FIG. 34 is a diagram showing the simulation result (6).

This section introduces the result of the simulation performed based on the definitions given in the previous section. FIG. 33 and FIG. 34 are graphs showing the per-bit power density to noise power density ratio (Eb/No) versus the bit error rate (BER) in the QPSK modulation and the 16QAM modulation of the multi-antenna OSDM system. As in Section 2 of Chapter 3, note that the per-bit power density used in the graphs includes the energy of not only direct waves but also all reflected waves in the BER characteristics in the QPSK modulation in FIG. 23 and in BER characteristics in the 16QAM modulation in FIG. 34. Also, assume that the receiving side considers the environment of the communication path as a noise-free, ideal environment.

Figure 35:
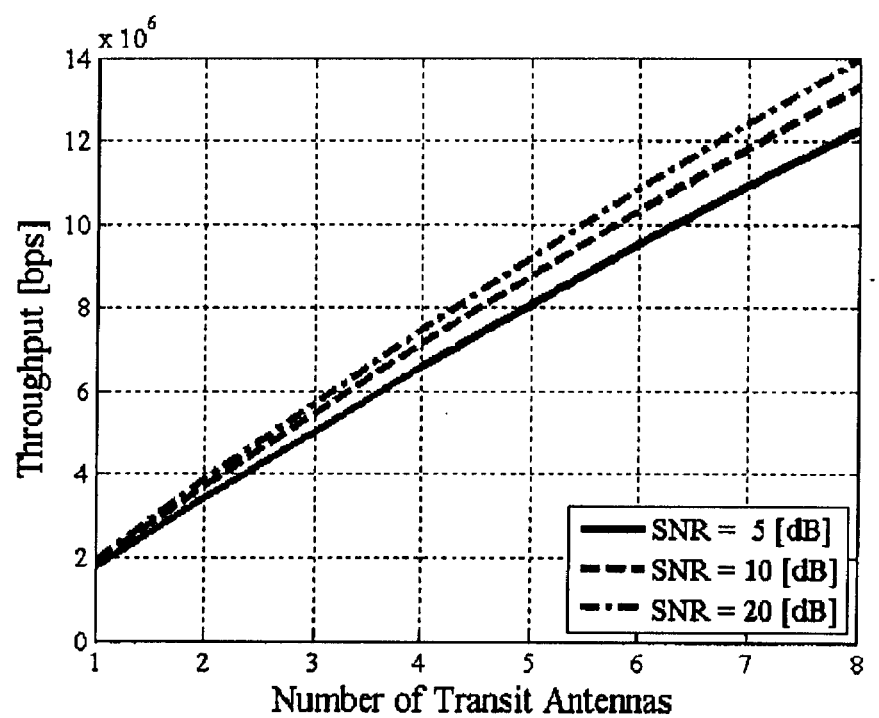
FIG. 35 is a diagram showing the simulation result (7).
Figure 36:
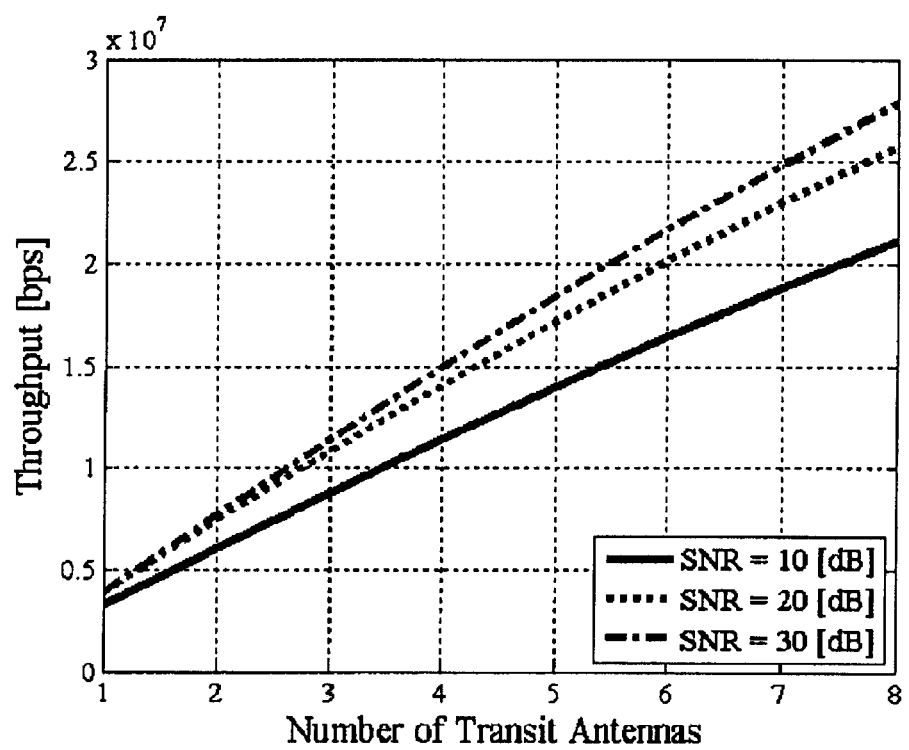
FIG. 36 is a diagram showing the simulation result (8).

Next, FIG. 35 and FIG. 36 are graphs showing the number of transmission/reception antennas versus the throughput in the steady connection state in the time slot of 1 [μs] when the signal to noise power ratio (SNR) is 5, 10, and 20[dB] and when the SNR is 10, 20, and 30 [dB] in the QPSK modulation and the 16QAM modulation. Note that the signal power used in the graphs includes the energy of not only direct waves but also all reflected waves. The following approximation expression is used to calculate the throughput.

$$\text{Throughput} \sim \alpha \times (1 - \text{BER}) / \beta \tag{41}$$

where α is the number of bits per symbol and β is the symbol time.

5.3 Verification

This section verifies the result of the simulation introduced in the previous section.

First, referring to FIG. 33 and FIG. 34, it is recognized in the multi-antenna OSDM system that the per-bit power density to noise power density ratio (Eb/No) is slightly deteriorated even if the number of antennas is increased. In particular, when Eb/No is high enough, it is important to remember that the deterioration of Eb/No of the multi-antenna OSDM system (t=8) is as low as about 3-6 [dB] as compared with that in the single antenna OSDM system (t=1) introduced in Chapter 2 though the information transmission capacity is theoretically 7.1 times larger.

FIG. 35 and FIG. 36 indicate that, when the signal to noise power ratio (SNR) is high enough, the multi-antenna OSDM system (t=8) makes it possible to transmit the information capacity about seven times larger than that of the single-antenna OSDM system (t=1) It is recognized that this value is almost equal to the theoretical value described above.

(Multi Virtual Antenna OSDM System)

The following describes an embodiment of multi virtual antennas.

The limited and exhaustible wireless frequency resource becomes a serious issue in wireless communications such as mobile communications. To address this issue, study has been conducted on the method for using multiple antennas on both the transmitting side and the receiving side (MIMO-OFDM) and, by the inventor of the present invention and his colleagues, on multi-antenna Orthogonal Signal Division Multiplexing (OSDM). Although multi-antenna OSDM features wireless frequency usage efficiency much higher than that of MIMO-OFDM, there is a possibility that the multiple antennas themselves place a heavy load on a portable communication device.

This embodiment, primarily designed for use on a portable communication device, is based on the "virtual antenna theory" that, though a single antenna is used both on the transmitting side and the receiving side, makes possible high wireless frequency usage efficiency as if multiple antennas were used on both the transmitting side and the receiving side.

Because this description is related to the description of "Technical background of the invention—theory of OSDM" described above, "multi virtual antenna OSDM system" has the chapter and section numbers that follow the Chapters and Sections of "Technical background of the invention—theory of OSDM".

6. Theory of Virtual Antenna on Transmitting Side

Figure 39:
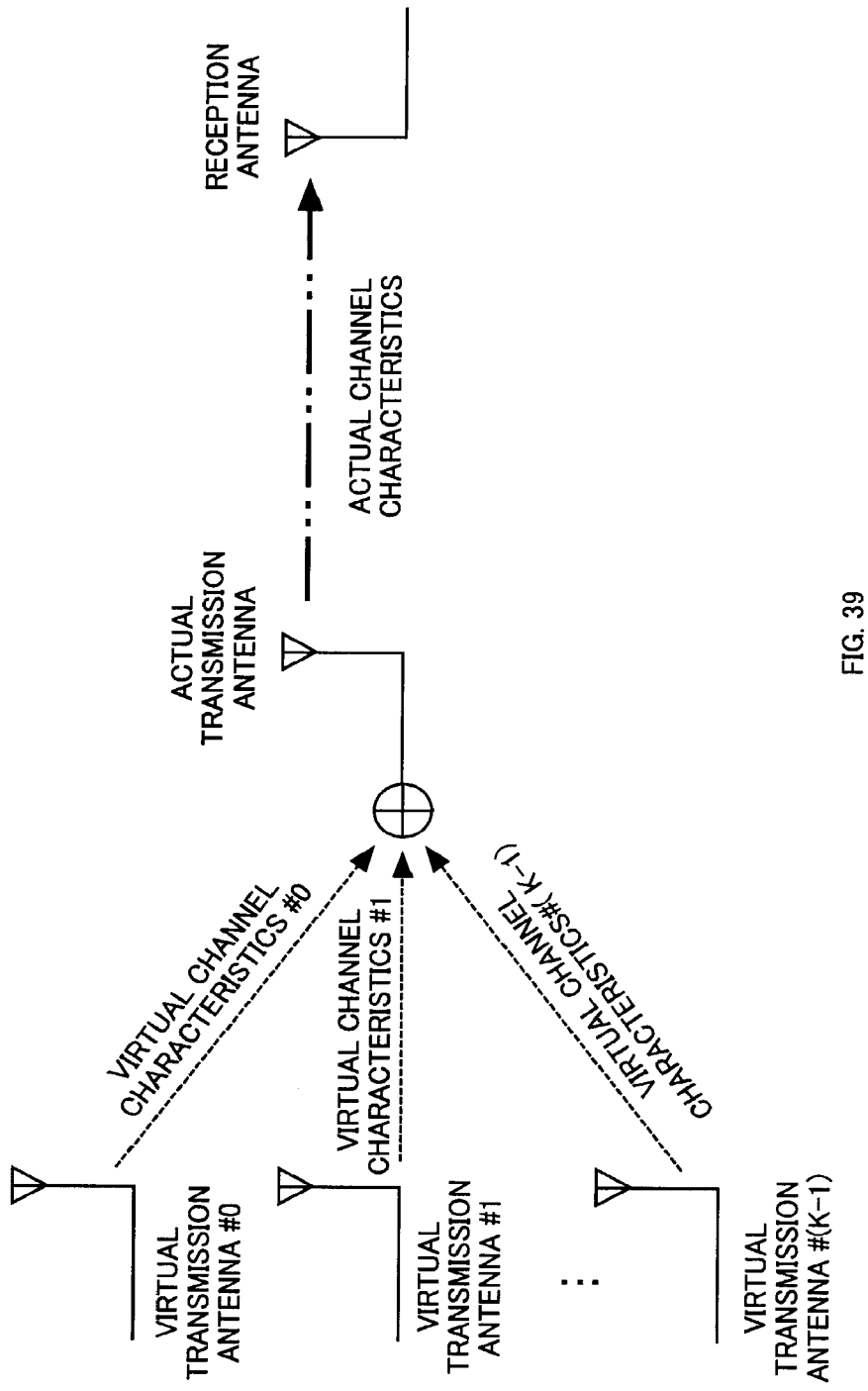
FIG. 39 is a diagram showing virtual transmission antennas.

As shown in FIG. 39, it is assumed that there are virtual transmission antenna #0, virtual transmission antenna #1, . . . , virtual transmission antenna #(K−1) and that virtual channel characteristics #0, virtual channel characteristics #1, . . . , virtual channel characteristics #(K−1) are set up such that their characteristics are different as much as possible.

Signal #0 is input to virtual transmission antenna #0, . . . , signal #(K−1) is input to virtual transmission antenna #(K−1), and the signal generated by adding up the signals passing through the virtual channels is input to the actual transmission antenna.

When the electric wave transmitted from the actual transmission antenna is received by the actual reception antenna, signal #0 is affected by the channel characteristics generated by the convolution between virtual channel characteristics #0 and the channel characteristics of the actual transmission/reception antenna because signal #0 passes through the channel between virtual channel #0 and the actual transmission/reception antenna. Signal #1, . . . , signal #(K−1) are processed in the same way.

If the channel characteristics generated by the convolution between the virtual channel characteristics of the virtual transmission antennas and the channel characteristics of the actual transmission/reception antenna are sufficiently different among the virtual transmission antennas, designing the signals with the assumption of those virtual transmission antennas will result in signal #0, . . . , signal #(K−1) being affected by the channel characteristics as if K transmission antennas and one reception antenna were used.

6.2 Theory of Virtual Antennas on Receiving Side

Figure 40:
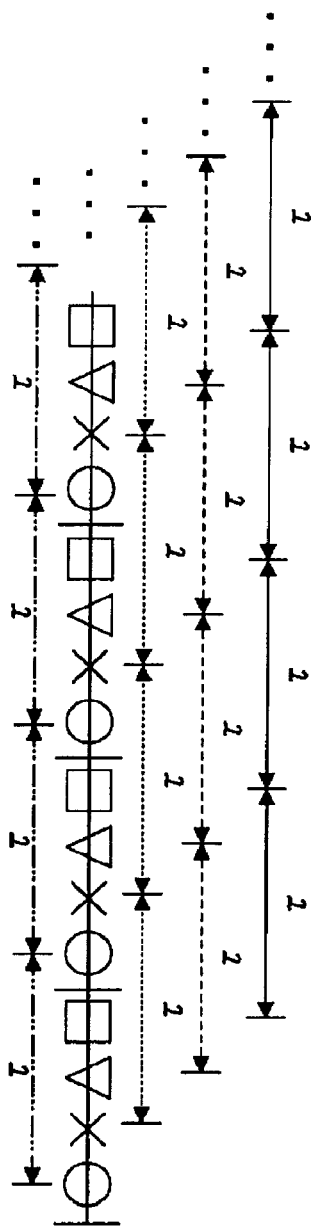
FIG. 40 is a diagram showing virtual reception antennas.

As shown in FIG. 40, K sampling points are set in each time slot in such a way that the sampling points #0 in the time slots are at an equal interval, the sampling points #1 in the time slots are at an equal interval, . . . , and the sampling points #(K−1) in the time slots are at an equal interval.

Setting the sampling points as described above will result in K discrete signals, received from sampling point sequence #0, sampling point sequence #1, . . . , and sampling point sequence #(K−1), being affected by different channel characteristics as if K antennas were used and one sampling point was set in each time slot for each antenna. That is, K virtual reception antennas can be assumed using one reception antenna.

As another application of the multi-antenna OSDM system, the following describes in five sections the theory of the multi virtual antenna OSDM system in which multiple virtual antennas are used to transmit and receive data independently in the same frequency band.

First, Section 1 describes the concept of virtual transmission antennas and Section 2 describes the concept of virtual reception antennas. Section 3 introduces the process of forming data from transmission signals with focus on the transmission system. Next, Section 4 introduces the process of acquiring the virtual communication path environment from the received signals and, at the same time, estimating data from the acquired virtual communication path environment with focus on the reception system.

6.3 Transmission System

Figure 41:
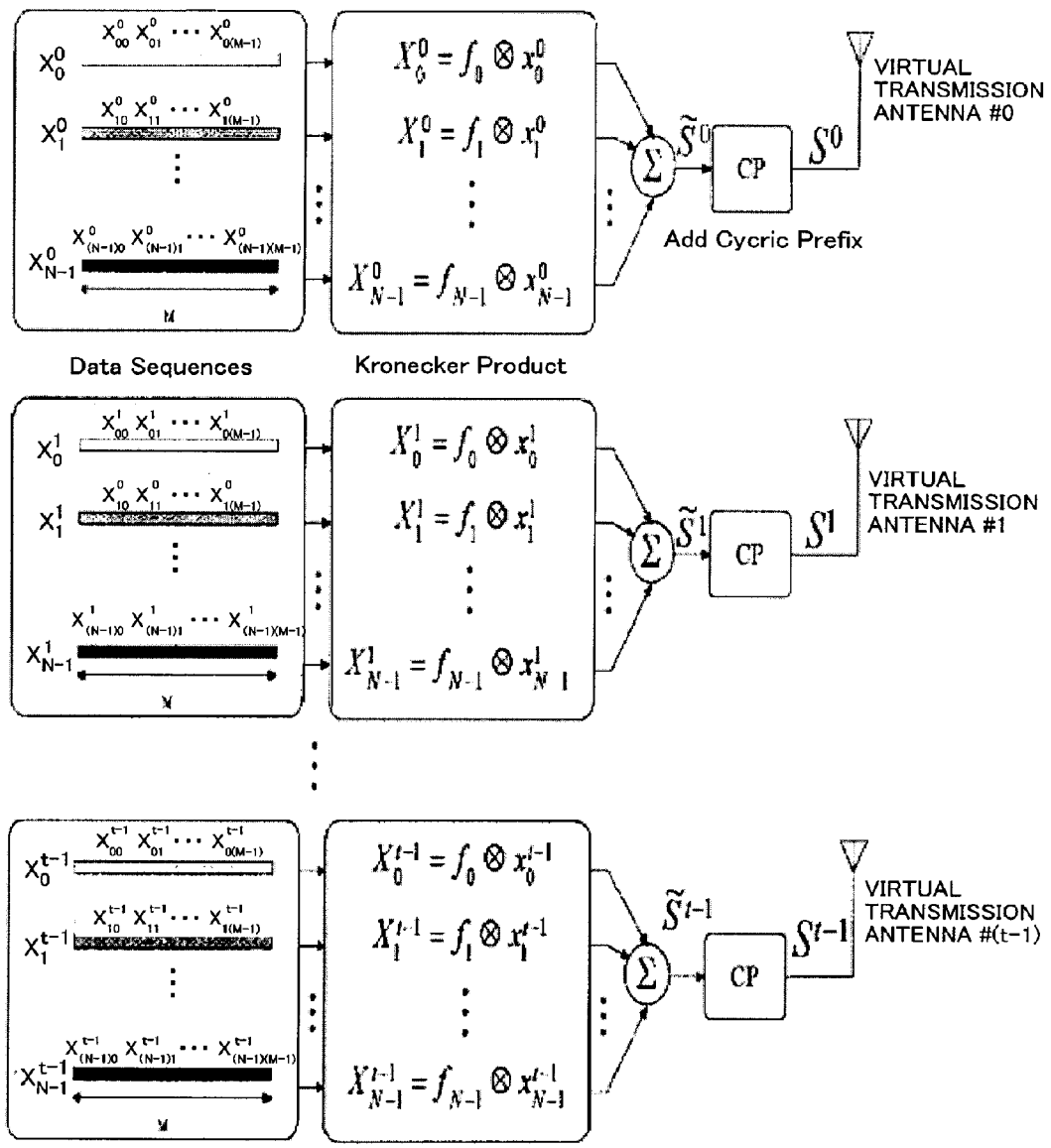
FIG. 41 is a diagram showing a transmitting system (3).

The transmission system is configured by the processes such as those shown in FIG. 41. The following describes the details.

In the description below, t virtual antennas are used for transmission and reception using the parameters used in Chapter 2.

For a virtual reception antenna i (0≤i≤t−1), N−t data vectors $x_t^i, x_{t+1}^i, \ldots, x_{N-1}^i$ each of which has the length M, such as those shown in FIG. 30, are defined as in (1). As in FIG. 31, the pilot signal is applied to $x_i^i$, and a zero matrix is applied to other rows.

Next, the Kronecker product of the IDFT matrix and the data vectors is applied as in Expression (26). Because the Kronecker product and the pilot signal of transmission data transmitted from each virtual transmission antenna and one of different rows of the IDFT matrix is calculated, the orthogonality of each pilot signal is guaranteed. That is, it should be noted that, when the transmission signal Si, generated via Expressions (27) and (28), arrives at the virtual reception antenna via multiple virtual communication paths while being interfered with other signals, the receiving side can recognize the impulse responses of the multiple virtual communication paths independently with no predictability.

6.4 Reception System

Figure 42:
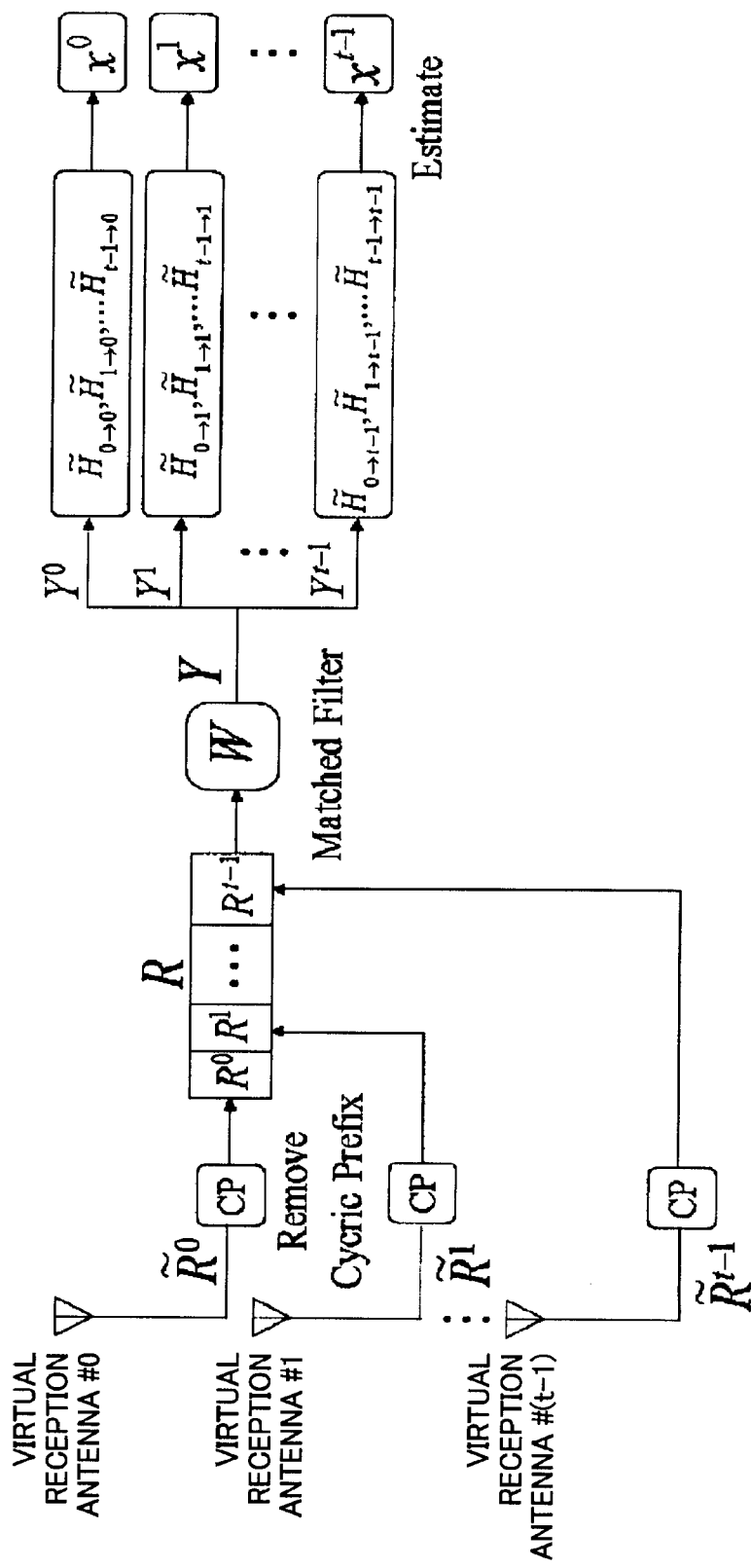
FIG. 42 is a diagram showing a receiving system (3).

The reception system is configured by the process shown in FIG. 42. The following describes the details.

[Mathematical Expression 29]

$$\tilde{R}^j = \sum_{i=0}^{t-1} \sum_{j=0}^{t-1} \sum_{k=0}^{t-1} h_k^{i \to j} \tilde{S}^i T^k \quad (42)$$

The process can be represented as given above. $h_0^{i \to j}$, $h_1^{i \to j}, \ldots, h_{L-1}^{i \to j}$ are the impulse responses on the communication path from the virtual transmission antenna (virtual transmission antenna) i to the virtual reception antenna j, and T is the shift matrix shown in Section 2 of Chapter 2.

The above are the impulse responses on the communication path from the antenna (virtual transmission antenna) i to the virtual reception antenna j, and T is the shift matrix shown in Section 2 of Chapter 2.

[Mathematical expression 30]

At this time, the receiving side performs the following processing. First, let $R^j$ be the signal generated by removing the cyclic prefix from the received signal $\tilde{R}^j$.

$$R=(R^0 R^1 \ldots R^{t-1}) \quad (43)$$

Next, the matched filter W is defined. Here, W is the Kronecker product of the Nth order DFT matrix FN, N×M unit matrix IM, and t×t unit matrix It, which is shown by the following expression.

Next, the matched filter W is defined. Here, W is the Kronecker product of the Nth order DFT matrix FN, N×M unit matrix IM, and t×t unit matrix It, which is shown by the following expression.

[Mathematical expression 31]

$$W = F_N \otimes I_M \otimes I_t \quad (44)$$

In this case, there is the following relation between the output RW of the matched filter and transmission data vectors.

$$Y \stackrel{def}{=} RW = XH \quad (45)$$

Where $$X \stackrel{def}{=} (X^0 X^1 \ldots X^{t-1})$$

$$X^0 \stackrel{def}{=} (X^0_{t0} X^0_{t1} \ldots X^0_{t(M-1)} \ldots X^0_{(N-1)(M-1)})$$

$$X^1 \stackrel{def}{=} (X^1_{t0} X^1_{t1} \ldots X^1_{t(M-1)} \ldots X^1_{(N-1)(M-1)})$$

$$\vdots$$

$$X^{t-1} \stackrel{def}{=} (X^{t-1}_{t0} X^{t-1}_{t1} \ldots X^{t-1}_{t(M-1)} \ldots X^{t-1}_{(N-1)(M-1)})$$

H is a matrix composed of $t^2$ M×M matrices $\hat{H}^{i \to j}$ each of which has impulse responses $h^{i \to j}$ and IDFT matrices as the elements. It is represented by the following expression.

[Mathematical expression 32]

$$\tilde{H}_k^{i \to j} = \begin{pmatrix} h_0^{i \to j} & h_{M-1}^{i \to j} & h_{M-2}^{i \to j} & \ldots & h_1^{i \to j} \\ \overline{W_N^k} h_1^{i \to j} & h_0^{i \to j} & h_{M-1}^{i \to j} & \ldots & h_2^{i \to j} \\ \overline{W_N^k} h_2^{i \to j} & \overline{W_N^k} h_1^{i \to j} & h_0^{i \to j} & \ldots & h_3^{i \to j} \\ \vdots & \vdots & \vdots & \ddots & \vdots \\ \overline{W_N^k} h_{M-1}^{i \to j} & \overline{W_N^k} h_{M-2}^{i \to j} & \overline{W_N^k} h_{M-3}^{i \to j} & \ldots & h_0^{i \to j} \end{pmatrix}$$

[Mathematical expression 33]

$$\hat{H}^{i \to j} = \begin{pmatrix} \tilde{H}_0^{i \to j} & 0 & \ldots & 0 \\ 0 & \tilde{H}_1^{i \to j} & \ldots & 0 \\ \vdots & \vdots & \ddots & \vdots \\ 0 & 0 & \ldots & \tilde{H}_{N-1}^{i \to j} \end{pmatrix} \quad (39)$$

$$H = \begin{pmatrix} \hat{H}^{0 \to 0} & \hat{H}^{0 \to 1} & \ldots & \hat{H}^{0 \to t-1} \\ \hat{H}^{1 \to 0} & \hat{H}^{1 \to 1} & \ldots & \hat{H}^{1 \to t-1} \\ \vdots & \vdots & \ddots & \vdots \\ \hat{H}^{t-1 \to 0} & \hat{H}^{t-1 \to 1} & \ldots & \hat{H}^{t-1 \to t-1} \end{pmatrix} \quad (47)$$

Let W be a matched filter. Then, when the output Y of the matched filters and the impulse responses h are obtained, solving the simultaneous equations based on H gives transmission data vectors.

6.5 Example of Multi Virtual Antenna OSDM when One Transmitting User is on Transmitting Side and Multiple Receiving Users are on Receiving Side For example, on a downlink in the cellular mobile communication where there is one transmitting user on the transmitting side (in some cases, there are multiple actual antennas for diversity transmission and reception) and multiple receiving users on the receiving side (typically, there is one actual antenna for each receiving user but, in some cases, there may be multiple actual antennas for diversity transmission and reception), the following must be satisfied.

Because the receiving side solves the simultaneous equations, the number of virtual reception antennas of the receiving user (receiving unit) having one actual antenna must be larger than or equal to the total number of virtual transmission antennas from which data is received.

Because a receiving user, who solves the simultaneous equations, can receive data transmitted for other receiving users, the transmission data must be encrypted when transmitted.

6.6 Example of Multi Virtual Antenna OSDM when Multiple Transmitting Users are on Transmitting Side and One Receiving User is on Receiving Side For example, on an uplink in the cellular mobile communication where there are multiple transmitting users on the transmitting side (typically, there is one actual antenna for each transmitting user but, in some cases, there may be multiple actual antennas) and one receiving user on the receiving side, the following must be satisfied.

In this case, too, because the receiving side solves the simultaneous equations, the number of virtual reception antennas of the receiving user (receiving unit) having one actual antenna must be larger than or equal to the total number of virtual transmission antennas (number of virtual channels) from which data is received.

To prevent interference, the pilot signals of all virtual transmission antennas must use separate row vectors of those of the Nth order DFT matrix as the row vectors for the pilot signals.

6.7 Example of Multi Virtual Antenna OSDM when Multiple Transmitting Users are on Transmitting Side and Multiple Receiving Users are on Receiving Side For example, in the cellular mobile communication where cell-to-cell interference is caused and there are multiple transmitting and receiving users on both transmitting side and the receiving side, separate row vectors of those of the Nth order DFT matrix must be used as the row vectors for the pilot signals of all virtual transmission antennas.

To solve the simultaneous equations on the receiving side, the total number of virtual reception antennas of one set of receiving units must be larger than or equal to the total number of virtual transmission antennas from which data is received.

6.8 Pilot Signal

It has been described that separate row vectors of those of the Nth order DFT matrix must be used for the row vectors of the pilot signals of all virtual transmission antennas.

However, if a ZCZ sequence set (the sequences are ZACZ sequences and are ZCCZ sequences with each other) or an approximate ZCCZ sequence set is used, the same row vector for the pilot signal may be allocated to multi virtual transmission antennas.

Which row vector of those of the Nth order DFT matrix is used for the pilot signal may be set arbitrarily.

7. Verification

The multi virtual antenna OSDM system was verified under the following conditions.

M=13
N=64
L=8

Actual multipaths are Rayleigh fading channels, virtual multipaths are uniformly-random 16-bit signal channels, and MMSE is used as the equalization method.

Eb of EB/No includes not only direct paths but also reflected paths, and all transmission power transmitted from one actual antenna is constant.

Figure 37:
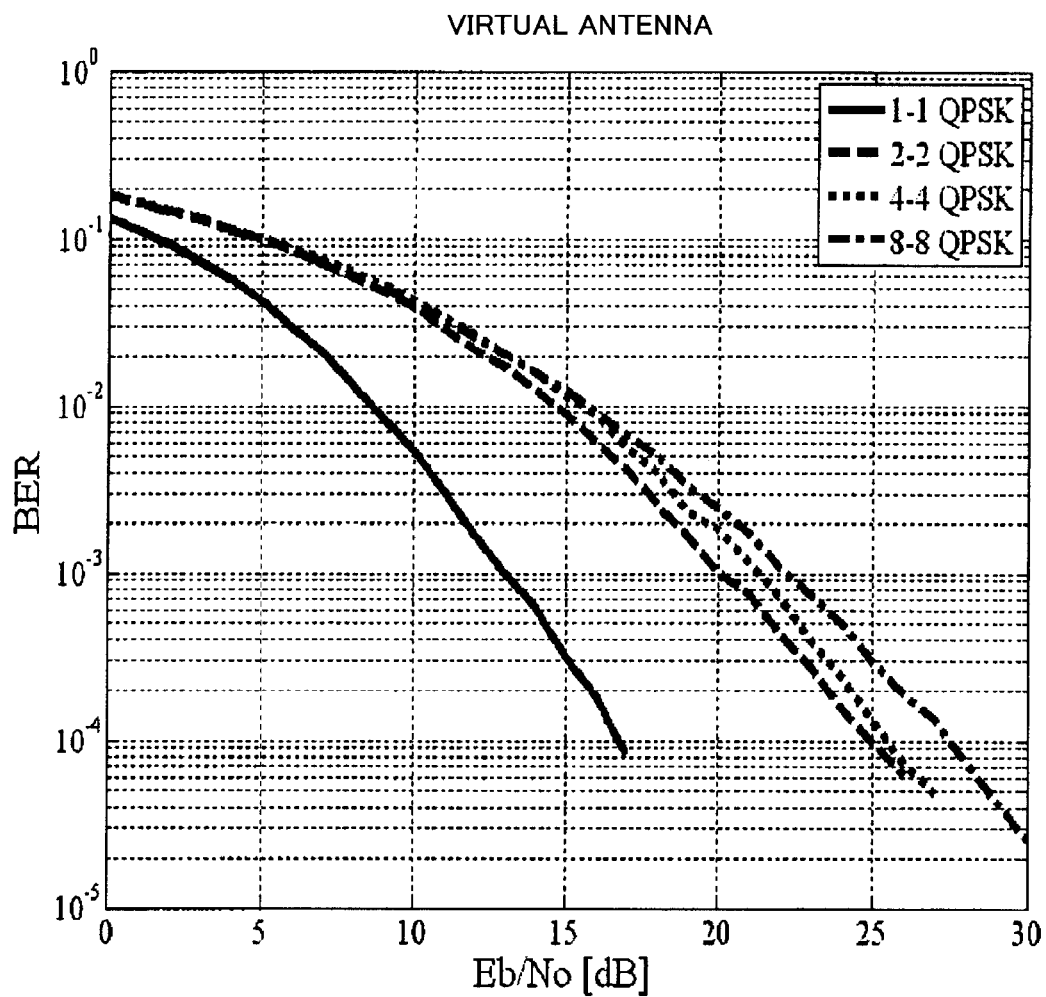
FIG. 37 is a diagram showing the simulation result (9).
Figure 38:
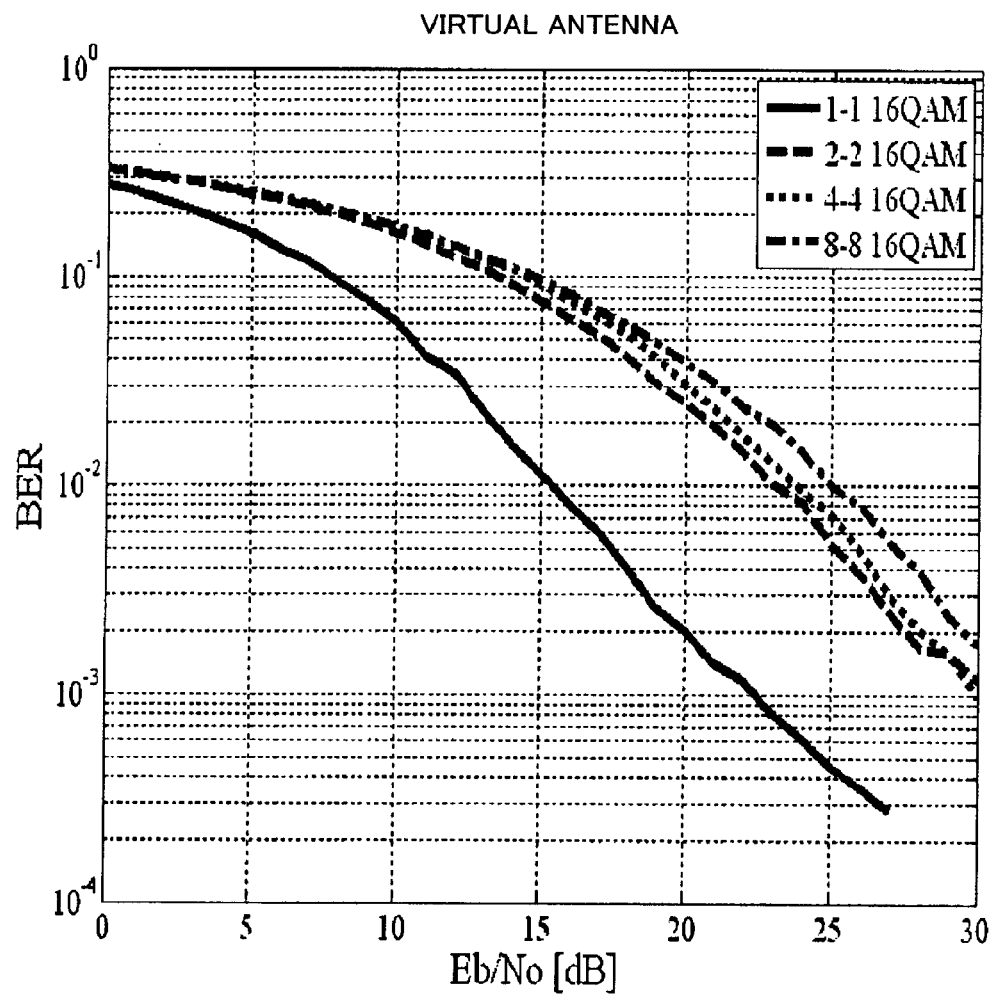
FIG. 38 is a diagram showing the simulation result (10).

The simulation result shown in FIG. 37 and FIG. 38 was obtained under the conditions given above.

The present invention can be implemented in the following modes.

- A transmitting/receiving system wherein, on a transmitting side, a signal creation unit creates a signal, which is generated by adding up signals assuming that separate data has passed through each of a plurality of virtual channels, as an output of the signal creation unit and, on a receiving side, oversampling is performed, the sampled data is distributed, and signals are detected assuming that the distributed data is an output of a plurality of virtual reception antennas.
- A transmitting device wherein a signal creation unit creates a signal generated by adding up signals assuming that separate data has passed through each of a plurality of virtual channels and
- the signal created by the signal creation unit is transmitted.
- A receiving device wherein oversampling is performed for a received signal, the sampled data is distributed, and signals are detected assuming that the distributed data is an output of a plurality of virtual reception antennas
- A transmitting/receiving system wherein, when separate data is transmitted from one transmitter to each of a plurality of receivers, a transmitter side transmits pilot signals in such a way that the pilot signals can be separated without using channel characteristics and transmits the separate data by inputting the separate data into separate virtual transmission channels and adding up the resulting data and
- each of the plurality of receivers performs oversampling and distributes the sampled result and, assuming a plurality of virtual reception antennas, generates plural simultaneous linear equations, which can estimate transmission data, and estimates transmission data by solving the plural simultaneous linear equations.
- A receiving device that receives pilot signals and data from a plurality of transmitters, the pilot signals being transmitted so that a pilot signal corresponding to each transmitter can be separated without using channel characteristics, the data being added to the pilot signals and
- distributes an oversampled result generated by performing oversampling for received signals and, assuming that the oversampled result is outputs of a plurality of virtual reception antennas, separates the transmitters according to channel characteristics so that plural simultaneous linear equations can solve diversified channel characteristics between the transmitters and the receiver, and estimates transmission data.

(Technical Meaning of Present Invention)

Shannon showed that the information transmission speed must not exceed $$C = W \log_2(S+N/N)$$

in order to provide the method that makes the error rate as close to zero as possible, while the present invention shows that "if a finite error rate is allowed, there is no limit to the information transmission speed even if the bandwidth is finite".

The following describes "the method that makes the information transmission speed infinitely high using a finite bandwidth".

Multiple (K) virtual transmission antennas are prepared on the transmitting side, and signals are generated by the OSDM system for each virtual transmission antenna using different data. Next, after inputting the signals to separate virtual channels for each virtual transmission antenna (convolution of time characteristics), the signals are added up and transmitted from the actual transmission antenna.

On the receiving side, the signal received via the actual reception antenna is separated by the convolution between the signal and the time characteristics of separate virtual channels, and the signals generated by the convolution are output to virtual reception antennas corresponding to the virtual channels. The number of virtual reception antennas is K.

If K virtual transmission antennas and K virtual reception antennas are used, "the theory of multi antenna OSDM" can be applied and, regardless of the fact that one actual transmission antenna and one actual reception antenna are used, the information transmission speed can be increased about k times that of the single antenna OSDM (wireless frequency usage efficiency about two times higher than that of the single antenna OFDM).

If the amount of calculation and the amount of delay time need not be considered, K can be increased infinitely. Therefore, if a finite error rate is allowed, the information transmission speed can be increased infinitely even in a finite bandwidth.

Furthermore, OSDM makes it easy to improve the amplitude distribution of a transmission antenna (prevents the power from exceeding a predetermined transmission power in a time or frequency area).

Although embodiments of the present invention have been described, it will be understood that the invention is not limited to the embodiments described above. The present invention may be changed without departing from the spirit of the invention.

This international application claims priority from the prior Japanese Patent Application No. 2007-103078 and PCT/JP2008/053866, filed Apr. 10, 2007 and Mar. 4, 2008, the entire contents of Japanese Patent Application No. 2007-103078 and PCT/JP2008/053866 are incorporated herein by reference.

The invention claimed is:

1. A transmitting/receiving method, wherein a transmitting side has a plurality of virtual transmission antennas and one or a plurality of actual transmission antennas, the number of the actual transmission antenna is at least less than that of the virtual transmission antenna, a receiving side has one or a plurality of actual reception antennas and a plurality of virtual reception antennas, the number of the actual reception antenna is at least less than that of the virtual reception antenna, a virtual channel exists between respective transmitting side virtual transmission antennas and the actual transmission antenna, and a virtual reception channel exists between the actual reception antenna and respective receiving side virtual reception antennas, the method comprising operations in which:

separate data signals are input to respective virtual transmission antennas of the transmitting side, separate time characteristics, which correspond to separate virtual channels for the respective virtual transmission antennas, are convoluted with respective ones of the separate data signals input to the respective virtual transmission antennas to pass the separate data signals through the separate virtual channels, an addition is performed on an output of each of the virtual channels and the result is transmitted from the actual transmission antenna, and on the receiving side, a first signal received by the actual reception antenna is branched, the time characteristics of separate virtual reception channels are convoluted and are input to the virtual reception antennas corresponding to respective virtual reception channels, and the virtual reception antennas output a second signal.

2. A transmitting method, wherein a transmitting side has a plurality of virtual transmission antennas and one or a plurality of actual transmission antennas, the number of the actual transmission antenna is at least less than that of the virtual transmission antenna, a virtual channel exists between respective transmitting side virtual transmission antennas and the actual transmission antenna, the method comprising operations in which:

on the transmitting side,
a plurality of virtual transmission antennas #0, #1, . . ., # (K−1) is virtualized,
the characteristics of the plurality of virtual channels #0, #1, . . ., # (K−1) are set to be different in channel characteristics,
an input signal #0 is input to the virtual transmission antenna #0, . . ., an input signal # (K−1) is input to the virtual transmission antenna # (K−1),
a signal obtained by an addition after passing the respective virtual channels is input to the actual transmission antenna,
a signal design in which the virtual transmission antenna is assumed is performed such that the channel characteristics, obtained by convoluting the plurality of virtual channel characteristics of a plurality of virtual transmission antennas and the channel characteristics of the actual transmitting/receiving antennas, are different for each virtual transmission antenna,
so that the signal #0, . . ., the signal # (K−1) is affected by the channel characteristics the same as those when K actual transmission antennas and one actual reception antenna are used.

3. A receiving method used for the transmitting/receiving method according to claim 1, wherein there are actual reception antennas, a plurality of virtual reception antennas and virtual reception channels corresponding to respective virtual reception antennas, the signal received by the actual reception antenna is branched, and the time characteristics of separate virtual reception channels are convoluted, and are output to the virtual reception antennas corresponding to respective virtual channels.

4. A transmitting/receiving method comprising operations in which:
a transmitting side has a plurality of virtual transmission antennas and one or a plurality of actual transmission antennas,
a different data signal is input to respective virtual transmission antennas, and the number of the actual transmission antenna is at least less than that of the virtual transmission antenna,
a receiving side has one or a plurality of actual reception antennas and a plurality of virtual reception antennas, the number of the actual reception antenna is at least less than that of the virtual reception antenna,
a transmitting side virtual channel exists between respective transmitting side virtual transmission antennas and the actual transmission antenna, and for a signal which passes through the transmitting side virtual channel, a virtual channel characteristic of the transmitting side virtual channel through which the signal passes is convoluted, and a receiving side virtual channel exists between the actual reception antennas and respective receiving side virtual reception antennas, virtual channel characteristics of the receiving side virtual channels through which signals pass are convoluted, and are input to the receiving side virtual reception antennas, and the receiving side virtual reception antennas output the input signal.

5. A transmitting/receiving system, comprising:
K virtual transmission antennas that are virtually set in a transmitting side signal creation unit,
K virtual reception antennas that are virtually set in a receiving side signal detection unit,
a plurality of virtual transmission channels that are virtually set between K virtual transmission antennas and one actual transmission antenna,
a plurality of virtual reception channels that are virtually set between one actual reception antenna and K virtual reception antennas, wherein
on the transmitting side, a different data signal is input to respective virtual transmission antennas, a plurality of signals, virtually transmitted via the virtual transmission channels from the virtual transmission antennas, are calculated from the input/output responses of the channel characteristics of respective virtual transmission channels, and are input to the actual transmission antenna, the actual transmission antenna performs an addition on signals input via the respective virtual transmission channels from the respective virtual transmission antennas, and transmits the result to the actual reception antenna, and
on the receiving side, a plurality of signals, which are obtained by inputting a reception signal received by the actual reception antenna virtually to respective virtual reception antennas via respective virtual reception channels, are calculated from input/output responses of the channel characteristics of respective virtual reception channels, and are output from respective virtual reception antennas,
so that during the transmitting/receiving, a communication capacity, which is about k times as that of one actual transmission antenna and one actual reception antenna, is obtained.

6. A transmitting/receiving system, the system comprising:
K virtual transmission antennas that are virtually set in a transmitting side signal creation unit,
K virtual reception antennas that are virtually set in a receiving side signal detection unit,
a plurality of virtual transmission channels that are virtually set between K virtual transmission antennas and one actual transmission antenna,
a plurality of virtual reception channels that are set between one actual reception antenna and K virtual reception antennas, wherein
on the transmitting side, a plurality of signals, virtually transmitted via the virtual transmission channels from the virtual transmission antennas, are calculated from the input/output responses of the channel characteristics of respective virtual transmission channels, and
on the receiving side, a plurality of signals, which are obtained by virtually receiving, by the virtual reception antennas, a reception signal received via the actual reception antenna, are calculated from the input/output responses of the channel characteristics of respective virtual reception channels, so that during the transmitting/receiving, a communication capacity, which is about k times as that of one actual transmission antenna and one actual reception antenna, is obtained.

7. A transmitting/receiving method, wherein on a transmitting side, a plurality of different signals are processed, the resulting processed signals are added up to form a transmission signal, and the transmission signal is transmitted and on a receiving side, a plurality of output signals are formed from a reception signal and the plurality of output signals are output from a plurality of different output devices, one output signal for each device and wherein on the transmitting side, said method comprises the steps of:

virtually setting a plurality of virtual transmission antennas and virtually setting separate virtual transmission channels and channel characteristics thereof between each of the plurality of virtual transmission antennas and actual transmission antennas;

inputting each of the plurality of different signals separately from one of the separate virtual transmission antennas into one of the separate virtual transmission channels and virtually outputting the signal via each virtual channel characteristics;

calculating a plurality of virtually output processed signals from input/output responses of the channel characteristics of the virtual transmission channels;

forming a transmission signal by adding up the plurality of calculated processed signals; and transmitting the transmission signal from the actual transmission antennas to actual channels, and on the receiving side, said method comprises the steps of:

virtually setting a plurality of virtual reception antennas and virtually setting separate virtual reception channels and channel characteristics thereof between actual reception antennas and each of the plurality of virtual reception antennas;

receiving a transmission signal, transmitted via the actual channels, via the actual reception antennas;

virtually inputting a reception signal, received via said actual reception antennas, into each of the virtual reception channels;

calculating a plurality of output signals, virtually output to the virtual reception antennas via the virtual reception channels, from input/output responses of the channel characteristics of the virtual reception channels; and outputting the plurality of calculated output signals from output devices, one output signal for each device.

* * * * *